US009568665B2

(12) United States Patent
Petluri et al.

(10) Patent No.: US 9,568,665 B2
(45) Date of Patent: Feb. 14, 2017

(54) LIGHTING SYSTEMS INCLUDING LENS MODULES FOR SELECTABLE LIGHT DISTRIBUTION

(71) Applicant: EcoSense Lighting Inc., Los Angeles, CA (US)

(72) Inventors: Raghuram L.V. Petluri, Cerritos, CA (US); Paul Pickard, Acton, CA (US); Robert Fletcher, Pasadena, CA (US)

(73) Assignee: ECOSENSE LIGHTING INC., Los Angeles, CA (US)

( * ) Notice: Subject to any disclaimer, the term of this patent is extended or adjusted under 35 U.S.C. 154(b) by 70 days.

(21) Appl. No.: 14/636,204

(22) Filed: Mar. 3, 2015

(65) Prior Publication Data

US 2016/0259118 A1 Sep. 8, 2016

(51) Int. Cl.
*F21V 8/00* (2006.01)

(52) U.S. Cl.
CPC ............. *G02B 6/0076* (2013.01); *G02B 6/003* (2013.01); *G02B 6/0016* (2013.01); *G02B 6/0021* (2013.01); *G02B 6/0025* (2013.01); *G02B 6/0028* (2013.01); *G02B 6/0031* (2013.01); *G02B 6/0053* (2013.01);
(Continued)

(58) Field of Classification Search
CPC ... G02B 6/0076; G02B 6/0016; G02B 6/0021; G02B 6/0025; G02B 6/0028; G02B 6/003; G02B 6/0031; G02B 6/0053; G02B 6/0055; G02B 6/0068; G02B 6/0073; F21V 5/08; F21V 5/004; F21V 5/005; F21V 5/008; F21V 5/048; F21V 17/002
See application file for complete search history.

(56) References Cited

U.S. PATENT DOCUMENTS

| 2,430,472 A | 11/1947 | Levy |
|---|---|---|
| D149,124 S | 3/1948 | Hewitt |

(Continued)

FOREIGN PATENT DOCUMENTS

| CA | 2623604 A1 | 8/2009 |
|---|---|---|
| CN | 1536686 A | 10/2004 |

(Continued)

OTHER PUBLICATIONS

Acuity Brands, "Acuity Brands Introduces Luminaire for Tunable White Technology," downloaded from http://news.acuitybrands.com/US/acuity-brands-introduces-luminaires-with-tunable-white-technology/s/54ae242f-1222-4b8b-be0d-36637bde8cd2 on May 28, 2014, 2pp.

(Continued)

*Primary Examiner* — Mary Ellen Bowman
(74) *Attorney, Agent, or Firm* — Jay M. Brown

(57) ABSTRACT

Lighting system including: lighting module having semiconductor light-emitting device; first lens module; and second lens module. First lens module may include: converging lens; or diverging lens having light output surface including raised region shaped as sliced torus; or diverging lens having light output surface including contoured lens screen having lenticular or microprismatic features. Converging lens may have total internal reflection side surface with frusto-conical shape. Second lens module may include diverging lens having light output surface spaced apart from light input surface that may include lens screen having lenticular or microprismatic features. Lighting system may include additional lighting modules and may include further lens modules that may be detachable and interchangeable.

108 Claims, 30 Drawing Sheets

(52) U.S. Cl.
CPC ......... *G02B 6/0055* (2013.01); *G02B 6/0068* (2013.01); *G02B 6/0073* (2013.01)

(56) References Cited

U.S. PATENT DOCUMENTS

| | | |
|---|---|---|
| D152,113 S | 12/1948 | Mehr |
| 2,458,967 A | 1/1949 | Wiedenhoeft |
| 2,678,380 A | 5/1954 | Westby |
| 2,702,378 A | 2/1955 | Talty |
| D191,734 S | 11/1961 | Daher |
| 3,040,170 A | 6/1962 | Chwan |
| 3,078,366 A | 2/1963 | Winkler |
| 3,120,929 A | 2/1964 | Henning |
| 3,220,471 A | 11/1965 | Coe |
| 3,247,368 A | 4/1966 | McHugh |
| 3,435,891 A | 4/1969 | Parrish |
| D214,582 S | 7/1969 | Routh |
| D217,096 S | 4/1970 | Birns |
| 3,538,321 A | 11/1970 | Longenecker |
| 3,639,751 A | 2/1972 | Pichel |
| 3,643,038 A | 2/1972 | Sato |
| D231,559 S | 4/1974 | Darling et al. |
| D234,712 S | 4/1975 | Kennedy et al. |
| 3,989,976 A | 11/1976 | Tabor |
| 4,090,210 A | 5/1978 | Wehling et al. |
| 4,091,444 A | 5/1978 | Mori |
| 4,138,716 A | 2/1979 | Muhlethaler et al. |
| D251,500 S | 4/1979 | Aigner |
| 4,258,413 A | 3/1981 | Mausser |
| 4,345,306 A | 8/1982 | Summey |
| 4,414,489 A | 11/1983 | Young |
| 4,420,207 A | 12/1983 | Nishikawa |
| 4,423,471 A | 12/1983 | Gordin et al. |
| 4,445,164 A | 4/1984 | Giles, III |
| 4,453,203 A | 6/1984 | Pate |
| 4,467,403 A | 8/1984 | May |
| 4,473,873 A | 9/1984 | Quiogue |
| 4,564,888 A | 1/1986 | Lewin |
| 4,578,742 A | 3/1986 | Klein |
| 4,580,859 A | 4/1986 | Frano |
| 4,609,979 A | 9/1986 | Kristofek |
| 4,674,015 A | 6/1987 | Smith |
| 4,727,648 A | 3/1988 | Savage |
| 4,733,335 A | 3/1988 | Serizawa |
| D296,717 S | 7/1988 | Kane et al. |
| 4,755,918 A | 7/1988 | Pristash |
| 4,757,431 A | 7/1988 | Cross |
| 4,761,721 A | 8/1988 | Willing |
| D300,876 S | 4/1989 | Sakai |
| 4,833,579 A | 5/1989 | Skegin |
| 4,837,927 A | 6/1989 | Savage |
| 4,870,327 A | 9/1989 | Jorgensen |
| 4,872,097 A | 10/1989 | Miller |
| 4,882,667 A | 11/1989 | Skegin |
| 4,918,497 A | 4/1990 | Edmond |
| D308,114 S | 5/1990 | Shemitz |
| D308,260 S | 5/1990 | Shemitz |
| 4,966,862 A | 10/1990 | Edmond |
| D315,030 S | 2/1991 | Jacobs et al. |
| D316,303 S | 4/1991 | Layne |
| D316,306 S | 4/1991 | Shemitz |
| 5,027,168 A | 6/1991 | Edmond |
| D319,512 S | 8/1991 | Lettenmayer |
| D322,862 S | 12/1991 | Miller |
| 5,087,212 A | 2/1992 | Hanami |
| D325,645 S | 4/1992 | Grange |
| 5,140,507 A | 8/1992 | Harwood |
| D330,944 S | 11/1992 | Wereley |
| 5,174,649 A | 12/1992 | Alston |
| 5,177,404 A | 1/1993 | Cohen |
| 5,210,051 A | 5/1993 | Carter, Jr. |
| D336,536 S | 6/1993 | Shaanan et al. |
| 5,235,470 A | 8/1993 | Cheng |
| D340,514 S | 10/1993 | Liao |
| 5,253,152 A | 10/1993 | Yang |
| 5,282,364 A | 2/1994 | Cech |
| 5,303,124 A | 4/1994 | Wrobel |
| 5,324,213 A | 6/1994 | Frantz |
| 5,325,281 A | 6/1994 | Harwood |
| D348,744 S | 7/1994 | Johnson et al. |
| 5,335,159 A | 8/1994 | Chen et al. |
| 5,337,225 A | 8/1994 | Brookman |
| 5,338,944 A | 8/1994 | Edmond et al. |
| 5,359,345 A | 10/1994 | Hunter |
| 5,367,229 A | 11/1994 | Yang |
| 5,381,323 A | 1/1995 | Osteen et al. |
| 5,387,901 A | 2/1995 | Hardt |
| 5,393,993 A | 2/1995 | Edmond et al. |
| 5,410,462 A | 4/1995 | Wolfe |
| 5,416,342 A | 5/1995 | Edmond et al. |
| 5,436,809 A | 7/1995 | Brassier |
| 5,440,466 A | 8/1995 | Belisle |
| 5,450,303 A | 9/1995 | Markiewicz et al. |
| 5,490,048 A | 2/1996 | Brassier |
| 5,504,665 A | 4/1996 | Osteen et al. |
| 5,515,253 A | 5/1996 | Sjobom |
| 5,516,390 A | 5/1996 | Tomita et al. |
| 5,523,589 A | 6/1996 | Edmond et al. |
| D373,437 S | 9/1996 | Kira |
| 5,584,574 A | 12/1996 | Haddad |
| 5,599,091 A | 2/1997 | Kira |
| 5,604,135 A | 2/1997 | Edmond et al. |
| 5,628,557 A | 5/1997 | Huang |
| 5,631,190 A | 5/1997 | Negley |
| 5,632,551 A | 5/1997 | Roney |
| 5,634,822 A | 6/1997 | Gunell |
| 5,655,832 A * | 8/1997 | Pelka .................. F24J 2/06 362/259 |
| 5,658,066 A | 8/1997 | Hirsch |
| D383,236 S | 9/1997 | Krogman |
| D384,336 S | 9/1997 | Gerber |
| 5,676,453 A | 10/1997 | Parkyn, Jr. |
| D390,992 S | 2/1998 | Shemitz |
| 5,713,662 A | 2/1998 | Kira |
| 5,739,554 A | 4/1998 | Edmond et al. |
| 5,757,144 A | 5/1998 | Nilssen |
| 5,788,533 A | 8/1998 | Alvarado-Rodriguez |
| 5,794,685 A | 8/1998 | Dean |
| 5,800,050 A | 9/1998 | Leadford |
| 5,806,955 A | 9/1998 | Parkyn, Jr. |
| D408,823 S | 4/1999 | Kirby |
| 5,890,793 A | 4/1999 | Stephens |
| 5,894,196 A | 4/1999 | McDermott |
| 5,898,267 A | 4/1999 | McDermott |
| 5,909,955 A | 6/1999 | Roorda |
| 5,912,477 A | 6/1999 | Negley |
| 5,938,316 A | 8/1999 | Yan |
| 5,944,647 A | 8/1999 | Reynolds |
| 6,022,130 A | 2/2000 | Donato |
| 6,051,940 A | 4/2000 | Arun |
| 6,072,160 A | 6/2000 | Bahl |
| 6,079,851 A | 6/2000 | Altman |
| 6,083,021 A | 7/2000 | Lau |
| 6,104,536 A | 8/2000 | Eckhardt |
| 6,120,600 A | 9/2000 | Edmond et al. |
| 6,124,673 A | 9/2000 | Bishop |
| 6,149,112 A | 11/2000 | Thieltges |
| 6,149,288 A | 11/2000 | Huang |
| 6,176,594 B1 | 1/2001 | Yarconi |
| D437,449 S | 2/2001 | Soller |
| D437,652 S | 2/2001 | Uhler |
| 6,187,606 B1 | 2/2001 | Edmond et al. |
| 6,198,233 B1 | 3/2001 | McConaughy |
| 6,201,262 B1 | 3/2001 | Edmond et al. |
| D443,710 S | 6/2001 | Chiu |
| 6,244,877 B1 | 6/2001 | Asao |
| 6,249,375 B1 | 6/2001 | Silhengst |
| D445,936 S | 7/2001 | Mier-Langner et al. |
| 6,260,981 B1 | 7/2001 | Fiene |
| D446,592 S | 8/2001 | Leen |
| 6,273,588 B1 | 8/2001 | Arakelian |
| D448,508 S | 9/2001 | Benghozi |
| 6,312,787 B1 | 11/2001 | Hayashi et al. |
| 6,318,883 B1 | 11/2001 | Sugiyama et al. |

(56) References Cited

U.S. PATENT DOCUMENTS

| | | | |
|---|---|---|---|
| D452,843 S | 1/2002 | Henrici |
| 6,341,523 B2 | 1/2002 | Lynam |
| D457,673 S | 5/2002 | Martinson |
| 6,386,723 B1 | 5/2002 | Eberlein et al. |
| 6,390,646 B1 | 5/2002 | Yan |
| 6,392,360 B2 | 5/2002 | McConaughy |
| 6,426,704 B1 | 7/2002 | Hutchison |
| 6,435,693 B1 | 8/2002 | Fiene |
| 6,439,736 B1 | 8/2002 | Fiene |
| 6,439,743 B1 | 8/2002 | Hutchison |
| 6,439,749 B1 | 8/2002 | Miller et al. |
| 6,441,943 B1 | 8/2002 | Roberts |
| D462,801 S | 9/2002 | Huang |
| 6,450,662 B1 | 9/2002 | Hutchison |
| 6,450,664 B1 | 9/2002 | Kelly |
| D464,455 S | 10/2002 | Fong |
| D464,939 S | 10/2002 | Chuang |
| D465,046 S | 10/2002 | Layne |
| 6,473,002 B1 | 10/2002 | Hutchison |
| 6,474,839 B1 | 11/2002 | Hutchison |
| 6,478,453 B2 | 11/2002 | Lammers |
| 6,488,386 B1 | 12/2002 | Yan |
| 6,508,567 B1 | 1/2003 | Fiene |
| D470,962 S | 2/2003 | Chen |
| 6,525,939 B2 | 2/2003 | Liang |
| D472,339 S | 3/2003 | Russello et al. |
| 6,527,422 B1 | 3/2003 | Hutchison |
| 6,530,674 B2 | 3/2003 | Grierson et al. |
| D473,529 S | 4/2003 | Feinbloom |
| 6,540,382 B1 | 4/2003 | Simon |
| 6,561,690 B2 | 5/2003 | Balestriero et al. |
| D476,439 S | 6/2003 | O'Rourke |
| 6,600,175 B1 | 7/2003 | Baretz et al. |
| 6,601,970 B2 | 8/2003 | Ueda |
| 6,618,231 B2 | 9/2003 | McConaughy |
| 6,632,006 B1 | 10/2003 | Rippel |
| 6,636,003 B2 | 10/2003 | Rahm et al. |
| D482,476 S | 11/2003 | Kwong |
| 6,641,284 B2 | 11/2003 | Stopa et al. |
| 6,662,211 B1 | 12/2003 | Weller |
| 6,682,211 B1 | 1/2004 | English |
| 6,683,419 B2 | 1/2004 | Kriparos |
| 6,691,768 B2 | 2/2004 | Hsieh |
| 6,703,640 B1 | 3/2004 | Hembree |
| 6,733,164 B1 | 5/2004 | Smith, Jr. |
| D491,306 S | 6/2004 | Zucker |
| 6,744,693 B2 | 6/2004 | Brockmann |
| 6,752,645 B2 | 6/2004 | Nakamura et al. |
| 6,773,138 B2 | 8/2004 | Coushaine |
| 6,787,999 B2 | 9/2004 | Stimac |
| 6,788,510 B2 | 9/2004 | McConaughy |
| 6,791,119 B2 | 9/2004 | Slater, Jr. et al. |
| 6,814,462 B1 | 11/2004 | Fiene |
| 6,824,296 B2 | 11/2004 | Souza |
| 6,824,390 B2 | 11/2004 | Brown |
| 6,827,469 B2 | 12/2004 | Coushaine |
| 6,853,010 B2 | 2/2005 | Slater, Jr. et al. |
| 6,860,617 B2 | 3/2005 | Fiene |
| 6,863,424 B2 | 3/2005 | Smith |
| 6,864,513 B2 | 3/2005 | Lin |
| 6,869,206 B2 | 3/2005 | Zimmerman |
| 6,871,993 B2 | 3/2005 | Hecht |
| D504,967 S | 5/2005 | Kung |
| 6,893,144 B2 | 5/2005 | Fan |
| D506,065 S | 6/2005 | Sugino |
| 6,902,200 B1 | 6/2005 | Beadle |
| 6,902,291 B2 | 6/2005 | Rizkin |
| 6,903,380 B2 | 6/2005 | Barnett |
| 6,905,232 B2 | 6/2005 | Lin |
| 6,946,806 B1 | 9/2005 | Choi |
| 6,958,497 B2 | 10/2005 | Emerson et al. |
| 6,966,677 B2 | 11/2005 | Galli |
| 6,979,097 B2 | 12/2005 | Elam |
| D516,020 S | 2/2006 | Wong |
| D516,229 S | 2/2006 | Tang |
| 6,998,650 B1 | 2/2006 | Wu |
| 7,040,774 B2 | 5/2006 | Beeson et al. |
| 7,063,130 B2 | 6/2006 | Huang |
| 7,063,440 B2 | 6/2006 | Mohacsi et al. |
| 7,066,617 B2 | 6/2006 | Mandy |
| D524,975 S | 7/2006 | Oas |
| 7,070,301 B2 | 7/2006 | Magarill |
| 7,077,546 B2 | 7/2006 | Yamauchi |
| D527,119 S | 8/2006 | Maxik |
| D527,131 S | 8/2006 | McCarthy, III |
| 7,093,958 B2 | 8/2006 | Coushaine |
| 7,095,056 B2 | 8/2006 | Vitta et al. |
| 7,097,332 B2 | 8/2006 | Vamberi |
| 7,098,397 B2 | 8/2006 | Lange |
| 7,111,963 B2 | 9/2006 | Zhang |
| 7,111,971 B2 | 9/2006 | Coushaine |
| 7,112,916 B2 | 9/2006 | Goh |
| D530,683 S | 10/2006 | Rivas |
| 7,131,749 B2 | 11/2006 | Wimberly |
| 7,132,804 B2 | 11/2006 | Lys |
| 7,138,667 B2 | 11/2006 | Barnett |
| 7,149,089 B2 | 12/2006 | Blasko |
| 7,150,553 B2 | 12/2006 | English |
| D535,774 S | 1/2007 | Weston et al. |
| 7,159,997 B2 | 1/2007 | Reo et al. |
| 7,160,004 B2 | 1/2007 | Peck |
| 7,172,319 B2 | 2/2007 | Holder et al. |
| D538,951 S | 3/2007 | Maxik |
| D539,459 S | 3/2007 | Benghozi |
| 7,198,386 B2 | 4/2007 | Zampini |
| 7,207,696 B1 | 4/2007 | Lin |
| D541,957 S | 5/2007 | Wang |
| 7,210,957 B2 | 5/2007 | Mrakovich et al. |
| 7,213,940 B1 | 5/2007 | Van De Ven et al. |
| 7,221,374 B2 | 5/2007 | Dixon |
| D544,110 S | 6/2007 | Hooker |
| D545,457 S | 6/2007 | Chen |
| 7,234,950 B1 | 6/2007 | Wickett |
| 7,237,930 B2 | 7/2007 | Onishi et al. |
| D548,691 S | 8/2007 | Krieger |
| 7,273,299 B2 | 9/2007 | Parkyn et al. |
| D552,779 S | 10/2007 | Starck |
| 7,282,840 B2 | 10/2007 | Chih |
| 7,286,296 B2 * | 10/2007 | Chaves .................. F21K 9/00 257/E33.071 |
| 7,288,902 B1 | 10/2007 | Melanson |
| 7,293,908 B2 | 11/2007 | Beeson et al. |
| 7,303,301 B2 | 12/2007 | Koren |
| D561,924 S | 2/2008 | Yiu |
| D563,013 S | 2/2008 | Levine |
| 7,329,907 B2 | 2/2008 | Pang et al. |
| D564,119 S | 3/2008 | Metlen |
| 7,344,279 B2 | 3/2008 | Mueller |
| 7,344,296 B2 | 3/2008 | Matsui |
| 7,357,534 B2 | 4/2008 | Snyder |
| 7,358,657 B2 | 4/2008 | Koelger |
| 7,358,679 B2 | 4/2008 | Lys et al. |
| 7,360,925 B2 | 4/2008 | Coushaine |
| D568,829 S | 5/2008 | Yamashita |
| 7,369,386 B2 | 5/2008 | Rasmussen |
| D570,505 S | 6/2008 | Maxik |
| 7,381,942 B2 | 6/2008 | Chin et al. |
| D574,095 S | 7/2008 | Hill |
| 7,396,139 B2 | 7/2008 | Savage |
| 7,396,146 B2 | 7/2008 | Wang |
| 7,413,326 B2 | 8/2008 | Tain |
| D576,545 S | 9/2008 | Mandel |
| D576,964 S | 9/2008 | Shaner |
| D577,453 S | 9/2008 | Metlen |
| D577,836 S | 9/2008 | Engebrigtsen |
| 7,422,347 B2 | 9/2008 | Miyairi et al. |
| D579,421 S | 10/2008 | Chu |
| D581,080 S | 11/2008 | Mier-Langner |
| D581,554 S | 11/2008 | To |
| D581,583 S | 11/2008 | Peng |
| 7,452,115 B2 | 11/2008 | Alcelik |
| 7,456,499 B2 | 11/2008 | Loh et al. |
| D583,975 S | 12/2008 | Kushinskaya et al. |
| 7,458,820 B2 | 12/2008 | Ohta |

(56) References Cited

U.S. PATENT DOCUMENTS

| | | |
|---|---|---|
| 7,467,888 B2 | 12/2008 | Fiene |
| D585,588 S | 1/2009 | Alexander |
| D585,589 S | 1/2009 | Alexander |
| 7,481,552 B2 | 1/2009 | Mayfield, III et al. |
| D586,498 S | 2/2009 | Wu |
| D587,389 S | 2/2009 | Benensohn |
| 7,494,248 B2 | 2/2009 | Li |
| 7,497,581 B2 | 3/2009 | Beeson et al. |
| 7,513,675 B2 | 4/2009 | Mier-Langner |
| D591,894 S | 5/2009 | Flank |
| D592,799 S | 5/2009 | Scott |
| 7,532,324 B2 | 5/2009 | Liu et al. |
| 7,537,464 B2 | 5/2009 | Brandenburg |
| 7,539,028 B2 | 5/2009 | Baurle et al. |
| D593,512 S | 6/2009 | Lin |
| 7,540,761 B2 | 6/2009 | Weber |
| 7,549,786 B2 | 6/2009 | Higley |
| D597,246 S | 7/2009 | Meyer, IV |
| D597,247 S | 7/2009 | Meyer, IV |
| 7,559,784 B2 | 7/2009 | Hsiao |
| 7,564,180 B2 | 7/2009 | Brandes |
| D597,704 S | 8/2009 | Peng |
| D599,040 S | 8/2009 | Alexander |
| 7,575,332 B2 | 8/2009 | Cok |
| 7,575,338 B1 | 8/2009 | Verfuerth |
| 7,580,192 B1 | 8/2009 | Chu |
| D601,276 S | 9/2009 | Grajcar |
| 7,591,572 B1 | 9/2009 | Levine |
| 7,594,738 B1 | 9/2009 | Lin |
| D602,868 S | 10/2009 | Vogt |
| 7,604,365 B2 | 10/2009 | Chang |
| 7,607,802 B2 | 10/2009 | Kang |
| 7,621,770 B1 | 11/2009 | Finizio |
| 7,626,345 B2 | 12/2009 | Young |
| 7,628,506 B2 | 12/2009 | Verfuerth |
| 7,637,635 B2 | 12/2009 | Xiao |
| D608,043 S | 1/2010 | Ko |
| D610,543 S | 2/2010 | Coushaine |
| D610,723 S | 2/2010 | Grajcar |
| D610,729 S | 2/2010 | Kushinskaya et al. |
| 7,665,862 B2 | 2/2010 | Villard |
| 7,674,018 B2 | 3/2010 | Holder et al. |
| 7,679,281 B2 | 3/2010 | Kim et al. |
| 7,686,481 B1 | 3/2010 | Condon et al. |
| 7,690,810 B2 | 4/2010 | Saitoh et al. |
| 7,703,951 B2 | 4/2010 | Piepgras |
| 7,722,227 B2 | 5/2010 | Zhang |
| 7,727,009 B2 | 6/2010 | Goto |
| 7,731,395 B2 | 6/2010 | Parkyn et al. |
| 7,731,396 B2 | 6/2010 | Fay |
| 7,736,029 B2 | 6/2010 | Chen et al. |
| 7,737,634 B2 | 6/2010 | Leng et al. |
| 7,740,380 B2 | 6/2010 | Thrailkill |
| 7,744,259 B2 | 6/2010 | Walczak |
| 7,744,266 B2 | 6/2010 | Higley |
| 7,748,870 B2 | 7/2010 | Chang |
| 7,759,881 B1 | 7/2010 | Melanson |
| 7,766,508 B2 | 8/2010 | Villard et al. |
| 7,766,518 B2 | 8/2010 | Piepgras |
| 7,784,966 B2 | 8/2010 | Verfuerth |
| 7,785,124 B2 | 8/2010 | Lin |
| D625,870 S | 10/2010 | Feigenbaum |
| D626,094 S | 10/2010 | Alexander |
| 7,806,562 B2 | 10/2010 | Behr |
| 7,810,951 B1 | 10/2010 | Lee et al. |
| 7,810,955 B2 | 10/2010 | Stimac et al. |
| 7,810,995 B2 | 10/2010 | Fadler et al. |
| 7,813,111 B2 | 10/2010 | Anderson |
| 7,819,549 B2 | 10/2010 | Narendran et al. |
| D627,507 S | 11/2010 | Lai |
| D627,727 S | 11/2010 | Alexander |
| D628,156 S | 11/2010 | Alexander |
| 7,828,576 B2 | 11/2010 | Lin |
| 7,837,348 B2 | 11/2010 | Narendran et al. |
| 7,841,753 B2 | 11/2010 | Liu |
| D629,365 S | 12/2010 | Garcia De Vicuna |
| 7,845,393 B2 | 12/2010 | Kao |
| 7,857,482 B2 | 12/2010 | Reo et al. |
| 7,857,498 B2 | 12/2010 | Smith |
| 7,866,850 B2 | 1/2011 | Alexander |
| 7,874,700 B2 | 1/2011 | Patrick |
| D633,244 S | 2/2011 | Kramer et al. |
| D633,248 S | 2/2011 | Alexander |
| 7,889,421 B2 | 2/2011 | Narendran |
| 7,896,517 B2 | 3/2011 | Mandy |
| 7,901,108 B2 | 3/2011 | Kabuki et al. |
| 7,914,162 B1 | 3/2011 | Huang |
| 7,914,198 B2 | 3/2011 | Mier-Langner |
| 7,918,581 B2 | 4/2011 | Van De Ven |
| 7,918,589 B2 | 4/2011 | Mayfield, III et al. |
| 7,922,364 B2 | 4/2011 | Tessnow |
| 7,923,907 B2 | 4/2011 | Tessnow |
| 7,942,559 B2 | 5/2011 | Holder et al. |
| 7,952,114 B2 | 5/2011 | Gingrich, III |
| 7,965,494 B1 | 6/2011 | Morris |
| 7,972,038 B2 | 7/2011 | Albright |
| 7,972,054 B2 | 7/2011 | Alexander |
| 7,976,194 B2 | 7/2011 | Wilcox et al. |
| 7,985,005 B2 | 7/2011 | Alexander |
| 7,988,336 B1 | 8/2011 | Harbers |
| 7,993,031 B2 | 8/2011 | Grajcar |
| 8,002,438 B2 | 8/2011 | Ko |
| 8,007,131 B2 | 8/2011 | Liu et al. |
| D645,007 S | 9/2011 | Alexander |
| D645,594 S | 9/2011 | Grawe |
| 8,021,008 B2 | 9/2011 | Ramer |
| 8,029,157 B2 | 10/2011 | Li et al. |
| 8,033,680 B2 | 10/2011 | Sharrah |
| 8,052,310 B2 | 11/2011 | Gingrinch, III et al. |
| 8,066,403 B2 | 11/2011 | Sanfilippo et al. |
| D650,504 S | 12/2011 | Kim et al. |
| D650,935 S | 12/2011 | Beghelli |
| 8,080,819 B2 | 12/2011 | Mueller et al. |
| 8,083,364 B2 | 12/2011 | Allen |
| 8,096,668 B2 | 1/2012 | Abu-Ageel |
| 8,100,560 B2 | 1/2012 | Ahland, III et al. |
| 8,100,564 B2 | 1/2012 | Ono |
| 8,102,167 B2 | 1/2012 | Irissou et al. |
| 8,102,683 B2 | 1/2012 | Gaknoki et al. |
| D654,607 S | 2/2012 | Kim et al. |
| 8,118,450 B2 | 2/2012 | Villard |
| 8,118,454 B2 | 2/2012 | Rains, Jr. et al. |
| 8,123,376 B2 | 2/2012 | Van De Ven et al. |
| 8,125,776 B2 | 2/2012 | Alexander |
| D655,432 S | 3/2012 | Beghelli |
| D655,840 S | 3/2012 | Heaton et al. |
| D655,842 S | 3/2012 | Sabernig |
| 8,129,669 B2 | 3/2012 | Chen et al. |
| 8,136,958 B2 | 3/2012 | Verfuerth |
| 8,138,690 B2 | 3/2012 | Chemel et al. |
| 8,142,047 B2 | 3/2012 | Acampora et al. |
| 8,143,803 B2 | 3/2012 | Beij et al. |
| 8,152,336 B2 | 4/2012 | Alexander |
| 8,154,864 B1 | 4/2012 | Nearman |
| 8,162,498 B2 | 4/2012 | Ramer et al. |
| D659,871 S | 5/2012 | Lee et al. |
| D660,229 S | 5/2012 | Tseng |
| 8,172,425 B2 | 5/2012 | Wen et al. |
| 8,172,436 B2 | 5/2012 | Coleman |
| 8,177,395 B2 | 5/2012 | Alexander |
| 8,182,122 B2 | 5/2012 | Chiu |
| 8,191,613 B2 | 6/2012 | Yuan |
| 8,193,738 B2 | 6/2012 | Chu et al. |
| 8,201,965 B2 | 6/2012 | Yamada |
| 8,205,998 B2 | 6/2012 | Ramer et al. |
| 8,210,722 B2 | 7/2012 | Holder et al. |
| 8,212,469 B2 | 7/2012 | Rains, Jr. et al. |
| 8,215,798 B2 | 7/2012 | Rains, Jr. et al. |
| 8,232,745 B2 | 7/2012 | Chemel et al. |
| D665,340 S | 8/2012 | Obata |
| 8,242,766 B2 | 8/2012 | Gaknoki et al. |
| 8,292,482 B2 | 10/2012 | Harbers |
| 8,297,788 B2 | 10/2012 | Bishop |
| 8,297,792 B1 | 10/2012 | Wang |

(56) References Cited

U.S. PATENT DOCUMENTS

| | | |
|---|---|---|
| 8,297,808 B2 | 10/2012 | Yuan |
| 8,319,437 B2 | 11/2012 | Carlin |
| 8,324,838 B2 | 12/2012 | Shah et al. |
| 8,330,378 B2 | 12/2012 | Maehara et al. |
| 8,337,043 B2 | 12/2012 | Verfuerth |
| 8,344,602 B2 | 1/2013 | Lai |
| 8,360,609 B2 | 1/2013 | Lee et al. |
| 8,360,621 B2 | 1/2013 | Avila et al. |
| 8,385,071 B2 | 2/2013 | Lin |
| 8,403,541 B1 | 3/2013 | Rashidi |
| 8,410,716 B2 | 4/2013 | Yao et al. |
| 8,414,178 B2 | 4/2013 | Alexander |
| 8,434,898 B2 | 5/2013 | Sanfilippo et al. |
| 8,436,556 B2 | 5/2013 | Eisele et al. |
| 8,454,193 B2 | 6/2013 | Simon et al. |
| 8,459,841 B2 | 6/2013 | Huang |
| 8,462,523 B2 | 6/2013 | Gaknoki et al. |
| 8,469,542 B2 | 6/2013 | Zampini, II et al. |
| 8,503,083 B2 | 8/2013 | Seo |
| 8,529,102 B2 | 9/2013 | Pickard et al. |
| 8,531,134 B2 | 9/2013 | Chemel et al. |
| 8,536,802 B2 | 9/2013 | Chemel et al. |
| 8,536,805 B2 | 9/2013 | Shah et al. |
| 8,543,249 B2 | 9/2013 | Chemel et al. |
| D690,859 S | 10/2013 | Mollaghaffari |
| 8,545,045 B2 | 10/2013 | Tress |
| 8,545,049 B2 | 10/2013 | Davis et al. |
| 8,547,034 B2 | 10/2013 | Melanson et al. |
| 8,552,664 B2 | 10/2013 | Chemel et al. |
| 8,556,469 B2 | 10/2013 | Pickard |
| 8,558,518 B2 | 10/2013 | Irissou et al. |
| 8,562,180 B2 | 10/2013 | Alexander |
| 8,569,972 B2 | 10/2013 | Melanson |
| 8,573,807 B2 | 11/2013 | Borkar et al. |
| 8,573,816 B2 | 11/2013 | Negley et al. |
| 8,575,858 B2 | 11/2013 | Policy et al. |
| 8,579,467 B1 | 11/2013 | Szeto |
| 8,581,504 B2 | 11/2013 | Kost et al. |
| 8,581,521 B2 | 11/2013 | Welten et al. |
| 8,585,245 B2 | 11/2013 | Black et al. |
| 8,587,211 B2 | 11/2013 | Melanson |
| 8,593,074 B2 | 11/2013 | Hatley et al. |
| 8,593,129 B2 | 11/2013 | Gaknoki et al. |
| 8,593,814 B2 | 11/2013 | Ji |
| D694,925 S | 12/2013 | Fukasawa |
| 8,598,809 B2 | 12/2013 | Negley et al. |
| 8,602,591 B2 | 12/2013 | Lee |
| 8,610,364 B2 | 12/2013 | Melanson et al. |
| 8,610,365 B2 | 12/2013 | King et al. |
| 8,611,106 B2 | 12/2013 | Fang |
| 8,616,724 B2 | 12/2013 | Pickard |
| 8,624,505 B2 | 1/2014 | Huang |
| D699,179 S | 2/2014 | Alexander |
| 8,643,038 B2 | 2/2014 | Collins |
| 8,646,944 B2 | 2/2014 | Villard |
| 8,646,949 B2 | 2/2014 | Brunt, Jr. et al. |
| 8,652,357 B2 | 2/2014 | Ryu |
| 8,653,750 B2 | 2/2014 | Deurenberg et al. |
| D700,728 S | 3/2014 | Fukasawa |
| 8,684,556 B2 | 4/2014 | Negley et al. |
| 8,684,569 B2 | 4/2014 | Pickard et al. |
| 8,690,383 B2 | 4/2014 | Zampini, II et al. |
| 8,698,421 B2 | 4/2014 | Ludorf |
| D704,369 S | 5/2014 | Lindsley et al. |
| 8,723,427 B2 | 5/2014 | Collins et al. |
| 8,740,444 B2 | 6/2014 | Reynolds et al. |
| 8,742,684 B2 | 6/2014 | Melanson |
| 8,749,131 B2 | 6/2014 | Rains, Jr. et al. |
| 8,749,173 B1 | 6/2014 | Melanson et al. |
| 8,757,840 B2 | 6/2014 | Pickard et al. |
| 8,760,073 B2 | 6/2014 | Ko |
| 8,760,080 B2 | 6/2014 | Yu |
| 8,764,225 B2 | 7/2014 | Narendran et al. |
| 8,777,455 B2 | 7/2014 | Pickard et al. |
| 8,783,938 B2 | 7/2014 | Alexander |
| 8,786,201 B2 | 7/2014 | Hamamoto et al. |
| 8,786,210 B2 | 7/2014 | Delucia |
| 8,786,211 B2 | 7/2014 | Gilliom |
| 8,786,212 B2 | 7/2014 | Terazawa |
| 8,786,213 B2 | 7/2014 | Yang et al. |
| 8,791,642 B2 | 7/2014 | Van De Ven |
| 8,794,792 B1 | 8/2014 | Moghal |
| 8,796,948 B2 | 8/2014 | Weaver |
| 8,810,227 B2 | 8/2014 | Flaibani et al. |
| 8,814,385 B2 | 8/2014 | Onaka et al. |
| 8,816,593 B2 | 8/2014 | Lys et al. |
| 8,820,964 B2 | 9/2014 | Gould |
| 8,836,226 B2 | 9/2014 | Mercier et al. |
| 8,840,278 B2 | 9/2014 | Pickard |
| 8,847,515 B2 | 9/2014 | King et al. |
| 8,853,958 B2 | 10/2014 | Athalye et al. |
| 8,858,028 B2 | 10/2014 | Kim |
| 8,876,322 B2 | 11/2014 | Alexander |
| 8,888,315 B2 | 11/2014 | Edwards et al. |
| 8,888,506 B2 | 11/2014 | Nishimura |
| 8,901,838 B2 | 12/2014 | Akiyama et al. |
| D724,773 S | 3/2015 | Ryu |
| 8,970,101 B2 | 3/2015 | Sutardja |
| 9,010,967 B2 | 4/2015 | Jensen |
| 9,052,100 B2 | 6/2015 | Blackstone |
| 9,307,588 B2 | 4/2016 | Li |
| 2001/0006463 A1 | 7/2001 | Fischer |
| 2001/0053628 A1 | 12/2001 | Hayakawa |
| 2002/0046826 A1 | 4/2002 | Kao |
| 2002/0067613 A1 | 6/2002 | Grove |
| 2002/0106925 A1 | 8/2002 | Yamagishi |
| 2002/0117692 A1 | 8/2002 | Lin |
| 2003/0058658 A1 | 3/2003 | Lee |
| 2003/0072156 A1 | 4/2003 | Pohlert |
| 2003/0128543 A1 | 7/2003 | Rekow |
| 2003/0156416 A1 | 8/2003 | Stopa |
| 2003/0174517 A1 | 9/2003 | Kiraly et al. |
| 2003/0185005 A1 | 10/2003 | Sommers |
| 2003/0209963 A1 | 11/2003 | Altgilbers |
| 2004/0005800 A1 | 1/2004 | Hou |
| 2004/0090781 A1 | 5/2004 | Yeoh |
| 2004/0090784 A1 | 5/2004 | Ward |
| 2004/0212991 A1 | 10/2004 | Galli |
| 2004/0218372 A1 | 11/2004 | Hamasaki |
| 2005/0032402 A1 | 2/2005 | Takanashi |
| 2005/0047170 A1 | 3/2005 | Hilburger |
| 2005/0083698 A1 | 4/2005 | Zampini |
| 2005/0122713 A1 | 6/2005 | Hutchins |
| 2005/0130336 A1 | 6/2005 | Collins, III |
| 2005/0146884 A1 | 7/2005 | Scheithauer |
| 2005/0174780 A1 | 8/2005 | Park |
| 2005/0205878 A1 | 9/2005 | Kan |
| 2005/0242362 A1 | 11/2005 | Shimizu |
| 2005/0269060 A1 | 12/2005 | Ku |
| 2005/0270775 A1 | 12/2005 | Harbers |
| 2005/0286265 A1 | 12/2005 | Zampini et al. |
| 2006/0001381 A1 | 1/2006 | Robinson |
| 2006/0039156 A1 | 2/2006 | Chen |
| 2006/0062019 A1 | 3/2006 | Young |
| 2006/0076672 A1 | 4/2006 | Petroski |
| 2006/0141851 A1 | 6/2006 | Matsui |
| 2006/0146422 A1 | 7/2006 | Koike |
| 2006/0146531 A1 | 7/2006 | Reo et al. |
| 2006/0152140 A1 | 7/2006 | Brandes |
| 2006/0221272 A1 | 10/2006 | Negley et al. |
| 2006/0262544 A1 | 11/2006 | Piepgras |
| 2006/0262545 A1 | 11/2006 | Piepgras |
| 2007/0025103 A1 | 2/2007 | Chan |
| 2007/0064428 A1 | 3/2007 | Beauchamp |
| 2007/0096057 A1 | 5/2007 | Hampden-Smith |
| 2007/0109795 A1 | 5/2007 | Gabrius |
| 2007/0139923 A1 | 6/2007 | Negley et al. |
| 2007/0153521 A1 | 7/2007 | Konuma |
| 2007/0158668 A1 | 7/2007 | Tarsa et al. |
| 2007/0170447 A1 | 7/2007 | Negley et al. |
| 2007/0223219 A1 | 9/2007 | Medendorp et al. |
| 2007/0238327 A1 | 10/2007 | Hsu |
| 2007/0242461 A1 | 10/2007 | Reisenauer |
| 2007/0253201 A1 | 11/2007 | Blincoe |

(56) References Cited

U.S. PATENT DOCUMENTS

| | | |
|---|---|---|
| 2007/0253202 A1 | 11/2007 | Wu |
| 2007/0253209 A1 | 11/2007 | Loh et al. |
| 2007/0268698 A1 | 11/2007 | Chen et al. |
| 2007/0269915 A1 | 11/2007 | Leong et al. |
| 2007/0275576 A1 | 11/2007 | Yang |
| 2007/0285028 A1 | 12/2007 | Tsinker et al. |
| 2007/0295969 A1 | 12/2007 | Chew et al. |
| 2007/0297177 A1 | 12/2007 | Wang |
| 2008/0012036 A1 | 1/2008 | Loh et al. |
| 2008/0013316 A1 | 1/2008 | Chiang |
| 2008/0043470 A1 | 2/2008 | Wimberly |
| 2008/0076272 A1 | 3/2008 | Hsu |
| 2008/0080190 A1 | 4/2008 | Walczak |
| 2008/0084700 A1 | 4/2008 | Van De Ven |
| 2008/0106907 A1 | 5/2008 | Trott |
| 2008/0112121 A1 | 5/2008 | Cheng |
| 2008/0117500 A1 | 5/2008 | Narendran et al. |
| 2008/0121921 A1 | 5/2008 | Loh et al. |
| 2008/0130275 A1 | 6/2008 | Higley |
| 2008/0142194 A1 | 6/2008 | Zhou |
| 2008/0157112 A1 | 7/2008 | He |
| 2008/0158881 A1* | 7/2008 | Liu ........................ F21V 7/0091 362/245 |
| 2008/0158887 A1 | 7/2008 | Zhu |
| 2008/0165530 A1 | 7/2008 | Hendrikus |
| 2008/0173884 A1 | 7/2008 | Chitnis et al. |
| 2008/0179611 A1 | 7/2008 | Chitnis et al. |
| 2008/0192478 A1 | 8/2008 | Chen |
| 2008/0198112 A1 | 8/2008 | Roberts |
| 2008/0219002 A1 | 9/2008 | Sommers et al. |
| 2008/0219303 A1 | 9/2008 | Chen et al. |
| 2008/0224598 A1 | 9/2008 | Baretz |
| 2008/0224631 A1 | 9/2008 | Melanson |
| 2008/0274641 A1 | 11/2008 | Weber |
| 2008/0308825 A1 | 12/2008 | Chakraborty et al. |
| 2009/0021936 A1 | 1/2009 | Stimac et al. |
| 2009/0026913 A1 | 1/2009 | Mrakovich |
| 2009/0034283 A1 | 2/2009 | Albright |
| 2009/0046464 A1 | 2/2009 | Liu |
| 2009/0050907 A1 | 2/2009 | Yuan et al. |
| 2009/0050908 A1 | 2/2009 | Yuan et al. |
| 2009/0052158 A1 | 2/2009 | Bierhuizen |
| 2009/0080185 A1 | 3/2009 | McMillan |
| 2009/0086474 A1 | 4/2009 | Chou |
| 2009/0091935 A1 | 4/2009 | Tsai |
| 2009/0103299 A1 | 4/2009 | Boyer et al. |
| 2009/0129084 A1 | 5/2009 | Tsao |
| 2009/0141500 A1 | 6/2009 | Peng |
| 2009/0154166 A1 | 6/2009 | Zhang |
| 2009/0161360 A1* | 6/2009 | Li ........................... F21V 5/048 362/235 |
| 2009/0167203 A1 | 7/2009 | Dahlman et al. |
| 2009/0180276 A1* | 7/2009 | Benitez ................ G02B 6/0036 362/97.4 |
| 2009/0184616 A1 | 7/2009 | Van De Ven et al. |
| 2009/0195168 A1 | 8/2009 | Greenfeld |
| 2009/0225551 A1 | 9/2009 | Chang et al. |
| 2009/0236997 A1 | 9/2009 | Liu |
| 2009/0294114 A1 | 12/2009 | Yang |
| 2009/0296388 A1 | 12/2009 | Wu et al. |
| 2009/0310354 A1 | 12/2009 | Zampini, II et al. |
| 2009/0317988 A1 | 12/2009 | Lin |
| 2010/0015821 A1 | 1/2010 | Hsu |
| 2010/0019697 A1 | 1/2010 | Korsunsky |
| 2010/0026158 A1 | 2/2010 | Wu |
| 2010/0027258 A1 | 2/2010 | Maxik |
| 2010/0060202 A1 | 3/2010 | Melanson et al. |
| 2010/0072505 A1 | 3/2010 | Gingrich, III |
| 2010/0073783 A1 | 3/2010 | Sun |
| 2010/0073884 A1 | 3/2010 | Peloza |
| 2010/0091487 A1 | 4/2010 | Shin |
| 2010/0091497 A1 | 4/2010 | Chen |
| 2010/0102696 A1 | 4/2010 | Sun |
| 2010/0110684 A1 | 5/2010 | Abdelsamed et al. |
| 2010/0110728 A1 | 5/2010 | Dubrow et al. |
| 2010/0128484 A1 | 5/2010 | Peng |
| 2010/0132918 A1 | 6/2010 | Lin |
| 2010/0141173 A1 | 6/2010 | Negrete |
| 2010/0142189 A1 | 6/2010 | Hong |
| 2010/0149818 A1 | 6/2010 | Ruffin |
| 2010/0157605 A1 | 6/2010 | Chang |
| 2010/0174345 A1 | 7/2010 | Ashdown |
| 2010/0195323 A1 | 8/2010 | Schaefer et al. |
| 2010/0230709 A1 | 9/2010 | Kanno |
| 2010/0238630 A1 | 9/2010 | Xu |
| 2010/0243219 A1 | 9/2010 | Yang |
| 2010/0246179 A1 | 9/2010 | Long |
| 2010/0260945 A1 | 10/2010 | Kites |
| 2010/0284181 A1 | 11/2010 | O'Brien et al. |
| 2010/0296289 A1 | 11/2010 | Villard et al. |
| 2010/0301360 A1 | 12/2010 | Van De Ven |
| 2010/0301774 A1 | 12/2010 | Chemel et al. |
| 2010/0308742 A1 | 12/2010 | Melanson |
| 2010/0319953 A1 | 12/2010 | Yochum |
| 2011/0013397 A1 | 1/2011 | Catone et al. |
| 2011/0043129 A1 | 2/2011 | Koolen |
| 2011/0044046 A1 | 2/2011 | Abu-Ageel |
| 2011/0049749 A1 | 3/2011 | Bailey |
| 2011/0050100 A1 | 3/2011 | Bailey |
| 2011/0050101 A1 | 3/2011 | Bailey |
| 2011/0050124 A1 | 3/2011 | Bailey |
| 2011/0051407 A1 | 3/2011 | St. Ives et al. |
| 2011/0051414 A1 | 3/2011 | Bailey |
| 2011/0090684 A1 | 4/2011 | Logan et al. |
| 2011/0097921 A1 | 4/2011 | Hsu |
| 2011/0103070 A1 | 5/2011 | Zhang et al. |
| 2011/0115381 A1 | 5/2011 | Carlin |
| 2011/0122643 A1 | 5/2011 | Spork |
| 2011/0134634 A1 | 6/2011 | Gingrich, III |
| 2011/0136374 A1 | 6/2011 | Mostoller |
| 2011/0140620 A1 | 6/2011 | Lin et al. |
| 2011/0180841 A1 | 7/2011 | Chang |
| 2011/0193490 A1 | 8/2011 | Kumar |
| 2011/0210360 A1 | 9/2011 | Negley |
| 2011/0222270 A1 | 9/2011 | Porciatti |
| 2011/0222277 A1 | 9/2011 | Negley |
| 2011/0253358 A1 | 10/2011 | Huang |
| 2011/0255287 A1 | 10/2011 | Li |
| 2011/0273079 A1 | 11/2011 | Pickard |
| 2011/0279015 A1 | 11/2011 | Negley |
| 2011/0285308 A1 | 11/2011 | Crystal |
| 2011/0285314 A1 | 11/2011 | Carney et al. |
| 2011/0292483 A1 | 12/2011 | Pakhchyan et al. |
| 2011/0306219 A1 | 12/2011 | Swanger |
| 2011/0309773 A1 | 12/2011 | Beers |
| 2011/0316441 A1 | 12/2011 | Huynh |
| 2011/0316446 A1 | 12/2011 | Kang et al. |
| 2012/0002417 A1 | 1/2012 | Li |
| 2012/0014115 A1 | 1/2012 | Park et al. |
| 2012/0018754 A1 | 1/2012 | Lowes |
| 2012/0019127 A1 | 1/2012 | Hirosaki |
| 2012/0021623 A1 | 1/2012 | Gorman |
| 2012/0025729 A1 | 2/2012 | Melanson et al. |
| 2012/0038280 A1 | 2/2012 | Zoorob et al. |
| 2012/0038291 A1 | 2/2012 | Hasnain |
| 2012/0051048 A1 | 3/2012 | Smit |
| 2012/0051056 A1 | 3/2012 | Derks |
| 2012/0051068 A1 | 3/2012 | Pelton |
| 2012/0092860 A1 | 4/2012 | Blackstone |
| 2012/0106152 A1 | 5/2012 | Zheng |
| 2012/0112661 A1 | 5/2012 | Van De Ven |
| 2012/0119658 A1 | 5/2012 | McDaniel |
| 2012/0140468 A1 | 6/2012 | Chang |
| 2012/0140474 A1 | 6/2012 | Jurik et al. |
| 2012/0146519 A1 | 6/2012 | Briggs |
| 2012/0169242 A1 | 7/2012 | Olson |
| 2012/0175653 A1 | 7/2012 | Weber |
| 2012/0187830 A1 | 7/2012 | Shum |
| 2012/0223657 A1 | 9/2012 | Van De Ven |
| 2012/0224177 A1 | 9/2012 | Harbers et al. |
| 2012/0236553 A1 | 9/2012 | Cash |
| 2012/0250309 A1 | 10/2012 | Handsaker |
| 2012/0268894 A1 | 10/2012 | Alexander |
| 2012/0286304 A1 | 11/2012 | Letoquin |

(56) References Cited

U.S. PATENT DOCUMENTS

| | | |
|---|---|---|
| 2012/0286319 A1 | 11/2012 | Lee |
| 2012/0287642 A1 | 11/2012 | Zeng |
| 2012/0292660 A1 | 11/2012 | Kanno |
| 2012/0307487 A1 | 12/2012 | Eckel |
| 2012/0307494 A1 | 12/2012 | Zlotnikov et al. |
| 2012/0313124 A1 | 12/2012 | Clatterbuck |
| 2013/0002167 A1 | 1/2013 | Van De Ven |
| 2013/0003370 A1 | 1/2013 | Watanabe |
| 2013/0003388 A1 | 1/2013 | Jensen |
| 2013/0026942 A1 | 1/2013 | Ryan |
| 2013/0042510 A1 | 2/2013 | Nall et al. |
| 2013/0049602 A1 | 2/2013 | Raj |
| 2013/0049603 A1 | 2/2013 | Bradford |
| 2013/0049627 A1 | 2/2013 | Roberts |
| 2013/0069561 A1 | 3/2013 | Melanson et al. |
| 2013/0070441 A1 | 3/2013 | Moon |
| 2013/0070442 A1 | 3/2013 | Negley |
| 2013/0082612 A1 | 4/2013 | Kim |
| 2013/0083510 A1 | 4/2013 | Park |
| 2013/0094225 A1 | 4/2013 | Leichner |
| 2013/0095673 A1 | 4/2013 | Brandon |
| 2013/0140490 A1 | 6/2013 | Fujinaga |
| 2013/0162140 A1 | 6/2013 | Shamoto et al. |
| 2013/0170220 A1* | 7/2013 | Bueeler ............ F21K 9/00 362/296.01 |
| 2013/0170221 A1 | 7/2013 | Isogai et al. |
| 2013/0176728 A1 | 7/2013 | Bizzotto et al. |
| 2013/0193869 A1 | 8/2013 | Hong et al. |
| 2013/0221489 A1 | 8/2013 | Cao et al. |
| 2013/0229114 A1 | 9/2013 | Eisele et al. |
| 2013/0229804 A1 | 9/2013 | Holder et al. |
| 2013/0235555 A1 | 9/2013 | Tanaka |
| 2013/0235579 A1 | 9/2013 | Smith |
| 2013/0235580 A1 | 9/2013 | Smith |
| 2013/0241392 A1 | 9/2013 | Pickard et al. |
| 2013/0241440 A1 | 9/2013 | Gaknoki et al. |
| 2013/0249434 A1 | 9/2013 | Medendorp |
| 2013/0250573 A1 | 9/2013 | Taskar et al. |
| 2013/0250581 A1 | 9/2013 | Tang et al. |
| 2013/0258636 A1 | 10/2013 | Rettke |
| 2013/0265777 A1 | 10/2013 | Zollers et al. |
| 2013/0300303 A1 | 11/2013 | Liu |
| 2013/0301252 A1 | 11/2013 | Hussell et al. |
| 2013/0322072 A1 | 12/2013 | Pu et al. |
| 2014/0015419 A1 | 1/2014 | Shah et al. |
| 2014/0016318 A1 | 1/2014 | Pokrajac |
| 2014/0036510 A1 | 2/2014 | Preston et al. |
| 2014/0043813 A1 | 2/2014 | Dube' et al. |
| 2014/0048743 A1 | 2/2014 | Le-Mercier |
| 2014/0049241 A1 | 2/2014 | Gaknoki et al. |
| 2014/0049962 A1 | 2/2014 | Holder et al. |
| 2014/0055038 A1 | 2/2014 | Cappitelli et al. |
| 2014/0055054 A1 | 2/2014 | Borkar et al. |
| 2014/0062330 A1 | 3/2014 | Neundorfer |
| 2014/0063779 A1 | 3/2014 | Bradford |
| 2014/0071685 A1 | 3/2014 | Black et al. |
| 2014/0071696 A1 | 3/2014 | Park, II et al. |
| 2014/0078715 A1 | 3/2014 | Pickard et al. |
| 2014/0078722 A1 | 3/2014 | Caldwell et al. |
| 2014/0078746 A1 | 3/2014 | Caldwell et al. |
| 2014/0103796 A1 | 4/2014 | Jansen |
| 2014/0126205 A1 | 5/2014 | Davis et al. |
| 2014/0126224 A1 | 5/2014 | Brunt, Jr. et al. |
| 2014/0134880 A1 | 5/2014 | Yeh |
| 2014/0140052 A1 | 5/2014 | Villard |
| 2014/0159077 A1 | 6/2014 | Kuenzler |
| 2014/0159600 A1 | 6/2014 | Sutardja |
| 2014/0167601 A1 | 6/2014 | Harry |
| 2014/0167646 A1 | 6/2014 | Zukauskas et al. |
| 2014/0176016 A1 | 6/2014 | Li |
| 2014/0198531 A1 | 7/2014 | Iwasaki |
| 2014/0217433 A1 | 8/2014 | Tudorica |
| 2014/0217907 A1 | 8/2014 | Harris |
| 2014/0218909 A1 | 8/2014 | Tetsuo et al. |
| 2014/0225511 A1 | 8/2014 | Pickard et al. |
| 2014/0225532 A1 | 8/2014 | Groeneveld |
| 2014/0233193 A1 | 8/2014 | Alexander |
| 2014/0268631 A1 | 9/2014 | Pickard |
| 2014/0268724 A1 | 9/2014 | Yanping |
| 2014/0268737 A1 | 9/2014 | Athalye et al. |
| 2014/0286016 A1 | 9/2014 | Montagne |
| 2014/0286018 A1 | 9/2014 | Zhang et al. |
| 2014/0361701 A1 | 12/2014 | Siessegger et al. |
| 2014/0367633 A1 | 12/2014 | Bibl |
| 2015/0002034 A1 | 1/2015 | Van De Ven |
| 2015/0029717 A1 | 1/2015 | Shen et al. |
| 2015/0036339 A1 | 2/2015 | Ashdown et al. |
| 2015/0043218 A1 | 2/2015 | Hu |
| 2015/0060922 A1 | 3/2015 | Wilcox |
| 2015/0236225 A1 | 8/2015 | David |
| 2015/0295144 A1 | 10/2015 | Weiler |
| 2016/0174319 A1 | 6/2016 | Li |

FOREIGN PATENT DOCUMENTS

| | | |
|---|---|---|
| CN | 201739849 A | 2/2011 |
| CN | 202040752 A | 11/2011 |
| CN | 102269351 A | 12/2011 |
| GB | 2457016 A | 8/2009 |
| JP | 61-070306 U | 5/1986 |
| JP | 2003-092022 A | 3/2003 |
| JP | 2004-179815 A | 6/2004 |
| JP | 2004-265626 A | 9/2004 |
| JP | 2005-017554 A | 1/2005 |
| JP | 2005-071818 A | 3/2005 |
| JP | 2005-235778 A | 9/2005 |
| JP | 2005-267964 A | 9/2005 |
| JP | 2006-236796 A | 9/2006 |
| JP | 2006-253274 A | 9/2006 |
| JP | 2006-310138 A | 11/2006 |
| JP | D1307268 B | 8/2007 |
| JP | D1307434 B | 8/2007 |
| JP | 2007-273205 A | 10/2007 |
| JP | 2007-273209 A | 10/2007 |
| JP | 2011-508406 A | 3/2011 |
| JP | 2011-204495 A | 10/2011 |
| JP | 2011-204658 A | 10/2011 |
| KR | 1020070039683 A | 4/2007 |
| KR | 1020090013704 A | 2/2009 |
| KR | 100974942 B1 | 8/2010 |
| KR | 1020120050280 A | 5/2012 |
| TW | 2004-25542 A | 11/2004 |
| TW | 290967 M | 5/2006 |
| TW | 296481 M | 8/2006 |
| TW | 1273858 B | 2/2007 |
| TW | 1318461 B | 12/2009 |
| WO | DM/057383 B | 9/2001 |
| WO | 02/12788 A1 | 2/2002 |
| WO | 02/15281 A2 | 2/2002 |
| WO | 2004/071143 A1 | 8/2004 |
| WO | 2005/093862 A2 | 10/2005 |
| WO | 2006/066531 A1 | 6/2006 |
| WO | 2006066531 A1 | 6/2006 |
| WO | 2007/128070 A1 | 11/2007 |
| WO | 2008/108832 A1 | 9/2008 |
| WO | 2009/044330 A1 | 4/2009 |
| WO | 2009108799 A1 | 9/2009 |
| WO | 2009/120555 A1 | 10/2009 |
| WO | 2010/016002 A1 | 2/2010 |
| WO | 2010059647 A1 | 5/2010 |
| WO | 2011019945 A1 | 2/2011 |
| WO | 2013059298 A1 | 4/2013 |
| WO | 2013192014 A2 | 12/2013 |
| WO | 2013192014 A3 | 12/2013 |
| WO | 2014099681 A2 | 6/2014 |
| WO | 2014099681 A3 | 12/2014 |

OTHER PUBLICATIONS

Acuity Brands Lighting Inc. Product Catalog, downloaded from www.acuitybrands.com, dated Apr. 2013, 90pp.
Acuity Brands, "A Guided Tour of Area Light Sources—Past, Present and Future," downloaded from www.acuitybrands.com, version dated Jun. 20, 2013, 72pp.

(56) References Cited

OTHER PUBLICATIONS

Alanod GmbH, "WhiteOptics," downloaded from www.alanod.com, dated Apr. 2014, 12pp.

Altman Lighting, "Spectra Cube," downloaded from http://altmanstagelighting.com/altman-led-green-lighting/led-spectra-cube/Altman-Spectra-Cube-Data-Sheet-v3.pdf on May 28, 2014, 1p.

Bega Lighting, "In-ground luminaire RGBW IP 67 Product data sheet," downloaded from http://www.bega.com/download/datenblaetter/en/7926.pdf on May 28, 2014, 1p.

CORM 2011 Conference, Gaithersburg, MD, "Calculation of CCT and Duv and Practical Conversion Formulae," dated May 3-5, 2011, National Institute of Standards and Technology, 28pp.

Lumitronix, "Carclo lens for side emitting 360 degrees," downloaded from http://www.leds.de/en/High-Power-LEDs/Lenses-and-optics/Carclo-lens-for-side-emitting-360.html on May 28, 2014, 2pp.

"Introduction to Catmull-Rom Splines," downloaded on Aug. 7, 2015 from www.mvps.org/directx/articles/catmull/, 2pp.

Wikipedia, "CIE 1931 color space," version dated Apr. 23, 2014, downloaded from www.wikipedia.org, 12pp.

Osram Sylvania, "ColorCalculator User Guide", downloaded on Jun. 3, 2014 from www.sylvania.com, 44pp.

Osram Sylvania, "ColorCalculator User Guide", downloaded on Oct. 19, 2015 from www.sylvania.com, 50pp.

Kenneth Kelly, "Color Designations for Lights," U.S. Department of Commerce, National Bureau of Standards, Research Paper RP1565, Journal of Research of the National Bureau of Standards, vol. 31, Nov. 1943, pp. 271-278.

Philips Color Kinetics, "LED Cove Lighting," downloaded on May 28, 2014 from http://www.colorkinetics.com/ls/guides-brochures/pck-led-cove-lighting.pdf, 32pp.

Philips Color Kinetics, "IntelliWhite LED Lighting Systems," downloaded on May 28, 2014 from http://www.colorkinetics.com/ls/intelliwhite/, 2pp.

Philips Color Kinetics, "Color-Changing LED Lighting Systems," downloaded on May 27, 2014 from http://www.colorkinetics.com/ls/rgb/, 2pp.

Wikipedia, "Color temperature," version dated May 21, 2014, downloaded on Jun. 3, 2014 from www.wikipedia.org, 17pp.

Cree, "LED Color Mixing: Basics and Background," downloaded on Sep. 24, 2014 from www.cree.com, 24pp.

Cree, "Cree(r) LMH2 LED Modules," Product Family Data Sheet, downloaded on May 27, 2014 from http://www.cree.com/~/media/Files/Cree/LED%20Components%20and%20Modules/Modules/Data%20Sheets/LEDModules_LMH2.pdf, 18pp.

"Dialight ES Series RGB LED Luminaire," downloaded on May 28, 2014 from http://www.dialight.com/Assets/Brochures_And_Catalogs/Illumination/MDEXESTEMORGB_A.pdf, 2pp.

Naomi Miller, "Color Spaces and Planckian Loci: Understanding all those Crazy Color Metrics," U.S Department of Energy, Pacific Northwest National Laboratory, Portland, Oregon, downloaded on May 30, 2014, 49pp.

Kahen, Keith, "High-Efficiency Colloidal Quantum Dot Phosphors," University at Buffalo, SUNY, DOE SSL R&D Workshop, Long Beach, California, Jan. 29-31, 2013, 12pp.

Bush, Steve, "Chip gives dim-to-warm LED lighting without MCU," dated Apr. 1, 2014, downloaded from http://www.electronicsweekly.com/news/components/led-lighting/chip-gives-dim-warm-led-lighting-without-mcu-2014-04/, 6pp.

"Ecosense to reveal new TROV LED Linear Platform at 2015 Lightfair International in New York City," May 4, 2015, blog downloaded from www.ecosense.com, 3pp.

"Ecosense to reveal new TROV LED Linear Platform at 2015 Lightfair International in New York City," May 4, 2015, press release downloaded from www.ecosense.com, 2pp.

Freyssinier, Jean P. et al., "Class A Color Designation for Light Sources Used in General Illumination," J. Light & Vis. Env., vol. 37, Nos. 2-3, Nov. 7, 2013, pp. 10-14.

Freyssinier, Jean P. et al., "White Lighting: A Provisional Model for Predicting Perceived Tint in 'White' Illumination," Color Res. & App'n, vol. 39, No. 5, Oct. 2014, pp. 466-479.

Freyssinier, Jean P. et al., "The Class A Color Designation for Light Sources," Rensselaer Polytechnic Institute, 2013 DOE Solid-State Lighting R&D Workshop, Hilton Long Beach, California, Jan. 29-31, 2013, 26pp.

Freyssinier, Jean P. et al., "Class A Lighting," Rensselaer Polytechnic Institute, Strategies in Light 2012, 27 pp.

Freyssinier, Jean P. et al., "White Lighting," Color Res. & App'n, (volume unknown), Sep. 3, 2011, downloaded from http://www.lrc.rpi.edu/programs/solidstate/assist/pdf/SIL-2012_FreyssinierRea_WhiteLighting.pdf, 12pp.

Rea et al., "White lighting for residential applications," Lighting Res. Technol., Mar. 27, 2012, downloaded from www.sagepublications.com at http://lrt.sagepub.com/content/early/2012/03/27/1477153512442936, 15pp.

Oh, Jeong et al., "Full down-conversion of amber-emitting phosphor-converted light-emitting diodes with powder phosphors and a long-wave pass filter," Optics Express, vol. 18, No. 11, May 24, 2010, pp. 11063-11072.

"Microcellular Reflective Sheet MCPET," downloaded on Feb. 3, 2015 from www.furukawa.co.jp/foam/, 6pp.

"Aculux—Black Body Dimming and Tunable White Responsive Technologies," downloaded on May 28, 2014 from http://www.junolightinggroup.com/literature/LIT-AX-LED-BBD-TW.pdf, 28pp.

"Khatod—Symmetric & Asymmetric Strip Lens," downloaded on May 5, 2015 from www.khatod.com, 3pp.

"KKDC Catalog 2.0," downloaded on May 28, 2014 from http://www.kkdc.co.uk/media/kkdc-catalogue.pdf, 134pp.

"KKDC UK—Linear LED Lighting," downloaded from www.kkdc.co.uk/application/interior.php on Oct. 22, 2015, 5pp.

Overton, Gail, "LEDs: White LED comprises blue LED and inexpensive dye," LaserFocusWorld, Feb. 12, 2013, downloaded from http://www.laserfocusworld.com/articles/print/volume-49/issue-02/world-news/leds--white-led-comprises-blue-led-and-inexpensive-dye.html, 5pp.

"LEDIL TIR Lens Guide," downloaded from www.ledil.com on Jan. 22, 2015, 8pp.

"LED Linear—linear lighting solutions, product overview," downloaded on May 28, 2014 from http://www.led-linear.com/en/product-overview/system-catalogue/, 3pp.

"LEDnovation—BR30 Warm Dimming," downloaded on May 28, 2014 from www.lednovation.com/products/BR30_LED.asp, 2pp.

Wikipedia, "Lenticular lens," downloaded on Feb. 18, 2015 from www.wikipedia.org, 5pp.

"Lenticular Sheets," downloaded on Feb. 24, 2015 from www.lenticular-sheets.lpceurope.eu/, 2pp.

Unzner, Norbert, "Light Analysis in lighting technology," B&S Electronische Geralte GmbH, 2001, 14pp.

"Lightolier—Solid-State Lighting," downloaded on May 28, 2014 from http://www.lightolier.com/prospots/leds_solidstate.jsp, 1p.

Wikipedia, "Line of purples," downloaded on Oct. 20, 2015 from www.wikipedia.org, 2pp.

"Lumenbeam Catalog," downloaded on May 27, 2014 from 11_160_en_lumenpulse_lumenbeam_rgb_lbl_rgb_brochure.zip, 63pp.

"Lumenetix—Araya Technology," downloaded on May 28, 2014 from www.lumenetix.com/araya-technology, 3pp.

"Lumenpulse—Lumenbeam Large Color Changing,", downloaded on May 27, 2014 from www.lumenpulse.com/en/product/11/lumenbeam-large-color-changing, 4pp.

"Lumenpulse—Lumencove Family," downloaded on May 28, 2014 from http://www.lumenpulse.com/en/products#!3/0/0/0/0/0, 2pp.

Petluri et al., U.S. Appl. No. 14/526,504, filed Oct. 28, 2014, entitled "Lighting Systems Having Multiple Light Sources," 92pp.

Fletcher et al., U.S. Appl. No. 29/533,667, filed Jul. 20, 2015, entitled "LED Luminaire Having a Mounting System," 10pp.

Pickard et al., U.S. Appl. No. 14/617,849, filed Feb. 9, 2015, entitled "Lighting Systems Generating Controlled and Wavelength-Converted Light Emissions," 83pp.

(56) References Cited

OTHER PUBLICATIONS

Rodgers et al., U.S. Appl. No. 14/702,800, filed May 4, 2015, entitled "Lighting Systems Including Asymmetric Lens Modules for Selectable Light Distribution," 116pp.
Pickard et al., U.S. Appl. No. 14/636,205, filed Mar. 3, 2015, entitled "Low-Profile Lighting System Having Pivotable Lighting Enclosure," 56pp.
Fletcher et al., U.S. Appl. No. 14/702,765, filed May 4, 2015, entitled "Lighting System Having a Sealing System," 92pp.
Fletcher et al., U.S. Appl. No. 29/519,149, filed Mar. 3, 2015, entitled "LED Luminaire," 8pp.
Fletcher et al., U.S. Appl. No. 29/519,153, filed Mar. 3, 2015, entitled "LED Luminaire," 8pp.
Fletcher et al., U.S. Appl. No. 14/816,827, filed Aug. 3, 2015, entitled "Lighting System Having a Mounting Device," 126pp.
Rodgers et al., U.S. Appl. No. 62/202,936, filed Aug. 10, 2015, entitled "Optical Devices and Systems Having a Converging Lens With Grooves," 133pp.
Fletcher et al., U.S. Appl. No. 29/532,383, filed Jul. 6, 2015, entitled "LED Luminaire Having a Mounting System," 10pp.
Fletcher et al., U.S. Appl. No. 29/533,635, filed Jul. 20, 2015, entitled "LED Luminaire Having a Mounting System," 10pp.
Fletcher et al., U.S. Appl. No. 29/533,666, filed Jul. 20, 2015, entitled "LED Luminaire Having a Mounting System," 10pp.
Knight, Colette, "XICATO—Investigations on the use of LED modules for optimized color appearance in retail applications," downloaded on May 28, 2014 from http://www.xicato.com/sites/default/files/documents/Summary_Investigations_on_the_use_of_LED_modules_for_optimized_color_appearance_in_retail_applications.pdf, 5pp.
"Zumtobel—IYON Tunable White,", downloaded on Oct. 19, 2015 from http://www.zumtobel.com/tunablewhite/en/index.html#topic_04, 1p.
"Zumtobel—IYON LED Spotlight Catalog," downloaded on Oct. 19, 2015 from http://www.zumtobel.com/PDB/Ressource/teaser/en/com/Iyon.pdf, 40pp.
"Lumenpulse—Lumenbeam Large Pendant Dynamic White," downloaded on May 28, 2014 from http://www.lumenpulse.com/en/product/72/lumenbeam-large-pendant-dynamic-white, 1p.
"Lumileds Application Brief AB08—Optical Testing for SuperFlux, SnapLED and Luxeon Emitters," downloaded on Sep. 24, 2014 from www.lumileds.com, 15pp.
"CandlePowerForums—SOLD: Luxeon III side-emitter white LED," downloaded on May 28, 2014 from http://www.candlepowerforums.com/vb/showthread.php?140276-SOLD-Luxeon-III-side-emitter-white-LED, 4pp.
"Lumileds Luxeon Z,", downloaded on May 2, 2015 from www.lumileds.com, 2pp.
"Alanod MIRO Catalog," downloaded on Jan. 30, 2015 from www.alanod.com, 8pp.
"Nanoco Group—Cadmium Free Quantum Dots," downloaded on May 30, 2014 from www.nanocotechnologies.com/what-we-do/products/cadmium-free-quantum-dots, 3pp.
"Nanosys—Quantum Dots," downloaded on May 30, 2014 from www.nanosysinc.com/what-we-do/quantum-dots/, 3pp.
"Ocean NanoTech—Products," downloaded on May 30, 2014 from www.oceannanotech.com/Products.php, 1p.
"NNCrystal—blog post—May 17, 2010," downloaded from http://led-lights-led.blogspot.com/2010/05/nncrystal-us-corporation-to-supply.html, 4pp.
"A Warmer, Cozier White Light: NXP Transforms LED Color Quality," dated Jan. 9, 2013, downloaded from http://www.nxp.com/news/press-releases/2013/01/a-warmer-cozier-white-light-nxp-transforms-led-color-quality.html, 2pp.
"Lighting Global Technical Notes, Optical Control Techniques for Off-grid Lighting Products," Jul. 2011 and May 2012, 6pp.
"Pacific Light Technologies—Quantum Dots in Solid State Lighting," downloaded on Oct. 23, 2015 from www.pacificlighttech.com/quantum-dots-in-ssl/, 2pp.

"Philips Lighting—Dim Tone,", downloaded on May 27, 2014 from www.usa.lighting.philips.com/lightcommunity/trends/led/dimtone/, 1p.
"Philips—Dimmable to warm light for the perfect ambience," downloaded on May 27, 2014 from www.usa.lighting.philips.com, 2pp.
"Philips—Turn up Ambience and Tone Down Energy Use with Philips BR30 DimTone," downloaded on May 27, 2014 from www.usa.lighting.philips.com, 11pp.
Wikipedia, "Planckian locus," downloaded on May 30, 2014 from www.wikipedia.org, 5pp.
Wikipedia, "Quantum dot,", downloaded on May 30, 2014 from http://en.wikipedia.org/wiki/Quantum_dot, 15pp.
"Phosphortech—Flexible Phosphor Sheet—RadiantFlex Datasheet," Aug. 2014, downloaded from www.phosphortech.com, 10pp.
Wikipedia, "Reflectivity,", downloaded on Jan. 22, 2015 from www.wikipedia.org, 3pp.
"Refraction by lenses," downloaded on Feb. 17, 2015 from www.physicsclassroom.com, 5pp.
"RTLED—White Paper: Binning and LED," downloaded on Oct. 13, 2014 from www.rtled.com, 3pp.
Near, AI, "Seeing Beyond CRI," LED Testing & Application, Nov. 2011, downloaded from www.ies.org/Ida/hottopics/led/4.pdf, 2pp.
"Selux—Olivio luminaire," press release dated Mar. 26, 2014, downloaded from http://www.selux.com/be/en/news/press/press-detail/article/evolutionary-progress-the-olivio-family-of-system-luminaires-now-with-premium-quality-white-and.html, 3pp.
"LEDIL—Strada-F Series," downloaded on May 5, 2015 from www.ledil.com, 7pp.
"Sylvania—Ultra SE(tm) LED Lamp Family," downloaded on May 27, 2014 from www.sylvania.com, 3pp.
"Sylvania Ultra SE(tm) LED Light Bulbs with Color Dimming Sunset Effects," downloaded on May 27, 2014 from https://www.youtube.com/watch?v=oZEc-VfJ8EU, 2pp.
Wikipedia, "Transmittance," downloaded on Jan. 22, 2015 from www.wikipedia.org, 4pp.
"United Lumen—A Volumetric Displaced Phosphor Light Engine which elegantly and efficiently distributes light in a pattern similar to an incandescent bulb," downloaded on Jul. 9, 2014 from www.unitedlumen.com, 1p.
"United Lumen—Solid State Volumetric Technology," downloaded on Jul. 9, 2014 from www.unitedlumen.com, 1p.
"United Lumen—High Brightness V-LED Technology," downloaded on May 15, 2014 from www.unitedlumen.com, 1p.
"USAI Lighting Catalog," downloaded on May 27, 2014 from http://www.usaillumination.com/pdf/Warm_Glow_Dimming.pdf, 50pp.
"Winona—Parata 700 Series Cove," downloaded on May 28, 2014 from www.acuitybrands.com, 2pp.
"Winona Parata Catalog," downloaded on May 28, 2014 from www.acuitybrands.com, 24pp.
PCT/US2007/023110, Journee Lighting Inc., International Preliminary Report on Patentability Dated Sep. 8, 2009.
PCT/US2009/035321, Journee Lighting Inc., International Preliminary Report on Patentability Dated Aug. 31, 2010.
PCT/US2009/064858, Journee Lighting Inc., International Preliminary Report on Patentability Dated May 24, 2011.
PCT/US2010/045361, Journee Lighting Inc., International Preliminary Report on Patentability Dated Feb. 14, 2012.
PCT/US2012/060588, Ecosense Lighting Inc., Filed on Oct. 17, 2012.
PCT/US2012/060588, Ecosense Lighting Inc., International Search Report and Opinion Dated Mar. 29, 2013.
PCT/US2012/060588, Ecosense Lighting Inc., International Preliminary Report on Patentability Dated Apr. 22, 2014.
PCT/US2013/045708, Journee Lighting Inc., International Search Report and Opinion Dated Nov. 27, 2013.
PCT/US2013/045708, Journee Lighting Inc., International Preliminary Report on Patentability Dated May 12, 2015.
PCT/US2013/075172, Ecosense Lighting Inc., Filed on Dec. 13, 2013.

(56) References Cited

OTHER PUBLICATIONS

PCT/US2013/075172, Ecosense Lighting Inc., International Search Report and Opinion Dated Sep. 26, 2014.
PCT/US2013/075172, Ecosense Lighting Inc., International Preliminary Report on Patentability Dated Jun. 23, 2015.
PCT/US2016/020521, Ecosense Lighting Inc., Filed on Mar. 2, 2016.
PCT/US2016/020521, Ecosense Lighting Inc., International Search Report and Opinion Dated May 3, 2016.
PCT/US2016/016972, Ecosense Lighting Inc., Filed on Feb. 8, 2016.
PCT/US2016/016972, Ecosense Lighting Inc., International Search Report and Opinion Dated Apr. 11, 2016.
PCT/US2016/030613, Ecosense Lighting Inc., Filed May 3, 2016.
PCT/US2016/020523, Ecosense Lighting Inc., Filed Mar. 2, 2016.
PCT/US2016/020523, Ecosense Lighting Inc., International Search Report and Opinion Dated May 6, 2016.
PCT/US2016/015470, Ecosense Lighting Inc., Filed on Jan. 28, 2016, Entitled "Zoned Optical Cup."
Petluri et al., U.S. Appl. No. 62/288,368, filed Jan. 28, 2016, entitled "Multizone Mixing Cup".
PCT/US2016/015473, Ecosense Lighting Inc., Filed on Jan. 28, 2016, Entitled "Illuminating With a Multizone Mixing Cup."
PCT/US2016/015473, Ecosense Lighting Inc., International Search Report and Opinion Mailed on Apr. 22, 2016.
Petluri et al., U.S. Appl. No. 15/170,806, filed Jun. 1, 2016, entitled "Illuminating With a Multizone Mixing Cup."
PCT/US2016/015318, Ecosense Lighting Inc., Filed on Jan. 28, 2016, Entitled "Compositions for LED Light Conversions."
PCT/US2016/015318, Ecosense Lighting Inc., International Search Report and Opinion, Mailed on Apr. 11, 2016.
PCT/US2016/015348, Ecosense Lighting Inc., Filed on Jan. 28, 2016, Entitled "Systems for Providing Tunable White Light With High Color Rendering."
PCT/US2016/015348, Ecosense Lighting Inc., International Search Report and Opinion Mailed on Apr. 11, 2016.
PCT/US2016/015368, Ecosense Lighting Inc., Filed Jan. 28, 2016, Entitled "Systems for Providing Tunable White Light With High Color Rendering."
PCT/US2016/015368, Ecosense Lighting Inc., International Search Report and Opinion Mailed on Apr. 19, 2016.
Petluri et al., U.S. Appl. No. 15/173,538, filed Jun. 3, 2016, entitled "System for Providing Tunable White Light With High Color Rendering."
Petluri et al., U.S. Appl. No. 15/173,554, filed Jun. 3, 2016, entitled "System for Providing Tunable White Light With High Color Rendering."
PCT/US2016/015385, Ecosense Lighting Inc., Filed on Jan. 28, 2016, Entitled "Methods for Generating Tunable White Light With High Color Rendering."
PCT/US2016/015402, Ecosense Lighting Inc., Filed on Jan. 28, 2016, Entitled "Methods for Generating Tunable White Light With High Color Rendering."
PCT/US2016/015435, Ecosense Lighting Inc., Filed on Jan. 28, 2016, Entitled "Methods for Generating Melatonin-Response-Tuned White Light With High Color Rendering."
PCT/US2016/015437, Ecosense Lighting Inc., Filed on Jan. 28, 2016, Entitled "Methods for Generating Melatonin-Response-Tuned White Light With High Color Rendering."
PCT/US2016/015441, Ecosense Lighting Inc., Filed on Jan. 28, 2016, Entitled "Methods for Generating Melatonin-Response-Tuned White Light With High Color Rendering."
Petluri et al., U.S. Appl. No. 15/176,083, filed Jun. 7, 2016, entitled "Compositions for LED Light Conversions."
PCT/US2016/030613, Ecosense Lighting Inc., International Search Report and Opinion Dated Aug. 5, 2016.
PCT/US2016/046245, Ecosense Lighting Inc., Filed on Aug. 10, 2016.
PCT/US2016/015470, Ecosense Lighting Inc., International Search Report and Opinion Dated Jul. 8, 2016.
PCT/US2016/015385, Ecosense Lighting Inc., International Search Report and Opinion Dated Apr. 8, 2016.
PCT/US2016/015402, Ecosense Lighting Inc., International Search Report and Opinion Dated Apr. 22, 2016.
PCT/US2016/015435, Ecosense Lighting Inc., International Search Report and Opinion Dated Mar. 31, 2016.
PCT/US2016/015437, Ecosense Lighting Inc., International Search Report and Opinion Dated Mar. 31, 2016.
PCT/US2016/015441, Ecosense Lighting Inc., International Search Report and Opinion Dated Mar. 31, 2016.

\* cited by examiner

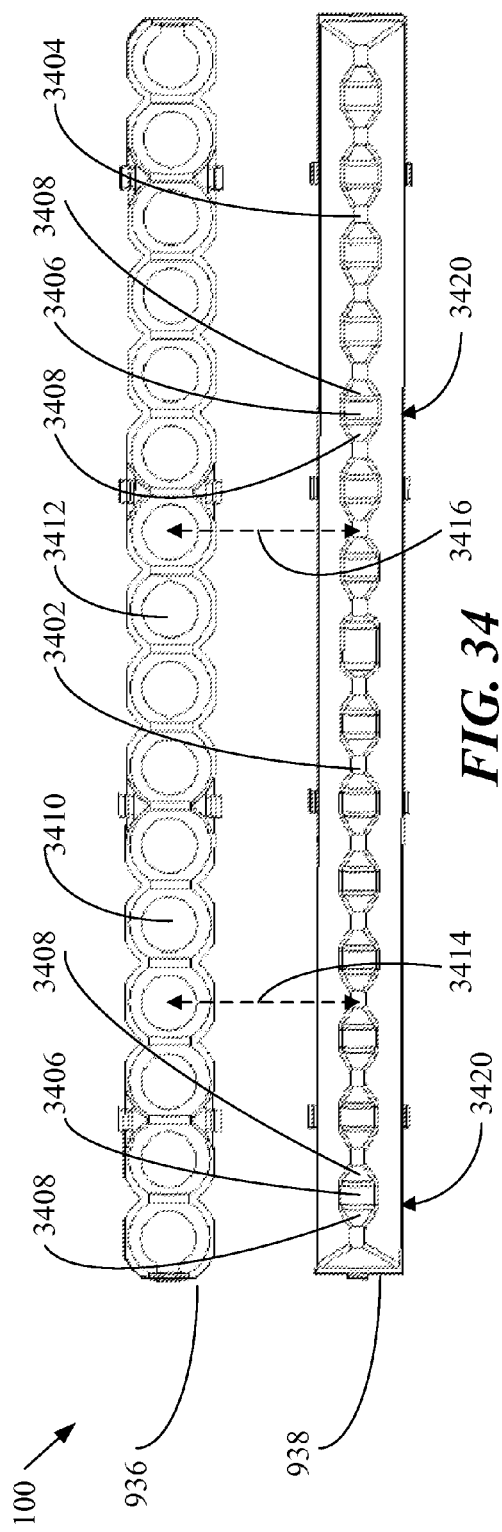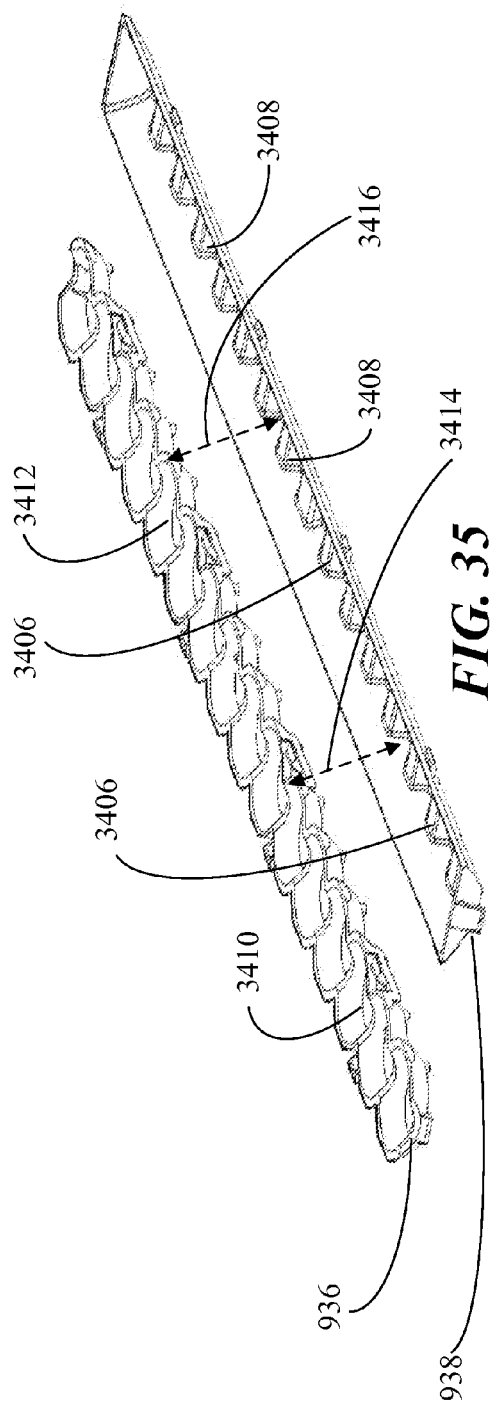

LIGHTING SYSTEMS INCLUDING LENS MODULES FOR SELECTABLE LIGHT DISTRIBUTION

BACKGROUND OF THE INVENTION

1. Field of the Invention

The present invention relates to the field of lighting systems that include semiconductor light-emitting devices and lenses.

2. Background of the Invention

Numerous lighting systems that include semiconductor light-emitting devices and lenses have been developed. As examples, some of such lighting systems may include lenses for controlling directions of propagation of light emitted by the semiconductor light-emitting devices. Despite the existence of these lighting systems, further improvements are still needed in lighting systems that include semiconductor light-emitting devices and lenses.

SUMMARY

In an example of an implementation, a lighting system is provided that includes: a lighting module including a semiconductor light-emitting device ("SLED"); a first lens module; a second lens module; and a third lens module. In this example of the lighting system, the SLED is configured for emitting light emissions along a central light emission axis; and the first, second and third lens modules respectively have first, second and third lens axes. Further in this example of an implementation, the lighting system is configured: for detachably installing the first lens module or the second lens module in the lighting module between the semiconductor light-emitting device and the third lens module; and for aligning the first or second lens axis with the central light emission axis and the third lens axis. The first lens module in this example of the lighting system includes a first converging lens being configured for causing convergence of some of the light emissions of the semiconductor light-emitting device to form converged light emissions along the central light emission axis having a first half-width-half-maximum (HWHM), the first converging lens having a first light output surface being spaced apart along the first lens axis from a first light input surface, the first converging lens further having a first total internal reflection side surface being spaced apart around the first lens axis and having a first frusto-conical shape extending between the first light input and output surfaces of the first converging lens. The second lens module in this example of the lighting system includes a second converging lens being configured for causing convergence of some of the light emissions of the semiconductor light-emitting device to form converged light emissions along the central light emission axis having a second HWHM being different than the first HWHM, the second converging lens having a second light output surface being spaced apart along the second lens axis from a second light input surface, the second converging lens further having a second total internal reflection side surface being spaced apart around the second lens axis and having a second frusto-conical shape extending between the second light input and output surfaces of the second converging lens. The third lens module in this example of the lighting system includes a first diverging lens having a third lens axis, the first diverging lens being configured for causing divergence of some of the converged light emissions away from the third lens axis by a third HWHM to form diverged light emissions that diverge away from the central light emission axis, the first diverging lens having a third light output surface being spaced apart along the third lens axis from a third light input surface, the third light input surface including a first lens screen having lenticular or microprismatic features.

In some examples, the lighting system may further include an additional lens module including an additional diverging lens having an additional lens axis, the additional diverging lens being configured for causing divergence of some of the converged light emissions away from the additional lens axis by an additional HWHM being different than the third HWHM to form additional diverged light emissions that diverge away from the central light emission axis, the additional diverging lens having an additional light output surface being spaced apart along the additional lens axis from an additional light input surface, the additional light input surface including an additional lens screen having lenticular or microprismatic features; and the lighting system may be configured for detachably installing the first lens module or the second lens module in the lighting module between the semiconductor light-emitting device and the additional lens module; and the lighting system may be configured for aligning the first or second lens axis with the central light emission axis and the additional lens axis.

In further examples, the lighting system may be configured for interchangeably installing either the first lens module or the second lens module in the lighting module between the semiconductor light-emitting device and either the third lens module or the additional lens module.

In additional examples of the lighting system, the lighting module may include another semiconductor light-emitting device being configured for emitting light emissions along the central light emission axis.

In other examples of the lighting system, the lighting module may include a plurality of additional semiconductor light-emitting devices, and the semiconductor light-emitting device and the plurality of the additional semiconductor light-emitting devices may be collectively arranged around and configured for emitting light emissions along the central light emission axis.

In some examples of the lighting system, the first converging lens may be configured for causing convergence of some of the light emissions of the semiconductor light-emitting device to form the converged light emissions as having the first HWHM being about 3.5 degrees, and the first light input surface of the first converging lens may include a central cavity being shaped as a portion of a spheroid, and the first light output surface of the first converging lens may include a bowl-shaped cavity surrounding a central mound shaped as a portion of a spheroid.

In further examples of the lighting system, the first converging lens may be configured for causing convergence of some of the light emissions of the semiconductor light-emitting device to form the converged light emissions as having the first HWHM being about 7.5 degrees, and the first light input surface of the first converging lens may include a central cavity being shaped as a portion of a spheroid, and the first light output surface of the first converging lens may include a bowl-shaped cavity surrounding a central mound shaped as a portion of a spheroid.

In additional examples of the lighting system, the first converging lens may be configured for causing convergence of some of the light emissions of the semiconductor light-emitting device to form the converged light emissions as having the first HWHM being about 12.5 degrees, and the first light input surface of the first converging lens may include a central disk-shaped cavity, and the first light output surface of the first converging lens may include a bowl-shaped cavity surrounding a central mound shaped as a portion of a spheroid.

In other examples of the lighting system, the first converging lens may be configured for causing convergence of some of the light emissions of the semiconductor light-emitting device to form the converged light emissions as having the first HWHM being about 20 degrees, and the first light input surface of the first converging lens may include a central compound parabolic concentrator, and the first light output surface of the first converging lens may include a bowl-shaped cavity surrounding a central flat region.

In some examples of the lighting system, the first diverging lens may be configured for causing divergence of some of the converged light emissions away from the third lens axis by a third HWHM being about 4 degrees.

In further examples of the lighting system, the first diverging lens may be configured for causing divergence of some of the converged light emissions away from the third lens axis by a third HWHM being about 10 degrees.

In additional examples of the lighting system, the first diverging lens may be configured for causing divergence of some of the converged light emissions away from the third lens axis by a third HWHM being about 15 degrees.

In other examples of the lighting system, the first diverging lens may be configured for causing divergence of some of the converged light emissions away from the third lens axis by a third HWHM being about 25 degrees.

In some examples of the lighting system, the first diverging lens may be configured for causing divergence of some of the converged light emissions away from the third lens axis by a third HWHM being about 30 degrees.

In further examples of the lighting system, the first diverging lens may have the first lens screen as including an array of lenticular toroidal lenses.

In other examples of the lighting system, the first converging lens may have a first diameter transverse to the first lens axis at the first light input surface, and the first converging lens may have a second diameter transverse to the first lens axis at the first light output surface, and the first diameter may be smaller than the second diameter.

In some examples, the lighting system may further include a housing being configured for positioning the lighting module for emission of the light emissions from the semiconductor light-emitting device along the central light emission axis.

In further examples, the lighting system may further include a carrier being configured for positioning the first or second lens module in the housing with the first or second lens axis being aligned with the central light emission axis.

In other examples, the lighting system may further include a primary visible light reflector configured for being positioned between the housing and the carrier, and the primary visible light reflector may be configured for redirecting some of the light emissions of the semiconductor light-emitting device along the central light emission axis.

In some examples, the lighting system may include: a second lighting module; and fourth, fifth, and sixth lens modules. The second lighting module may include a second semiconductor light-emitting device configured for emitting further light emissions along a second central light emission axis. The fourth lens module may include a third converging lens, the third converging lens being configured for causing convergence of some of the light emissions of the second semiconductor light-emitting device to form further converged light emissions along the second central light emission axis having a fourth HWHM, the third converging lens having a fourth light output surface being spaced apart along a fourth lens axis from a fourth light input surface, the third converging lens further having a third total internal reflection side surface being spaced apart around the fourth lens axis and having a third frusto-conical shape extending between the fourth light input and output surfaces of the third converging lens. The fifth lens module may include a fourth converging lens, the fourth converging lens being configured for causing convergence of some of the light emissions of the second semiconductor light-emitting device to form further converged light emissions along the second central light emission axis having a fifth HWHM being different than the fourth HWHM, the fourth converging lens having a fifth light output surface being spaced apart along a fifth lens axis from a fifth light input surface, the fourth converging lens further having a fourth total internal reflection side surface being spaced apart around the fifth lens axis and having a fourth frusto-conical shape extending between the fifth light input and output surfaces of the fourth converging lens. The sixth lens module may include a second diverging lens having a sixth lens axis, the second diverging lens being configured for causing divergence of some of the converged light emissions away from the sixth lens axis by a sixth HWHM to form diverged light emissions, the second diverging lens having a sixth light output surface being spaced apart along the sixth lens axis from a sixth light input surface, the sixth light input surface may include a second lens screen having lenticular or microprismatic features. The lighting system may be configured for detachably installing the fourth lens module or the fifth lens module in the second lighting module between the second semiconductor light-emitting device and the sixth lens module; and the lighting system may be configured for aligning the fourth or fifth lens axis with the second central light emission axis and the sixth lens axis.

In further examples of the lighting system, the second lighting module may include another semiconductor light-emitting device being configured for emitting light emissions along the second central light emission axis.

In additional examples of the lighting system, the second lighting module may include a plurality of additional semiconductor light-emitting devices, and the second semiconductor light-emitting device and the plurality of the additional semiconductor light-emitting devices may be collectively arranged around and configured for emitting light emissions along the second central light emission axis.

In other examples of the lighting system, the third converging lens may be configured for causing convergence of some of the light emissions of the second semiconductor light-emitting device to form the further converged light emissions as having the fourth HWHM being about 3.5 degrees, and the fourth light input surface of the third converging lens may include a second central cavity being shaped as a portion of a spheroid, and the fourth light output surface of the third converging lens may include a second bowl-shaped cavity surrounding a second central mound shaped as a portion of a spheroid.

In some examples of the lighting system, the third converging lens may be configured for causing convergence of some of the light emissions of the second semiconductor light-emitting device to form the further converged light emissions as having the fourth HWHM being about 7.5 degrees, and the fourth light input surface of the third converging lens may include a second central cavity being shaped as a portion of a spheroid, and the fourth light output surface of the third converging lens may include a second bowl-shaped cavity surrounding a second central mound shaped as a portion of a spheroid.

In further examples of the lighting system, the third converging lens may be configured for causing convergence of some of the light emissions of the second semiconductor light-emitting device to form the further converged light emissions as having the fourth HWHM being about 12.5 degrees, and the fourth light input surface of the third converging lens may include a second central disk-shaped cavity, and the fourth light output surface of the third converging lens may include a second bowl-shaped cavity surrounding a second central mound shaped as a portion of a spheroid.

In additional examples of the lighting system, the third converging lens may be configured for causing convergence of some of the light emissions of the second semiconductor light-emitting device to form the further converged light emissions as having the fourth HWHM being about 20 degrees, and the fourth light input surface of the third converging lens may include a second central compound parabolic concentrator, and the fourth light output surface of the third converging lens may include a second bowl-shaped cavity surrounding a second central flat region.

In other examples of the lighting system, the third converging lens may have a third diameter transverse to the fourth lens axis at the fourth light input surface, and the third converging lens may have a fourth diameter transverse to the fourth lens axis at the fourth light output surface, and the fourth diameter may be smaller than the fifth diameter.

In some examples of the lighting system, the second diverging lens may have the second screen as including an array of lenticular toroidal lenses.

In further examples, the lighting system may be configured for positioning the semiconductor light-emitting device as being spaced apart on a longitudinal axis away from the second semiconductor light-emitting device for causing the central light emission axis to be spaced apart from the second central light emission axis.

In additional examples, the lighting system may be configured for positioning the semiconductor light-emitting device as being spaced apart on the longitudinal axis away from the second semiconductor light-emitting device for causing the central light emission axis to be substantially parallel with the second central light emission axis.

In other examples, the lighting system may further include a housing, the housing may be configured for positioning the lighting module for emission of the light emissions from the semiconductor light-emitting device along the central light emission axis, and the housing may be configured for positioning the second lighting module for emission of the further light emissions from the second semiconductor light-emitting device along the second central light emission axis.

In some examples, the lighting system may further include a carrier, the carrier may be configured for positioning the first or second lens module in the housing with the first or second lens axis being aligned with the central light emission axis, and the carrier may be configured for positioning the fourth or fifth lens module in the housing with the fourth or fifth lens axis being aligned with the second central light emission axis.

In further examples, the lighting system may further include a primary visible light reflector configured for being positioned between the housing and the carrier, the primary visible light reflector may be configured for redirecting some of the light emissions of the semiconductor light-emitting device along the central light emission axis, and the primary visible light reflector may be configured for redirecting some of the further light emissions of the second semiconductor light-emitting device along the second central light emission axis.

In some examples, the lighting system may be configured for interchangeably installing either: the first lens module in the lighting module and the fourth lens module in the second lighting module; or the second lens module in the lighting module and the fifth lens module in the second lighting module.

In further examples of the lighting system, the first lens module may be integral with the fourth lens module, and the second lens module may be integral with the fifth lens module.

In additional examples, the lighting system may further include a seventh lens module that may include a third diverging lens having a seventh lens axis, the third diverging lens being configured for causing divergence of some of the converged light emissions away from the seventh lens axis by a seventh HWHM, being different than the third HWHM, to form additional diverged light emissions, the third diverging lens having a seventh light output surface being spaced apart along the seventh lens axis from a seventh light input surface, the seventh light input surface including a third lens screen having lenticular or microprismatic features; and the lighting system may be configured for detachably installing the first lens module or the second lens module in the lighting module between the semiconductor light-emitting device and the seventh lens module; and the lighting system may be configured for aligning the first or second lens axis with the central light emission axis and the seventh lens axis.

In other examples, the lighting system may include an eighth lens module that may include a fourth diverging lens having an eighth lens axis, the fourth diverging lens being configured for causing divergence of some of the further converged light emissions away from the eighth lens axis by an eighth HWHM, being different than the sixth HWHM, to form additional diverged light emissions, the fourth diverging lens having an eighth light output surface being spaced apart along the eighth lens axis from an eighth light input surface, the eighth light input surface including a fourth lens screen having lenticular or microprismatic features; and the lighting system may be configured for detachably installing the fourth lens module or the fifth lens module in the second lighting module between the second semiconductor light-emitting device and the eighth lens module; and the lighting system may be configured for aligning the fourth or fifth lens axis with the second central light emission axis and the eighth lens axis.

In some examples, the lighting system may be configured for interchangeably installing either: the third lens module in the lighting module and the sixth lens module in the second lighting module; or the seventh lens module in the lighting module and the eighth lens module in the second lighting module.

In further examples of the lighting system, the third lens module may be integral with the sixth lens module, and the seventh lens module may be integral with the eighth lens module.

In other examples of the lighting system, the third HWHM may be the same as the sixth HWHM, and the seventh HWHM may be the same as the eighth HWHM.

In some examples, the lighting system may be configured for interchangeably installing either: the first lens module in the lighting module and the fourth lens module in the second lighting module; or the second lens module in the lighting module and the fifth lens module in the second lighting module.

In further examples of the lighting system, the first lens module may be integral with the fourth lens module, and the second lens module may be integral with the fifth lens module.

In other examples of the lighting system, the first diverging lens may be integral with the second diverging lens, and the lighting system may be configured for positioning the semiconductor light-emitting device as being spaced apart on a longitudinal axis away from the second semiconductor light-emitting device, and the first and second diverging lenses may be integrally configured for causing divergence of some of the converged light emissions in directions that are spaced apart from directions along the longitudinal axis.

In some examples of the lighting system, each of the first and second diverging lenses may be configured for causing divergence of some of the converged light emissions in directions that are spaced apart from directions along the longitudinal axis by an HWHM being about 4 degrees.

In further examples of the lighting system, each of the first and second diverging lenses may be configured for causing divergence of some of the converged light emissions in directions that are spaced apart from directions along the longitudinal axis by an HWHM being about 10 degrees.

In other examples of the lighting system, each of the first and second diverging lenses may be configured for causing divergence of some of the converged light emissions in directions that are spaced apart from directions along the longitudinal axis by an HWHM being about 15 degrees.

In some examples of the lighting system, each of the first and second diverging lenses may be configured for causing divergence of some of the converged light emissions in directions that are spaced apart from directions along the longitudinal axis by an HWHM being about 25 degrees.

In further examples of the lighting system, each of the first and second diverging lenses may be configured for causing divergence of some of the converged light emissions in directions that are spaced apart from directions along the longitudinal axis by an HWHM being about 30 degrees.

In additional examples of the lighting system, the first, second, third and fourth converging lenses may be configured for forming the converged light emissions as respectively having the first, second, fourth, and fifth HWHM being within a range of between about 2 degrees and about 5 degrees; and the first and second diverging lenses may be configured for causing divergence of some of the converged light emissions away from the central light emission axes in directions that are spaced apart from directions along the longitudinal axis by an HWHM being within a range of between about 2 degrees and about 6 degrees.

In further examples of the lighting system, the diverged light emissions may have a cumulative HWHM away from the central light emission axes in directions that are spaced apart from directions along the longitudinal axis being within a range of between about 4 degrees and about 11 degrees.

In additional examples of the lighting system, the first, second, third and fourth converging lenses may be configured for forming the converged light emissions as respectively having the first, second, fourth, and fifth HWHM being within a range of between about 15 degrees and about 25 degrees; and the first and second diverging lenses may be configured for causing divergence of some of the converged light emissions away from the central light emission axes in directions that are spaced apart from directions along the longitudinal axis by an HWHM being within a range of between about 25 degrees and about 35 degrees.

In other examples of the lighting system, the diverged light emissions may have a cumulative HWHM away from the central light emission axes in directions that are spaced apart from directions along the longitudinal axis being within a range of between about 40 degrees and about 60 degrees.

In some examples of the lighting system, the first, second, third and fourth converging lenses may be configured for forming the converged light emissions as respectively having the first, second, fourth, and fifth HWHM being within a range of between about 15 degrees and about 25 degrees; and the first and second diverging lenses may be configured for causing divergence of some of the converged light emissions away from the central light emission axes in directions that are spaced apart from directions along the longitudinal axis by an HWHM being within a range of between about 2 degrees and about 6 degrees.

In further examples of the lighting system, the diverged light emissions may have a cumulative HWHM away from the central light emission axes in directions that are spaced apart from directions along the longitudinal axis being within a range of between about 17 degrees and about 31 degrees.

In additional examples of the lighting system, the first, second, third and fourth converging lenses may be configured for forming the converged light emissions as respectively having the first, second, fourth, and fifth HWHM being within a range of between about 2 degrees and about 5 degrees; and the first and second diverging lenses may be configured for causing divergence of some of the converged light emissions away from the central light emission axes in directions that are spaced apart from directions along the longitudinal axis by an HWHM being within a range of between about 25 degrees and about 35 degrees.

In other examples of the lighting system, the diverged light emissions may have a cumulative HWHM away from the central light emission axes in directions that are spaced apart from directions along the longitudinal axis being within a range of between about 27 degrees and about 40 degrees.

In additional examples of the lighting system, the first diverging lens may be integral with the second diverging lens, and the lighting system may be configured for positioning the semiconductor light-emitting device as being spaced apart on a longitudinal axis away from the second semiconductor light-emitting device, and the first and second diverging lenses may be integrally configured for causing divergence of some of the converged light emissions in directions that are spaced apart from directions transverse to the longitudinal axis.

In other examples of the lighting system, each of the first and second diverging lenses may be configured for causing divergence of some of the converged light emissions in directions that are spaced apart from directions transverse to the longitudinal axis by an HWHM being about 4 degrees.

In some examples of the lighting system, each of the first and second diverging lenses may be configured for causing divergence of some of the converged light emissions in directions that are spaced apart from directions transverse to the longitudinal axis by an HWHM being about 10 degrees.

In further examples of the lighting system, each of the first and second diverging lenses may be configured for causing divergence of some of the converged light emissions in directions that are spaced apart from directions transverse to the longitudinal axis by an HWHM being about 15 degrees.

In additional examples of the lighting system, each of the first and second diverging lenses may be configured for causing divergence of some of the converged light emissions in directions that are spaced apart from directions transverse to the longitudinal axis by an HWHM being about 25 degrees.

In other examples of the lighting system, each of the first and second diverging lenses may be configured for causing divergence of some of the converged light emissions in directions that are spaced apart from directions transverse to the longitudinal axis by an HWHM being about 30 degrees.

In some examples of the lighting system, the third converging lens may be configured for forming the converged light emissions as having the fourth HWHM being within a range of between about 2 degrees and about 25 degrees, and the fourth converging lens may be configured for forming the further converged light emissions as having the fifth HWHM being within a range of between about 2 degrees and about 25 degrees, and each of the first and second diverging lenses may be configured for causing divergence of some of the converged light emissions in directions that are spaced apart from directions transverse to the longitudinal axis by an HWHM being within a range of between about 4 degrees and about 30 degrees.

In further examples of the lighting system, the diverged light emissions may have a cumulative HWHM away from the central light emission axes in directions that are spaced apart from directions transverse to the longitudinal axis being within a range of between about 6 degrees and about 55 degrees.

In some examples, the lighting system may further include a ninth lens module that may include a fifth diverging lens, the fifth diverging lens having a ninth light output surface being spaced apart along a ninth lens axis from a ninth light input surface, the fifth diverging lens having a fifth total internal reflection side surface being spaced apart around the ninth lens axis and having a fifth frusto-conical shape extending between the ninth light input and output surfaces of the fifth diverging lens; and the ninth light input surface of the fifth diverging lens may include a third central cavity being shaped as a portion of a spheroid; and the ninth light output surface of the fifth diverging lens may include a first raised region being shaped as a sliced torus having a fourth central cavity; and the lighting system may be configured for detachably installing the ninth lens module in a lighting module between the semiconductor light-emitting device and the third lens module; and the lighting system may be configured for aligning the ninth lens axis with the central light emission axis and the third lens axis.

In further examples of the lighting system, the first raised region of the fifth diverging lens that may be shaped as a sliced torus may be configured for causing some of the converged light emissions to pass through the third light output surface at a plurality of spaced-apart points.

In additional examples, the lighting system may further include a tenth lens module that may include a sixth diverging lens, the sixth diverging lens having a tenth light output surface being spaced apart along a tenth lens axis from a tenth light input surface, the sixth diverging lens having a sixth total internal reflection side surface being spaced apart around the tenth lens axis and having a sixth frusto-conical shape extending between the tenth light input and output surfaces of the sixth diverging lens; and the tenth light input surface of the sixth diverging lens may include a fifth central cavity being shaped as a portion of a spheroid; and the tenth light output surface of the sixth diverging lens may include a second raised region being shaped as a sliced torus having a sixth central cavity; and the lighting system may be configured for detachably installing the tenth lens module in the second lighting module between the second semiconductor light-emitting device and the sixth lens module; and the lighting system may be configured for aligning the tenth lens axis with the second central light emission axis and the sixth lens axis.

In other examples of the lighting system, the second raised region of the sixth diverging lens that may be shaped as a sliced torus may be configured for causing some of the further converged light emissions to pass through the sixth light output surface at a plurality of spaced-apart points.

In some examples, the lighting system may be configured for positioning the semiconductor light-emitting device as being spaced apart on a longitudinal axis away from the second semiconductor light-emitting device for causing the central light emission axis to be spaced apart from the second central light emission axis.

In further examples of the lighting system, the fifth diverging lens may be integral with the sixth diverging lens, and the fifth and sixth diverging lenses may be integrally configured for causing some of the converged light emissions to pass through the third and sixth light output surfaces at a plurality of spaced-apart points.

In additional examples of the lighting system, the first diverging lens, the second diverging lens, the fifth diverging lens, and the sixth diverging lens may be collectively configured for causing the third and sixth light output surfaces to emit a perceived line of light.

In other examples, the lighting system may further include another lens module having another diverging lens, the another diverging lens having one lens axis being spaced apart from another lens axis, the lighting system being configured for detachably installing the another diverging lens with the one lens axis being aligned with the central light emission axis and with the another lens axis being aligned with the second central light emission axis, the another diverging lens having another total internal reflection side surface extending between another light input surface and another light output surface, the another light output surface may include a contoured lens screen having lenticular or microprismatic features.

In some examples of the lighting system, the another diverging lens may have the contoured lens screen as including an array of lenticular toroidal lenses.

In further examples of the lighting system, the another light input surface may include one cavity aligned with the one lens axis and shaped as a portion of a spheroid, and the another light input surface may include another cavity aligned with the another lens axis and shaped as a portion of a spheroid.

In additional examples, the lighting system may be configured for positioning the semiconductor light-emitting device as being spaced apart on a longitudinal axis away from the second semiconductor light-emitting device for causing the central light emission axis to be spaced apart from the second central light emission axis.

In other examples of the lighting system, the contoured lens screen may have a central concave surface having a lens screen axis that extends in directions being similar to and spaced apart from the longitudinal axis.

In some examples of the lighting system, the lens screen axis may intersect the one lens axis and the another lens axis.

In further examples of the lighting system, the contoured lens screen may have one convex surface extending in directions along the lens screen axis, and one edge of the central concave region may extend adjacent to the one convex surface in directions along the lens screen axis.

In other examples of the lighting system, the contoured lens screen may have another convex surface extending in directions along the lens screen axis, and another edge of the central concave region may extend adjacent to the another convex surface in directions along the lens screen axis.

In some examples of the lighting system, the contoured lens screen may be configured for causing divergence of some of the converged light emissions away from the lens screen axis.

In further examples of the lighting system, the another lens module may be configured for causing some of the light emissions to pass through the contoured lens screen at a plurality of spaced-apart points.

In additional examples of the lighting system, the first diverging lens, the second diverging lens, and the another diverging lens may be collectively configured for causing the third and sixth light output surfaces to emit a perceived line of light.

In other examples, the lighting system may further include a housing, and the housing may be configured for positioning the lighting module for emission of the light emissions from the semiconductor light-emitting device along the central light emission axis, and the housing may be configured for positioning the second lighting module for emission of the further light emissions from the second semiconductor light-emitting device along the second central light emission axis.

In some examples, the lighting system may further include a carrier, and the carrier may be configured for positioning the another lens module in the housing with the one lens axis being aligned with the central light emission axis and with the another lens axis being aligned with the second central light emission axis.

In further examples, the lighting system may further include a primary visible light reflector configured for being positioned between the housing and the carrier, and the primary visible light reflector may be configured for redirecting some of the light emissions of the semiconductor light-emitting device along the central light emission axis, and the primary visible light reflector may be configured for redirecting some of the further light emissions of the second semiconductor light-emitting device along the second central light emission axis.

In another example of an implementation, a lighting system is provided that includes: a lighting module; a first lens module; a second lens module; and a third lens module. In this example of the lighting system, the lighting module may include a semiconductor light-emitting device configured for emitting light emissions along a first central light emission axis, and may include a second semiconductor light-emitting device configured for emitting light emissions along a second central light emission axis being spaced apart from the first central light emission axis. In this example of the lighting system, the first lens module may include a first diverging lens being configured for causing divergence of some of the light emissions away from the first central light emission axis, the first diverging lens having a first light output surface being spaced apart along a first lens axis from a first light input surface, the first diverging lens having a first total internal reflection side surface being spaced apart around the first lens axis and having a first frusto-conical shape extending between the first light input and output surfaces, and the first light input surface may include a first central cavity being shaped as a portion of a spheroid, and the first light output surface may include a first raised region being shaped as a sliced torus having a second central cavity. Also in this example of the lighting system, the second lens module may include a second diverging lens being configured for causing divergence of some of the light emissions away from the second central light emission axis, the second diverging lens having a second light output surface being spaced apart along a second lens axis from a second light input surface, the second diverging lens having a second total internal reflection side surface being spaced apart around the second lens axis and having a second frusto-conical shape extending between the second light input and output surfaces, and the second light input surface may include a third central cavity being shaped as a portion of a spheroid, and the second light output surface may include a second raised region being shaped as a sliced torus having a fourth central cavity. In this example of the lighting system, the third lens module may include a third diverging lens being configured for causing further divergence of some of the light emissions away from the first and second central light emission axes, the third diverging lens having a third light output surface being spaced apart from a third light input surface, and the third light input surface may include a first lens screen having lenticular or microprismatic features. In this example, the lighting system may be configured for aligning the first and second lens modules between the third lens module and the lighting module, with first lens axis being aligned with the first central light emission axis and with the second lens axis being aligned with the second central light emission axis.

In some examples of the lighting system, the raised regions of the first and second diverging lenses may be configured for causing some of the light emissions to pass through the third light output surface at a plurality of spaced-apart points.

In further examples of the lighting system, the first diverging lens may be integral with the second diverging lens.

In additional examples of the lighting system, the first, second and third diverging lenses may be collectively configured for causing the third light output surface to emit a perceived line of light.

In other examples of the lighting system the first diverging lens may have the contoured lens screen as including an array of lenticular toroidal lenses.

In some examples, the lighting system may be configured for positioning the semiconductor light-emitting device as being spaced apart on a longitudinal axis away from the second semiconductor light-emitting device for causing the central light emission axis to be spaced apart from the second central light emission axis.

In further examples, the lighting system may further include a housing, and the housing may be configured for positioning the lighting module for emission of the light emissions from the semiconductor light-emitting device along the central light emission axis, and the housing may be configured for positioning the second lighting module for emission of the further light emissions from the second semiconductor light-emitting device along the second central light emission axis.

In additional examples, the lighting system may further include a carrier, and the carrier may be configured for positioning the first lens module in the housing with the one lens axis being aligned with the central light emission axis, and may be configured for positioning the second lens module in the housing with the another lens axis being aligned with the second central light emission axis.

In other examples, the lighting system may further include a primary visible light reflector configured for being positioned between the housing and the carrier, and the primary visible light reflector may be configured for redirecting some of the light emissions of the semiconductor light-emitting device along the central light emission axis, and the primary visible light reflector may be configured for redirecting some of the further light emissions of the second semiconductor light-emitting device along the second central light emission axis.

In a further example of an implementation, a lighting system is provided that includes: a lighting module; a first lens module; and a second lens module. In this example of the lighting system, the lighting module may include a semiconductor light-emitting device configured for emitting light emissions along a first central light emission axis, and may include a second semiconductor light-emitting device configured for emitting light emissions along a second central light emission axis being spaced apart from the first central light emission axis. In this example of the lighting system, the first lens module may have a first diverging lens being configured for causing divergence of some of the light emissions away from the first and second central light emission axes, the first diverging lens having one lens axis being aligned with the central light emission axis and another lens axis being aligned with the second central light emission axis, the first diverging lens having a total internal reflection side surface extending between a first light input surface and a first light output surface, and the first light output surface may include a contoured lens screen having lenticular or microprismatic features. In this example of the lighting system, the second lens module may include a second diverging lens being configured for causing further divergence of some of the light emissions away from the first and second central light emission axes, the second diverging lens having a second light output surface being spaced apart from a second light input surface, the second light input surface may include a first lens screen having lenticular or microprismatic features. In this example, the lighting system may be configured for aligning the first lens module between the second lens module and the lighting module, with first lens axis being aligned with the first central light emission axis and with the second lens axis being aligned with the second central light emission axis.

In some examples of the lighting system, the first diverging lens may have the contoured lens screen as including an array of lenticular toroidal lenses.

In further examples of the lighting system, the first light input surface may include one cavity aligned with the one lens axis and shaped as a portion of a spheroid, and the first light input surface may include another cavity aligned with the another lens axis and shaped as a portion of a spheroid.

In additional examples, the lighting system may be configured for positioning the semiconductor light-emitting device as being spaced apart on a longitudinal axis away from the second semiconductor light-emitting device for causing the central light emission axis to be spaced apart from the second central light emission axis.

In other examples of the lighting system, the contoured lens screen may have a central concave surface having a lens screen axis that extends in directions being similar to and spaced apart from the longitudinal axis.

In some examples of the lighting system, the lens screen axis may intersect the one lens axis and the another lens axis.

In further examples of the lighting system, the contoured lens screen may have one convex surface extending in directions along the lens screen axis, and one edge of the central concave region may extend adjacent to the one convex surface in directions along the lens screen axis.

In additional examples of the lighting system, the contoured lens screen may have another convex surface extending in directions along the lens screen axis, and another edge of the central concave region may extend adjacent to the another convex surface in directions along the lens screen axis.

In other examples of the lighting system, the contoured lens screen may be configured for causing further divergence of some of the light emissions away from the lens screen axis.

In some examples of the lighting system, the another lens module may be configured for causing some of the light emissions to pass through the contoured lens screen at a plurality of spaced-apart points.

In further examples of the lighting system, the first diverging lens and the second diverging lens may be collectively configured for causing the second light output surface to emit a perceived line of light.

In additional examples, the lighting system may further include a housing, and the housing may be configured for positioning the lighting module for emission of the light emissions from the semiconductor light-emitting device along the central light emission axis, and the housing may be configured for positioning the second lighting module for emission of the further light emissions from the second semiconductor light-emitting device along the second central light emission axis.

In other examples, the lighting system may further include a carrier, and the carrier may be configured for positioning the first lens module in the housing with the one lens axis being aligned with the central light emission axis and with the another lens axis being aligned with the second central light emission axis.

In some examples, the lighting system may further include a primary visible light reflector configured for being positioned between the housing and the carrier, and the primary visible light reflector may be configured for redirecting some of the light emissions of the semiconductor light-emitting device along the central light emission axis, and the primary visible light reflector may be configured for redirecting some of the further light emissions of the second semiconductor light-emitting device along the second central light emission axis.

Other systems, processes, features and advantages of the invention will be or will become apparent to one with skill in the art upon examination of the following figures and detailed description. It is intended that all such additional systems, processes, features and advantages be included within this description, be within the scope of the invention, and be protected by the accompanying claims.

BRIEF DESCRIPTION OF THE FIGURES

The invention can be better understood with reference to the following figures. The components in the figures are not necessarily to scale, emphasis instead being placed upon illustrating the principles of the invention. Moreover, in the figures, like reference numerals designate corresponding parts throughout the different views.

FIG. 34 is a top view showing examples of the carrier and the primary visible light reflector that may be included in the example [100] of an implementation of a lighting system.

FIG. 35 is a perspective view showing the examples of the carrier and the primary visible light reflector as shown in FIG. 34.

DETAILED DESCRIPTION

Figure 1:
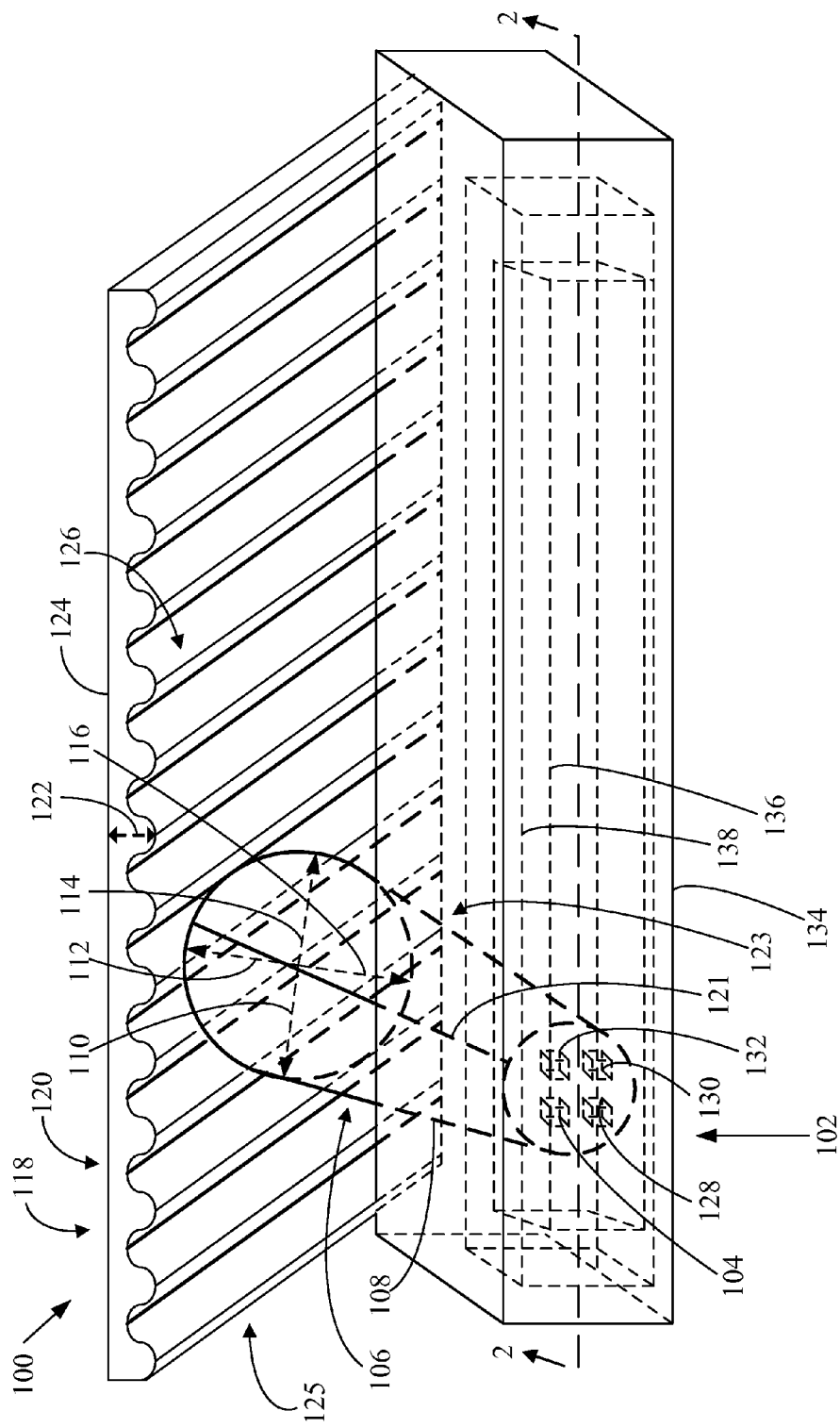
FIG. 1 is a perspective bottom view showing a portion of an example [100] of an implementation of a lighting system.

Various lighting systems that utilize semiconductor light-emitting devices have been designed. Many such lighting systems exist that include lenses for controlling directions of propagation of light emissions from the semiconductor light-emitting devices. However, existing lighting systems often have demonstrably failed to provide interchangeable lens modules enabling a lighting system to be easily and repeatedly reconfigured by removal and substitution of lens modules. Further, existing lighting systems often have demonstrably failed to provide lens modules enabling a lighting system to emit a perceived line of light.

In some examples, lighting systems accordingly are provided herein, that may include: a lighting module including a semiconductor light-emitting device ("SLED"); a first lens module; a second lens module; and a third lens module. The SLED may be configured for emitting light emissions along a central light emission axis; and the first, second and third lens modules may respectively have first, second and third lens axes. The lighting system may be configured: for detachably installing the first lens module or the second lens module in the lighting module between the semiconductor light-emitting device and the third lens module; and for aligning the first or second lens axis with the central light emission axis and the third lens axis. The first and second lens modules may respectively include first and second converging lenses being configured for causing convergence of some of the light emissions of the semiconductor light-emitting device to form converged light emissions along the central light emission axis having a half-width-half-maximum (HWHM). The first and second converging lenses may respectively have first and second light output surfaces being spaced apart along the first and second lens axes from first and second light input surfaces. The first and second converging lenses may further respectively have first and second total internal reflection side surfaces being spaced apart around the first and second lens axes and having first and second frusto-conical shapes extending between the first and second light input and output surfaces. The third lens module may include a first diverging lens, having a third lens axis and being configured for causing divergence of some of the converged light emissions away from the third lens axis by another HWHM to form diverged light emissions. The first diverging lens may have a third light output surface being spaced apart along the third lens axis from a third light input surface; and the third light input surface may include a first lens screen having lenticular or microprismatic features. In further examples, the lighting system may include a second lighting module including a second SLED configured for emitting further light emissions along a second central light emission axis, and may include fourth, fifth and sixth lens modules respectively corresponding with the first, second and third lens modules. As additional examples, the lighting system may be configured for interchangeably installing either: the first lens module in the lighting module and the fourth lens module in the second lighting module; or the second lens module in the lighting module and the fifth lens module in the second lighting module. Further, for example, the first lens module may be integral with the fourth lens module; the second lens module may be integral with the fifth lens module; and the third lens module may be integral with the sixth lens module.

In further examples, lighting systems are accordingly provided herein, that may include: a lighting module; a first lens module; a second lens module; and a third lens module. In these examples of the lighting system, the lighting module may include a semiconductor light-emitting device configured for emitting light emissions along a first central light emission axis, and may include a second semiconductor light-emitting device configured for emitting light emissions along a second central light emission axis being spaced apart from the first central light emission axis. In these examples of the lighting system, the first lens module may include a first diverging lens being configured for causing divergence of some of the light emissions away from the first central light emission axis, the first diverging lens having a first light output surface being spaced apart along a first lens axis from a first light input surface, the first diverging lens having a first total internal reflection side surface being spaced apart around the first lens axis and having a first frusto-conical shape extending between the first light input and output surfaces, and the first light input surface may include a first central cavity being shaped as a portion of a spheroid, and the first light output surface may include a first raised region being shaped as a sliced torus having a second central cavity. Also in these examples of the lighting system, the second lens module may include a second diverging lens being configured for causing divergence of some of the light emissions away from the second central light emission axis, the second diverging lens having a second light output surface being spaced apart along a second lens axis from a second light input surface, the second diverging lens having a second total internal reflection side surface being spaced apart around the second lens axis and having a second frusto-conical shape extending between the second light input and output surfaces, and the second light input surface may include a third central cavity being shaped as a portion of a spheroid, and the second light output surface may include a second raised region being shaped as a sliced torus having a fourth central cavity. In these examples of the lighting system, the third lens module may include a third diverging lens being configured for causing further divergence of some of the light emissions away from the first and second central light emission axes, the third diverging lens having a third light output surface being spaced apart from a third light input surface, and the third light input surface may include a first lens screen having lenticular or microprismatic features. In these examples, the lighting system may be configured for aligning the first and second lens modules between the third lens module and the lighting module, with first lens axis being aligned with the first central light emission axis and with the second lens axis being aligned with the second central light emission axis. In additional examples, the first lens module may have a first diverging lens being configured for causing divergence of some of the light emissions away from the first and second central light emission axes, the first diverging lens having one lens axis being aligned with the central light emission axis and another lens axis being aligned with the second central light emission axis, the first diverging lens having a total internal reflection side surface extending between a first light input surface and a first light output surface, and the first light output surface may include a contoured lens screen having lenticular or microprismatic features.

The following definitions of terms, being stated as applying "throughout this specification", are hereby deemed to be incorporated throughout this specification, including but not limited to the Summary, Brief Description of the Figures, Detailed Description, and Claims.

Throughout this specification, the term "semiconductor" means: a substance, examples including a solid chemical element or compound, that can conduct electricity under some conditions but not others, making the substance a good medium for the control of electrical current.

Throughout this specification, the term "semiconductor light-emitting device" (also being abbreviated as "SLED") means: a light-emitting diode; an organic light-emitting diode; a laser diode; or any other light-emitting device having one or more layers containing inorganic and/or organic semiconductor(s). Throughout this specification, the term "light-emitting diode" (herein also referred to as an "LED") means: a two-lead semiconductor light source having an active pn-junction. As examples, an LED may include a series of semiconductor layers that may be epitaxially grown on a substrate such as, for example, a substrate that includes sapphire, silicon, silicon carbide, gallium nitride or gallium arsenide. Further, for example, one or more semiconductor p-n junctions may be formed in these epitaxial layers. When a sufficient voltage is applied across the p-n junction, for example, electrons in the n-type semiconductor layers and holes in the p-type semiconductor layers may flow toward the p-n junction. As the electrons and holes flow toward each other, some of the electrons may recombine with corresponding holes, and emit photons. The energy release is called electroluminescence, and the color of the light, which corresponds to the energy of the photons, is determined by the energy band gap of the semiconductor. As examples, a spectral power distribution of the light generated by an LED may generally depend on the particular semiconductor materials used and on the structure of the thin epitaxial layers that make up the "active region" of the device, being the area where the light is generated. As examples, an LED may have a light-emissive electroluminescent layer including an inorganic semiconductor, such as a Group III-V semiconductor, examples including: gallium nitride; silicon; silicon carbide; and zinc oxide. Throughout this specification, the term "organic light-emitting diode" (herein also referred to as an "OLED") means: an LED having a light-emissive electroluminescent layer including an organic semiconductor, such as small organic molecules or an organic polymer. It is understood throughout this specification that a semiconductor light-emitting device may include: a non-semiconductor-substrate or a semiconductor-substrate; and may include one or more electrically-conductive contact layers. Further, it is understood throughout this specification that an LED may include a substrate formed of materials such as, for example: silicon carbide; sapphire; gallium nitride; or silicon. It is additionally understood throughout this specification that a semiconductor light-emitting device may have a cathode contact on one side and an anode contact on an opposite side, or may alternatively have both contacts on the same side of the device.

Further background information regarding semiconductor light-emitting devices is provided in the following documents, the entireties of all of which hereby are incorporated by reference herein: U.S. Pat. Nos. 7,564,180; 7,456,499; 7,213,940; 7,095,056; 6,958,497; 6,853,010; 6,791,119; 6,600,175; 6,201,262; 6,187,606; 6,120,600; 5,912,477; 5,739,554; 5,631,190; 5,604,135; 5,523,589; 5,416,342; 5,393,993; 5,359,345; 5,338,944; 5,210,051; 5,027,168; 5,027,168; 4,966,862; and 4,918,497; and U.S. Patent Application Publication Nos. 2014/0225511; 2014/0078715; 2013/0241392; 2009/0184616; 2009/0080185; 2009/0050908; 2009/0050907; 2008/0308825; 2008/0198112; 2008/0179611; 2008/0173884; 2008/0121921; 2008/0012036; 2007/0253209; 2007/0223219; 2007/0170447; 2007/0158668; 2007/0139923; and 2006/0221272.

Throughout this specification, the term "spectral power distribution" means: the emission spectrum of the one or more wavelengths of light emitted by a semiconductor light-emitting device. Throughout this specification, the term "peak wavelength" means: the wavelength where the spectral power distribution of a semiconductor light-emitting device reaches its maximum value as detected by a photo-detector. As an example, an LED may be a source of nearly monochromatic light and may appear to emit light having a single color. Thus, the spectral power distribution of the light emitted by such an LED may be centered about its peak wavelength. As examples, the "width" of the spectral power distribution of an LED may be within a range of between about 10 nanometers and about 30 nanometers, where the width is measured at half the maximum illumination on each side of the emission spectrum. Throughout this specification, the term "full-width-half-maximum" ("FWHM") means: the full width of the spectral power distribution of a semiconductor light-emitting device measured at half the maximum illumination on each side of its emission spectrum. Throughout this specification, the term "half-width-half-maximum" ("HWHM") means: half of the full width of a FWHM. Throughout this specification, the term "dominant wavelength" means: the wavelength of monochromatic light that has the same apparent color as the light emitted by a semiconductor light-emitting device, as perceived by the human eye. As an example, since the human eye perceives yellow and green light better than red and blue light, and because the light emitted by a semiconductor light-emitting device may extend across a range of wavelengths, the color perceived (i.e., the dominant wavelength) may differ from the peak wavelength.

Throughout this specification, the term "luminous flux", also referred to as "luminous power", means: the measure in lumens of the perceived power of light, being adjusted to reflect the varying sensitivity of the human eye to different wavelengths of light. Throughout this specification, the term "radiant flux" means: the measure of the total power of electromagnetic radiation without being so adjusted. Throughout this specification, the term "central light emission axis" means a direction along which the light emissions of a semiconductor light-emitting device have a greatest radiant flux. It is understood throughout this specification that light emissions "along a central light emission axis" means light emissions that: include light emissions in the directions of the central light emission axis; and may further include light emissions in a plurality of other generally similar directions.

It is understood throughout this specification that light emissions "along the longitudinal axis" means light emissions that: include light emissions in the directions of the longitudinal axis; and may further include light emissions in a plurality of other generally similar directions. It is understood throughout this specification that light emissions "in directions transverse to the longitudinal axis" means light emissions that: include light emissions in the directions being orthogonal to the longitudinal axis; and may further include light emissions in a plurality of other generally similar directions. It is understood throughout this specification that light emissions "in directions spaced apart from directions along the longitudinal axis" means light emissions in directions being similar to and spaced apart from the directions along the longitudinal axis. It is understood throughout this specification that light emissions "in directions spaced apart from directions transverse to the longitudinal axis" means light emissions in directions being similar to and spaced apart from the directions being transverse to the longitudinal axis.

Throughout this specification, the term "luminescent" means: characterized by absorption of electromagnetic radiation (e.g., visible light, UV light or infrared light) causing the emission of light by, as examples: fluorescence; and phosphorescence.

Throughout this specification, the term "object" means a material article or device. Throughout this specification, the term "surface" means an exterior boundary of an object. Throughout this specification, the term "incident visible light" means visible light that propagates in one or more directions towards a surface. Throughout this specification, the term "reflective surface" means a surface of an object that causes incident visible light, upon reaching the surface, to then propagate in one or more different directions away from the surface without passing through the object. Throughout this specification, the term "planar reflective surface" means a generally flat reflective surface.

Throughout this specification, the term "reflectance" means a fraction of a radiant flux of incident visible light having a specified wavelength that is caused by a reflective surface of an object to propagate in one or more different directions away from the surface without passing through the object. Throughout this specification, the term "reflected light" means the incident visible light that is caused by a reflective surface to propagate in one or more different directions away from the surface without passing through the object. Throughout this specification, the term "Lambertian reflectance" means diffuse reflectance of visible light from a surface, in which the reflected light has uniform radiant flux in all of the propagation directions. Throughout this specification, the term "specular reflectance" means mirror-like reflection of visible light from a surface, in which light from a single incident direction is reflected into a single propagation direction. Throughout this specification, the term "spectrum of reflectance values" means a spectrum of values of fractions of radiant flux of incident visible light, the values corresponding to a spectrum of wavelength values of visible light, that are caused by a reflective surface to propagate in one or more different directions away from the surface without passing through the object. Throughout this specification, the term "transmittance" means a fraction of a radiant flux of incident visible light having a specified wavelength that is permitted by a reflective surface to pass through the object having the reflective surface. Throughout this specification, the term "transmitted light" means the incident visible light that is permitted by a reflective surface to pass through the object having the reflective surface. Throughout this specification, the term "spectrum of transmittance values" means a spectrum of values of fractions of radiant flux of incident visible light, the values corresponding to a spectrum of wavelength values of visible light, that are permitted by a reflective surface to pass through the object having the reflective surface. Throughout this specification, the term "absorbance" means a fraction of a radiant flux of incident visible light having a specified wavelength that is permitted by a reflective surface to pass through the reflective surface and is absorbed by the object having the reflective surface. Throughout this specification, the term "spectrum of absorbance values" means a spectrum of values of fractions of radiant flux of incident visible light, the values corresponding to a spectrum of wavelength values of visible light, that are permitted by a reflective surface to pass through the reflective surface and are absorbed by the object having the reflective surface. Throughout this specification, it is understood that a reflective surface, or an object, may have a spectrum of reflectance values, and a spectrum of transmittance values, and a spectrum of absorbance values. The spectra of reflectance values, absorbance values, and transmittance values of a reflective surface or of an object may be measured, for example, utilizing an ultraviolet-visible-near infrared (UV-VIS-NIR) spectrophotometer. Throughout this specification, the term "visible light reflector" means an object having a reflective surface. In examples, a visible light reflector may be selected as having a reflective surface characterized by light reflections that are more Lambertian than specular.

Throughout this specification, the term "lumiphor" means: a medium that includes one or more luminescent materials being positioned to absorb light that is emitted at a first spectral power distribution by a semiconductor light-emitting device, and to re-emit light at a second spectral power distribution in the visible or ultra violet spectrum being different than the first spectral power distribution, regardless of the delay between absorption and re-emission. Lumiphors may be categorized as being down-converting, i.e., a material that converts photons to a lower energy level (longer wavelength); or up-converting, i.e., a material that converts photons to a higher energy level (shorter wavelength). As examples, a luminescent material may include: a phosphor; a quantum dot; a quantum wire; a quantum well; a photonic nanocrystal; a semiconducting nanoparticle; a scintillator; a lumiphoric ink; a lumiphoric organic dye; a day glow tape; a phosphorescent material; or a fluorescent material. Throughout this specification, the term "quantum material" means any luminescent material that includes: a quantum dot; a quantum wire; or a quantum well. Some quantum materials may absorb and emit light at spectral power distributions having narrow wavelength ranges, for example, wavelength ranges having spectral widths being within ranges of between about 25 nanometers and about 50 nanometers. In examples, two or more different quantum materials may be included in a lumiphor, such that each of the quantum materials may have a spectral power distribution for light emissions that may not overlap with a spectral power distribution for light absorption of any of the one or more other quantum materials. In these examples, cross-absorption of light emissions among the quantum materials of the lumiphor may be minimized. As examples, a lumiphor may include one or more layers or bodies that may contain one or more luminescent materials that each may be: (1) coated or sprayed directly onto an semiconductor light-emitting device; (2) coated or sprayed onto surfaces of a lens or other elements of packaging for an semiconductor light-emitting device; (3) dispersed in a matrix medium; or (4) included within a clear encapsulant (e.g., an epoxy-based or silicone-based curable resin or glass or ceramic) that may be positioned on or over an semiconductor light-emitting device. A lumiphor may include one or multiple types of luminescent materials. Other materials may also be included with a lumiphor such as, for example, fillers, diffusants, colorants, or other materials that may as examples improve the performance of or reduce the overall cost of the lumiphor. In examples where multiple types of luminescent materials may be included in a lumiphor, such materials may, as examples, be mixed together in a single layer or deposited sequentially in successive layers.

Throughout this specification, the term "volumetric lumiphor" means a lumiphor being distributed in an object having a shape including defined exterior surfaces. In some examples, a volumetric lumiphor may be formed by dispersing a lumiphor in a volume of a matrix medium having suitable spectra of visible light transmittance values and visible light absorbance values. As examples, such spectra may be affected by a thickness of the volume of the matrix medium, and by a concentration of the lumiphor being distributed in the volume of the matrix medium. In examples, the matrix medium may have a composition that includes polymers or oligomers of: a polycarbonate; a silicone; an acrylic; a glass; a polystyrene; or a polyester such as polyethylene terephthalate. Throughout this specification, the term "remotely-located lumiphor" means a lumiphor being spaced apart at a distance from and positioned to receive light that is emitted by a semiconductor light-emitting device.

Throughout this specification, the term "light-scattering particles" means small particles formed of a non-luminescent, non-wavelength-converting material. In some examples, a volumetric lumiphor may include light-scattering particles being dispersed in the volume of the matrix medium for causing some of the light emissions having the first spectral power distribution to be scattered within the volumetric lumiphor. As an example, causing some of the light emissions to be so scattered within the matrix medium may cause the luminescent materials in the volumetric lumiphor to absorb more of the light emissions having the first spectral power distribution. In examples, the light-scattering particles may include: rutile titanium dioxide;

anatase titanium dioxide; barium sulfate; diamond; alumina; magnesium oxide; calcium titanate; barium titanate; strontium titanate; or barium strontium titanate. In examples, light-scattering particles may have particle sizes being within a range of about 0.01 micron (10 nanometers) and about 2.0 microns (2,000 nanometers).

In some examples, a visible light reflector may be formed by dispersing light-scattering particles having a first index of refraction in a volume of a matrix medium having a second index of refraction being suitably different from the first index of refraction for causing the volume of the matrix medium with the dispersed light-scattering particles to have suitable spectra of reflectance values, transmittance values, and absorbance values for functioning as a visible light reflector. As examples, such spectra may be affected by a thickness of the volume of the matrix medium, and by a concentration of the light-scattering particles being distributed in the volume of the matrix medium, and by physical characteristics of the light-scattering particles such as the particle sizes and shapes, and smoothness or roughness of exterior surfaces of the particles. In an example, the smaller the difference between the first and second indices of refraction, the more light-scattering particles may need to be dispersed in the volume of the matrix medium to achieve a given amount of light-scattering. As examples, the matrix medium for forming a visible light reflector may have a composition that includes polymers or oligomers of: a polycarbonate; a silicone; an acrylic; a glass; a polystyrene; or a polyester such as polyethylene terephthalate. In further examples, the light-scattering particles may include: rutile titanium dioxide; anatase titanium dioxide; barium sulfate; diamond; alumina; magnesium oxide; calcium titanate; barium titanate; strontium titanate; or barium strontium titanate. In other examples, a visible light reflector may include a reflective polymeric or metallized surface formed on a visible light-transmissive polymeric or metallic object such as, for example, a volume of a matrix medium. Additional examples of visible light reflectors may include microcellular foamed polyethylene terephthalate sheets ("MCPET"). Suitable visible light reflectors may be commercially available under the trade names White Optics® and MIRO® from WhiteOptics LLC, 243-G Quigley Blvd., New Castle, Del. 19720 USA. Suitable MCPET visible light reflectors may be commercially available from the Furukawa Electric Co., Ltd., Foamed Products Division, Tokyo, Japan. Additional suitable visible light reflectors may be commercially available from CVI Laser Optics, 200 Dorado Place SE, Albuquerque, N. Mex. 87123 USA.

In some examples, a converging or diverging lens may be formed as a volume of a matrix medium having a suitable shape for functioning as a lens. In further examples, forming a diverging lens may include dispersing light-scattering particles having a first index of refraction in a volume of a matrix medium having a second index of refraction being suitably different from the first index of refraction for causing the volume of the matrix medium with the dispersed light-scattering particles to have suitable light-scattering value for functioning as a diverging lens. As examples, the matrix medium for forming a lens may have a composition that includes polymers or oligomers of: a polycarbonate; a silicone; an acrylic; a glass; a polystyrene; or a polyester such as polyethylene terephthalate. In further examples, the light-scattering particles may include: rutile titanium dioxide; anatase titanium dioxide; barium sulfate; diamond; alumina; magnesium oxide; calcium titanate; barium titanate; strontium titanate; or barium strontium titanate.

In further examples, a volumetric lumiphor and a visible light reflector may be integrally formed. As examples, a volumetric lumiphor and a visible light reflector may be integrally formed in respective layers of a volume of a matrix medium, including a layer of the matrix medium having a dispersed lumiphor, and including another layer of the same or a different matrix medium having light-scattering particles being suitably dispersed for causing the another layer to have suitable spectra of reflectance values, transmittance values, and absorbance values for functioning as the visible light reflector. In other examples, an integrally-formed volumetric lumiphor and visible light reflector may incorporate any of the further examples of variations discussed above as to separately-formed volumetric lumiphors and visible light reflectors.

Throughout this specification, the term "phosphor" means: a material that exhibits luminescence when struck by photons. Examples of phosphors that may be utilized include: $CaAlSiN_3$:Eu, $SrAlSiN_3$:Eu, $CaAlSiN_3$:Eu, $Ba_3Si_6O_{12}N_2$:Eu, $Ba_2SiO_4$:Eu, $Sr_2SiO_4$:Eu, $Ca_2SiO_4$:Eu, $Ca_3Sc_2Si_3O_{12}$:Ce, $Ca_3Mg_2Si_3O_{12}$:Ce, $CaSc_2O_4$:Ce, $CaSi_2O_2N_2$:Eu, $SrSi_2O_2N_2$:Eu, $BaSi_2O_2N_2$:Eu, $Ca_5(PO_4)_3Cl$:Eu, $Ba_5(PO_4)_3Cl$:Eu, $Cs_2CaP_2O_7$, $Cs_2SrP_2O_7$, $SrGa_2S_4$:Eu, $Lu_3Al_5O_{12}$:Ce, $Ca_8Mg(SiO_4)_4Cl_2$:Eu, $Sr_8Mg(SiO_4)_4Cl_2$:Eu, $La_3Si_6N_{11}$:Ce, $Y_3Al_5O_{12}$:Ce, $Y_3Ga_5O_{12}$:Ce, $Gd_3Al_5O_{12}$:Ce, $Gd_3Ga_5O_{12}$:Ce, $Tb_3Al_5O_{12}$:Ce, $Tb_3Ga_5O_{12}$:Ce, $Lu_3Ga_5O_{12}$:Ce, (SrCa)$AlSiN_3$:Eu, LuAG:Ce, $(Y,Gd)_2Al_5)_{12}$:Ce, CaS:Eu, SrS:Eu, $SrGa_2S_4$:$E_4$, $Ca_2(Sc, Mg)_2SiO_{12}$:Ce, $Ca_2Sc_2Si_2)_{12}$:C2, $Ca_2Sc_2O_4$:Ce, $Ba_2Si_6O_{12}N_2$:Eu, (Sr,Ca)$AlSiN_2$:Eu, and $CaAlSiN_2$:Eu.

Throughout this specification, the term "quantum dot" means: a nanocrystal made of semiconductor materials that are small enough to exhibit quantum mechanical properties, such that its excitons are confined, in all three spatial dimensions.

Throughout this specification, the term "quantum wire" means: an electrically conducting wire in which quantum effects influence the transport properties.

Throughout this specification, the term "quantum well" means: a thin layer that can confine (quasi-)particles (typically electrons or holes) in the dimension perpendicular to the layer surface, whereas the movement in the other dimensions is not restricted.

Throughout this specification, the term "photonic nanocrystal" means: a periodic optical nanostructure that affects the motion of photons, for one, two, or three dimensions, in much the same way that ionic lattices affect electrons in solids.

Throughout this specification, the term "semiconducting nanoparticle" means: a particle having a dimension within a range of between about 1 nanometer and about 100 nanometers, being formed of a semiconductor.

Throughout this specification, the term "scintillator" means: a material that fluoresces when struck by photons.

Throughout this specification, the term "lumiphoric ink" means: a liquid composition containing a luminescent material. For example, a lumiphoric ink composition may contain semiconductor nanoparticles. Examples of lumiphoric ink compositions that may be utilized are disclosed in Cao et al., U.S. Patent Application Publication No. 20130221489 published on Aug. 29, 2013, the entirety of which hereby is incorporated herein by reference.

Throughout this specification, the term "lumiphoric organic dye" means an organic dye having luminescent up-converting or down-converting activity. As an example, some perylene-based dyes may be suitable.

Throughout this specification, the term "day glow tape" means: a tape material containing a luminescent material.

Throughout this specification, the term "visible light" means light having one or more wavelengths being within a range of between about 380 nanometers and about 670 nanometers; and "visible light spectrum" means the range of wavelengths of between about 380 nanometers and about 670 nanometers.

Throughout this specification, the term "white light" means: light having a color point located at a delta(uv) of about equal to or less than 0.006 and having a CCT being within a range of between about 10000K and about 1800K (herein referred to as a "white color point."). Many different hues of light may be perceived as being "white." For example, some "white" light, such as light generated by a tungsten filament incandescent lighting device, may appear yellowish in color, while other "white" light, such as light generated by some fluorescent lighting devices, may appear more bluish in color. As examples, white light having a CCT of about 3000K may appear yellowish in color, while white light having a CCT of about equal to or greater than 8000K may appear more bluish in color and may be referred to as "cool" white light. Further, white light having a CCT of between about 2500K and about 4500K may appear reddish or yellowish in color and may be referred to as "warm" white light. "White light" includes light having a spectral power distribution of wavelengths including red, green and blue color points. In an example, a CCT of a lumiphor may be tuned by selecting one or more particular luminescent materials to be included in the lumiphor. For example, light emissions from a semiconductor light-emitting device that includes three separate emitters respectively having red, green and blue color points with an appropriate spectral power distribution may have a white color point. As another example, light perceived as being "white" may be produced by mixing light emissions from a semiconductor light-emitting device having a blue, greenish-blue or purplish-blue color point together with light emissions having a yellow color point being produced by passing some of the light emissions having the blue, greenish-blue or purplish-blue color point through a lumiphor to down-convert them into light emissions having the yellow color point. General background information on systems and processes for generating light perceived as being "white" is provided in "Class A Color Designation for Light Sources Used in General Illumination", Freyssinier and Rea, *J. Light & Vis. Env.*, Vol. 37, No. 2 & 3 (Nov. 7, 2013, Illuminating Engineering Institute of Japan), pp. 10-14; the entirety of which hereby is incorporated herein by reference.

Throughout this specification, the term "in contact with" means: that a first object, being "in contact with" a second object, is in either direct or indirect contact with the second object. Throughout this specification, the term "in indirect contact with" means: that the first object is not in direct contact with the second object, but instead that there are a plurality of objects (including the first and second objects), and each of the plurality of objects is in direct contact with at least one other of the plurality of objects (e.g., the first and second objects are in a stack and are separated by one or more intervening layers). Throughout this specification, the term "in direct contact with" means: that the first object, which is "in direct contact" with a second object, is touching the second object and there are no intervening objects between at least portions of both the first and second objects.

Throughout this specification, the term "spectrophotometer" means: an apparatus that can measure a light beam's intensity as a function of its wavelength and calculate its total luminous flux.

Throughout this specification, the term "integrating sphere-spectrophotometer" means: a spectrophotometer operationally connected with an integrating sphere. An integrating sphere (also known as an Ulbricht sphere) is an optical component having a hollow spherical cavity with its interior covered with a diffuse white reflective coating, with small holes for entrance and exit ports. Its relevant property is a uniform scattering or diffusing effect. Light rays incident on any point on the inner surface are, by multiple scattering reflections, distributed equally to all other points. The effects of the original direction of light are minimized. An integrating sphere may be thought of as a diffuser which preserves power but destroys spatial information. Another type of integrating sphere that can be utilized is referred to as a focusing or Coblentz sphere. A Coblentz sphere has a mirror-like (specular) inner surface rather than a diffuse inner surface. Light scattered by the interior of an integrating sphere is evenly distributed over all angles. The total power (radiant flux) of a light source can then be measured without inaccuracy caused by the directional characteristics of the source. Background information on integrating sphere-spectrophotometer apparatus is provided in Liu et al., U.S. Pat. No. 7,532,324 issued on May 12, 2009, the entirety of which hereby is incorporated herein by reference. It is understood throughout this specification that color points may be measured, for example, by utilizing a spectrophotometer, such as an integrating sphere-spectrophotometer. The spectra of reflectance values, absorbance values, and transmittance values of a reflective surface or of an object may be measured, for example, utilizing an ultraviolet-visible-near infrared (UV-VIS-NIR) spectrophotometer.

Throughout this specification, the term "lenticular features" means: an array of semicircular convex lenses ("lenticles") on a surface, being arranged as a sinusoidal series of mutually parallel ridges between troughs, forming a series of "lenticular toroidal lenses." Background information on lenticular toroidal lenses and lenticular features is provided in Seo U.S. Pat. No. 8,503,083 issued on Aug. 6, 2013, the entirety of which hereby is incorporated herein by reference.

Throughout this specification, the term "microprismatic features" means an array of small, equally-spaced multi-faceted prisms being arranged in a regular array forming a "microprismatic lens" on a surface Background information on microprismatic lenses is provided in Pakhchyan U.S. Patent Application Publication No. 2011/0292483A1 published on Dec. 1, 2011, the entirety of which hereby is incorporated herein by reference.

It is understood throughout this specification that numbering of the names of elements as being "first", "second" etcetera, is solely for purposes of clarity in referring to such elements in connection with various examples of lighting systems. It is understood throughout this specification that an example [100] of a lighting system may include any combination of the features discussed in connection with the examples [100] of a lighting system.

Figure 2:
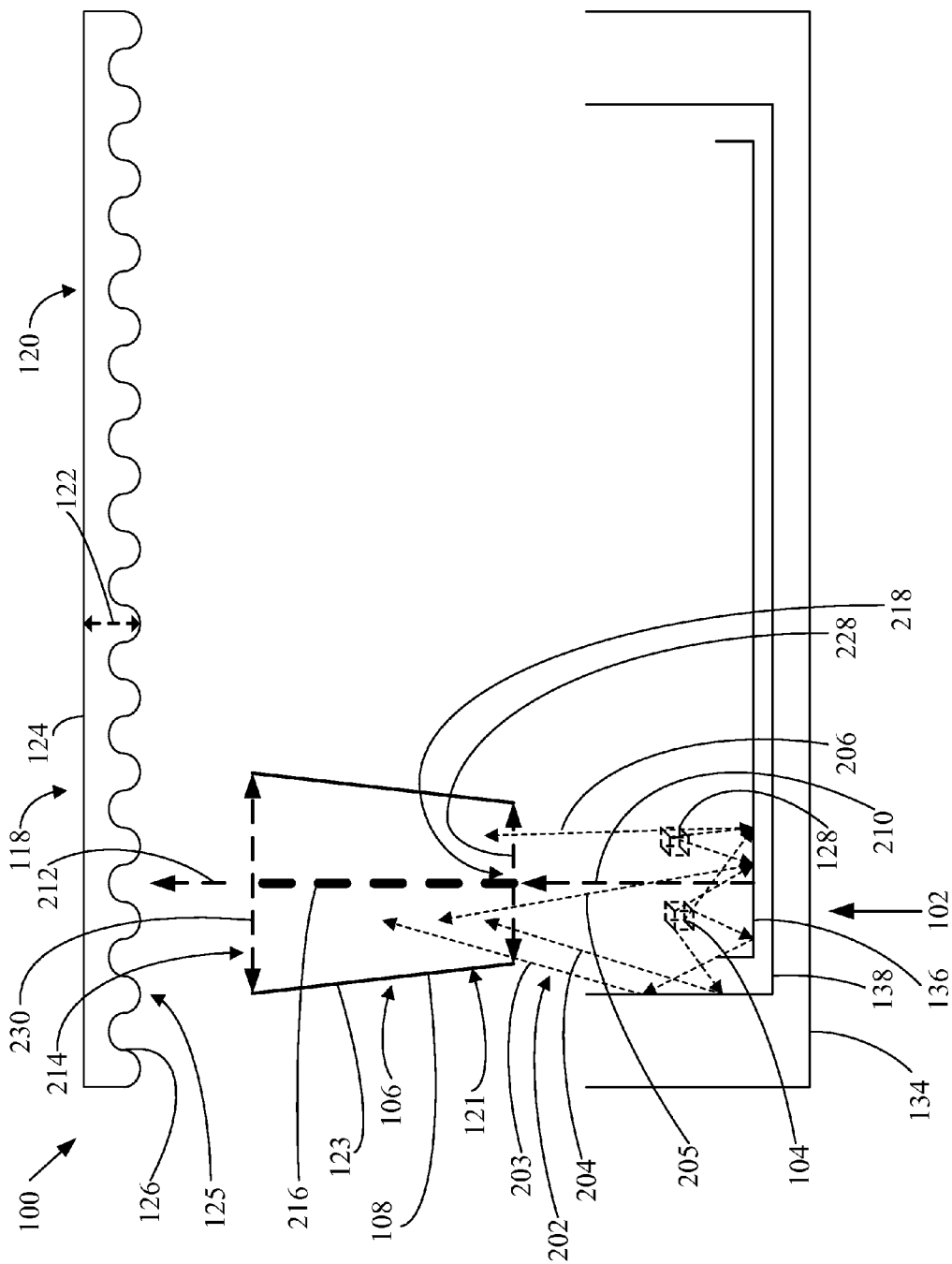
FIG. 2 is a cross-sectional side view taken along the line 2-2, showing the portion of the example [100] of the lighting system.

FIG. 1 is a perspective bottom view showing a portion of an example [100] of an implementation of a lighting system. FIG. 2 is a cross-sectional side view taken along the line 2-2, showing the portion of the example [100] of the lighting system. As shown in FIGS. 1 and 2, the example [100] of the implementation of the lighting system includes a lighting module [102] including a semiconductor light-emitting device [104] configured for emitting light emissions [202] in directions represented by the arrows [203], [204], [205], [206] along a central light emission axis [210]. Further, the example [100] of the lighting system includes a first lens module [106] that includes a first converging lens [108]. The first converging lens [108] of the example [100] of the lighting system is configured for causing convergence of some of the light emissions [202] of the semiconductor light-emitting device [104] to form converged light emissions [212] along the central light emission axis [210] having a first half-width-half-maximum (HWHM) around the central light emission axis [210] being represented by each of the arrows [110], [112], [114], [116], the first converging lens [108] having a first light output surface [214] being spaced apart along a first lens axis [216] from a first light input surface [218], the first converging lens [108] further having a first total internal reflection side surface [121] being spaced apart around the first lens axis [216] and having a first frusto-conical shape [123] extending between the first light input surface [218] and the first light output surface [214] of the first converging lens [108].

Figure 3:
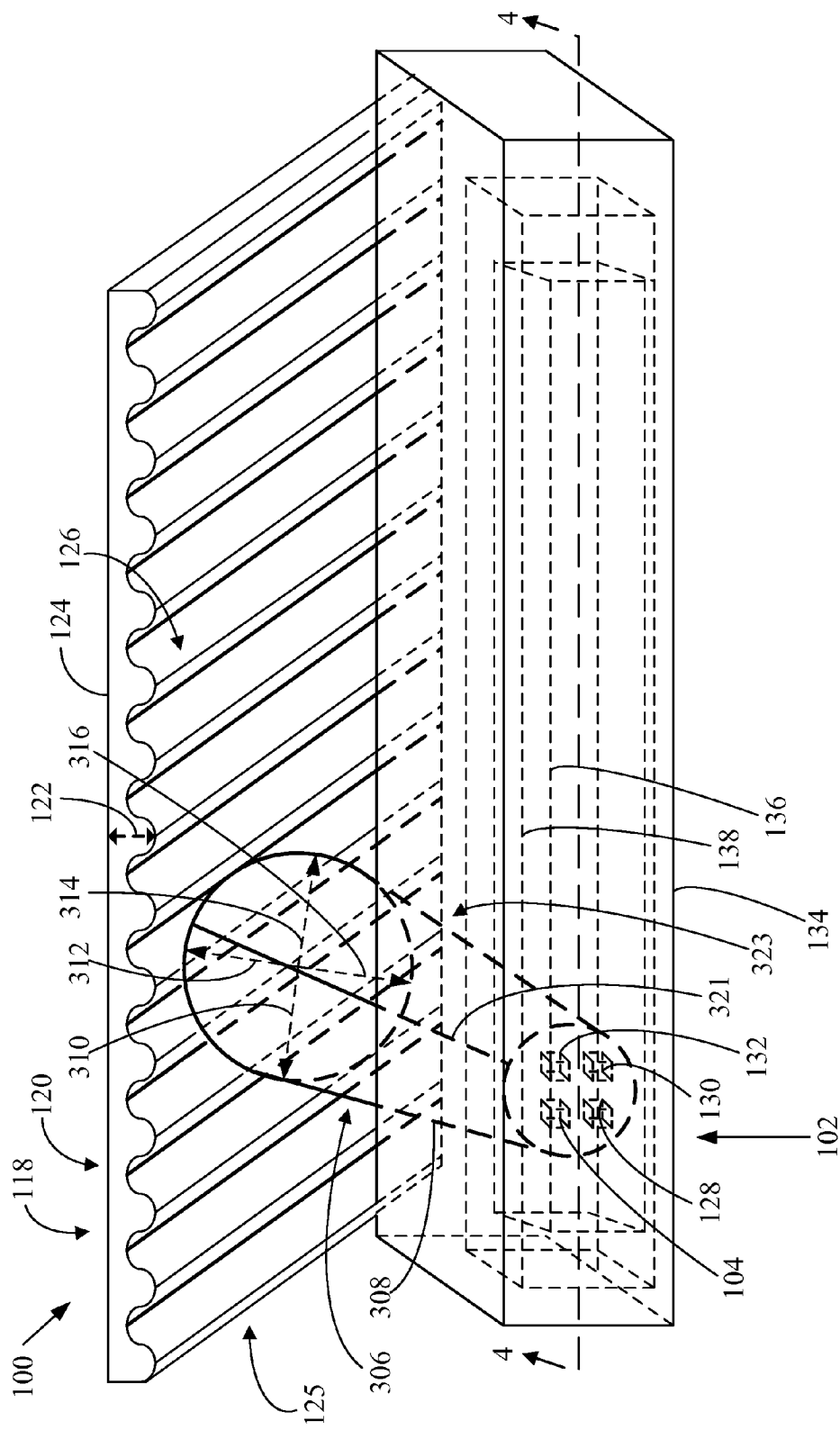
FIG. 3 is a perspective bottom view showing another portion of the example [100] of an implementation of a lighting system.
Figure 4:
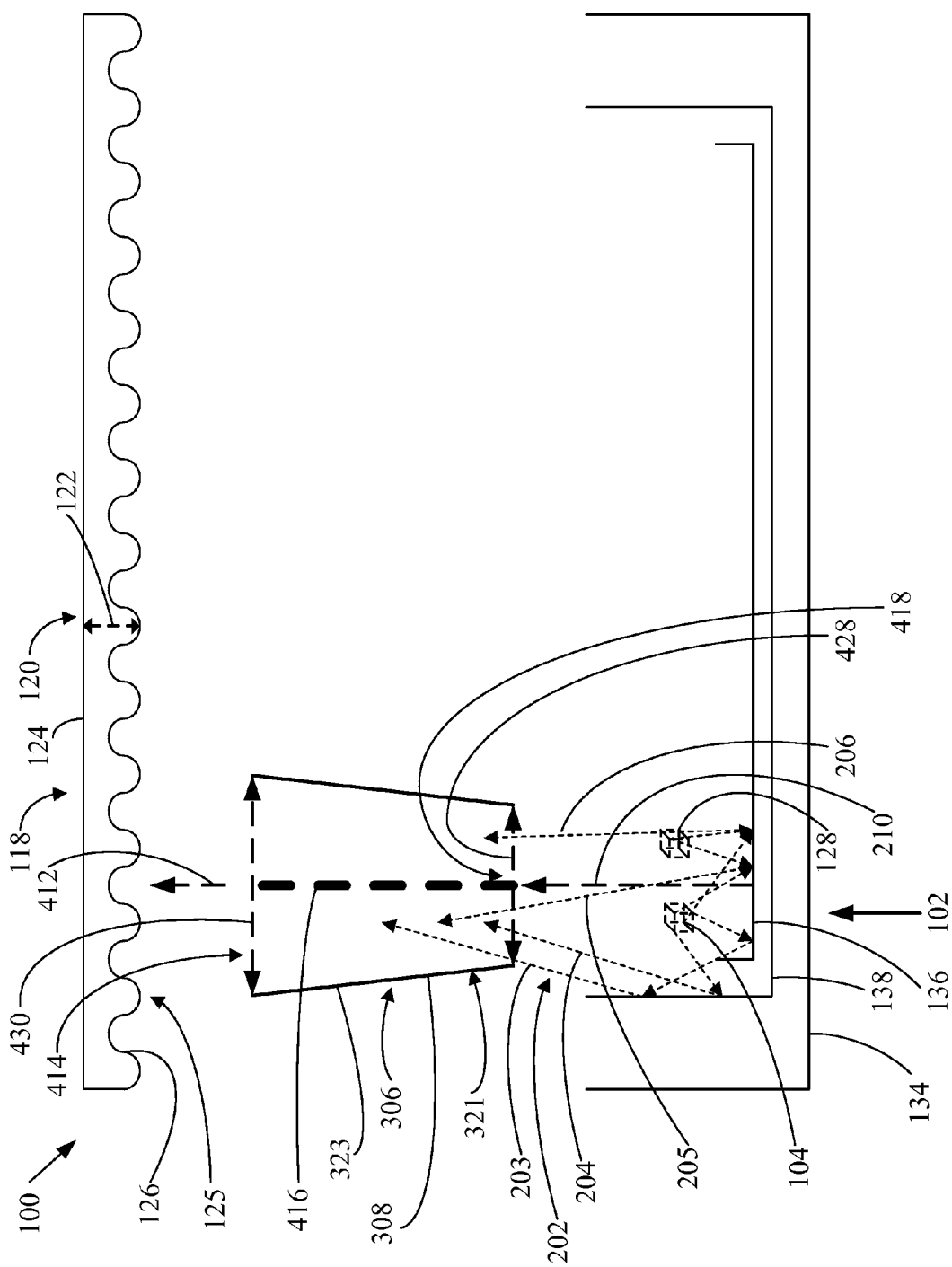
FIG. 4 is a cross-sectional side view taken along the line 4-4, showing the another portion of the example [100] of the lighting system.

FIG. 3 is a perspective bottom view showing another portion of the example [100] of an implementation of a lighting system. FIG. 4 is a cross-sectional side view taken along the line 4-4, showing the another portion of the example [100] of the lighting system. As shown in FIGS. 3 and 4, the example [100] of the implementation of the lighting system further includes a second lens module [306] that includes a second converging lens [308]. The second converging lens [308] of the example [100] of the lighting system is configured for causing convergence of some of the light emissions [202] of the semiconductor light-emitting device [104] to form further converged light emissions [412] along the central light emission axis [210] having a second HWHM around the central light emission axis [210] as represented by each of the arrows [310], [312], [314], [316] being different than the first HWHM represented by each of the arrows [110], [112], [114], [116], the second converging lens [308] having a second light output surface [414] being spaced apart along a second lens axis [416] from a second light input surface [418], the second converging lens [308] further having a second total internal reflection side surface [321] being spaced apart around the second lens axis [416] and having a second frusto-conical shape [323] extending between the second light input surface [418] and the second light output surface [414] of the second converging lens [308].

Figure 5:
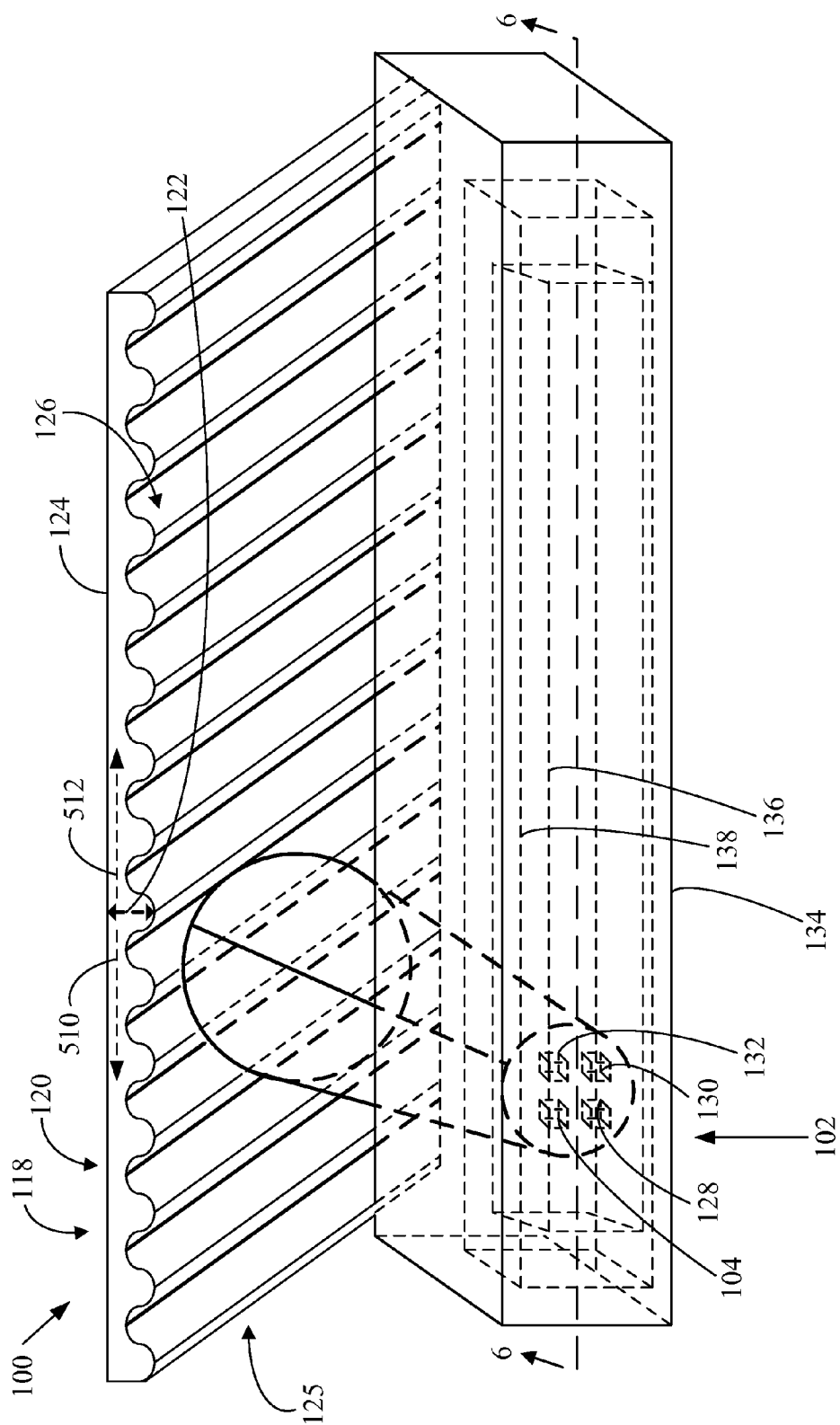
FIG. 5 is a perspective bottom view showing a further portion of the example [100] of an implementation of a lighting system.
Figure 6:
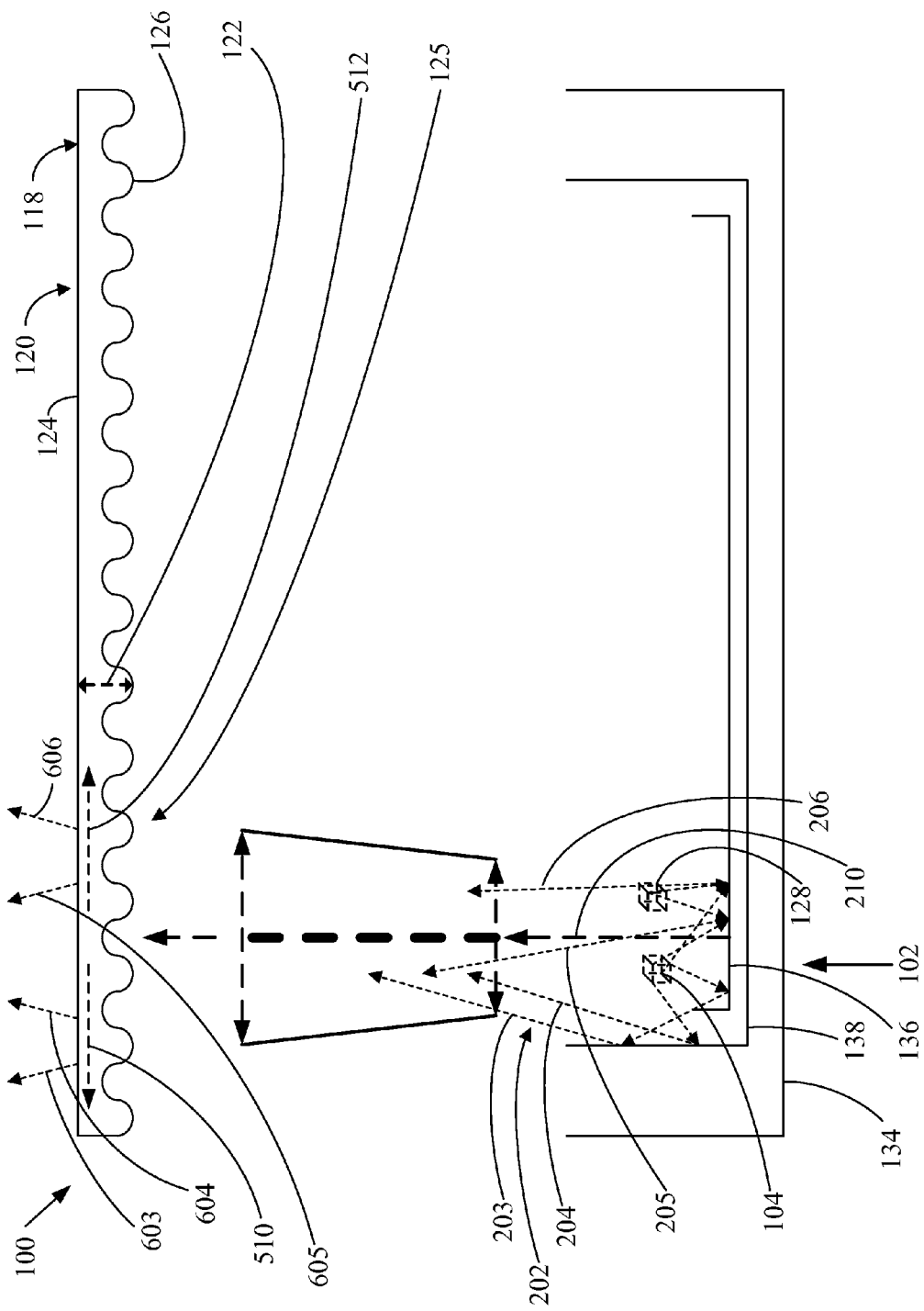
FIG. 6 is a cross-sectional side view taken along the line 6-6, showing the further portion of the example [100] of the lighting system.

FIG. 5 is a perspective bottom view showing a further portion of the example [100] of an implementation of a lighting system. FIG. 6 is a cross-sectional side view taken along the line 6-6, showing the further portion of the example [100] of the lighting system. As shown in FIGS. 1-6, the example [100] of the implementation of the lighting system further includes a third lens module [118] including a first diverging lens [120] having a third lens axis [122], the first diverging lens [120] being configured for causing divergence of some of the converged light emissions [212], [412] away from the third lens axis [122] by a third HWHM represented by each of the arrows [510], [512], to form diverged light emissions in directions represented by the arrows [603], [604], [605], [606] that diverge away from the central light emission axis [210]. As further shown in FIGS. 1-6, the first diverging lens [120] has a third light output surface [124] being spaced apart along the third lens axis [122] from a third light input surface [126], the third light input surface [126] including a first lens screen [125] having lenticular or microprismatic features. Referring to FIGS. 1-6, the example [100] of the lighting system is configured for detachably installing the first lens module [106] or the second lens module [306] in the lighting module [102] between the semiconductor light-emitting device [104] and the third lens module [118]; and the lighting system is configured for aligning the first lens axis [216] or the second lens axis [416] with the central light emission axis [210] and with the third lens axis [122].

Figure 7:
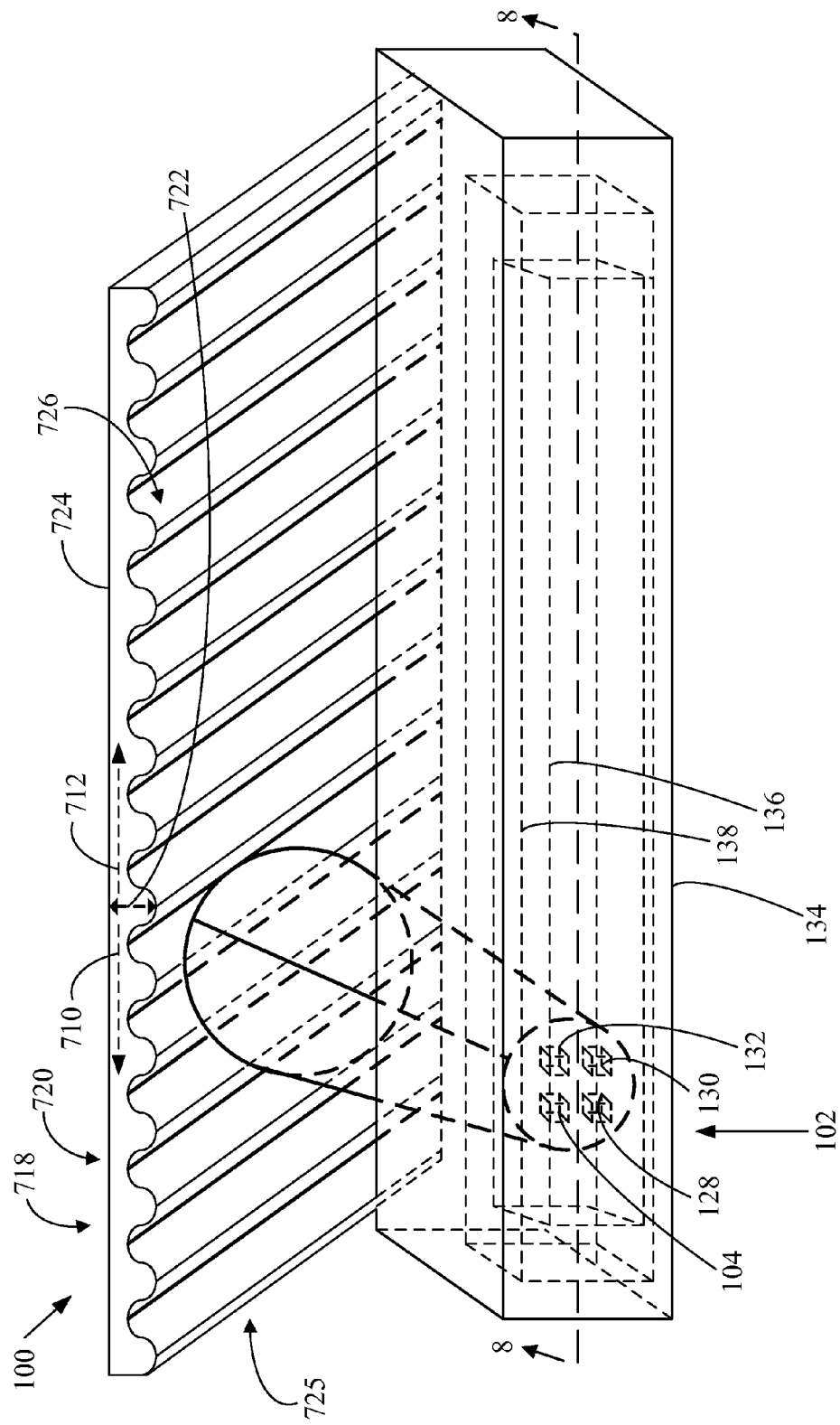
FIG. 7 is a perspective bottom view showing an example of an additional lens module that may be included in the example [100] of an implementation of a lighting system.
Figure 8:
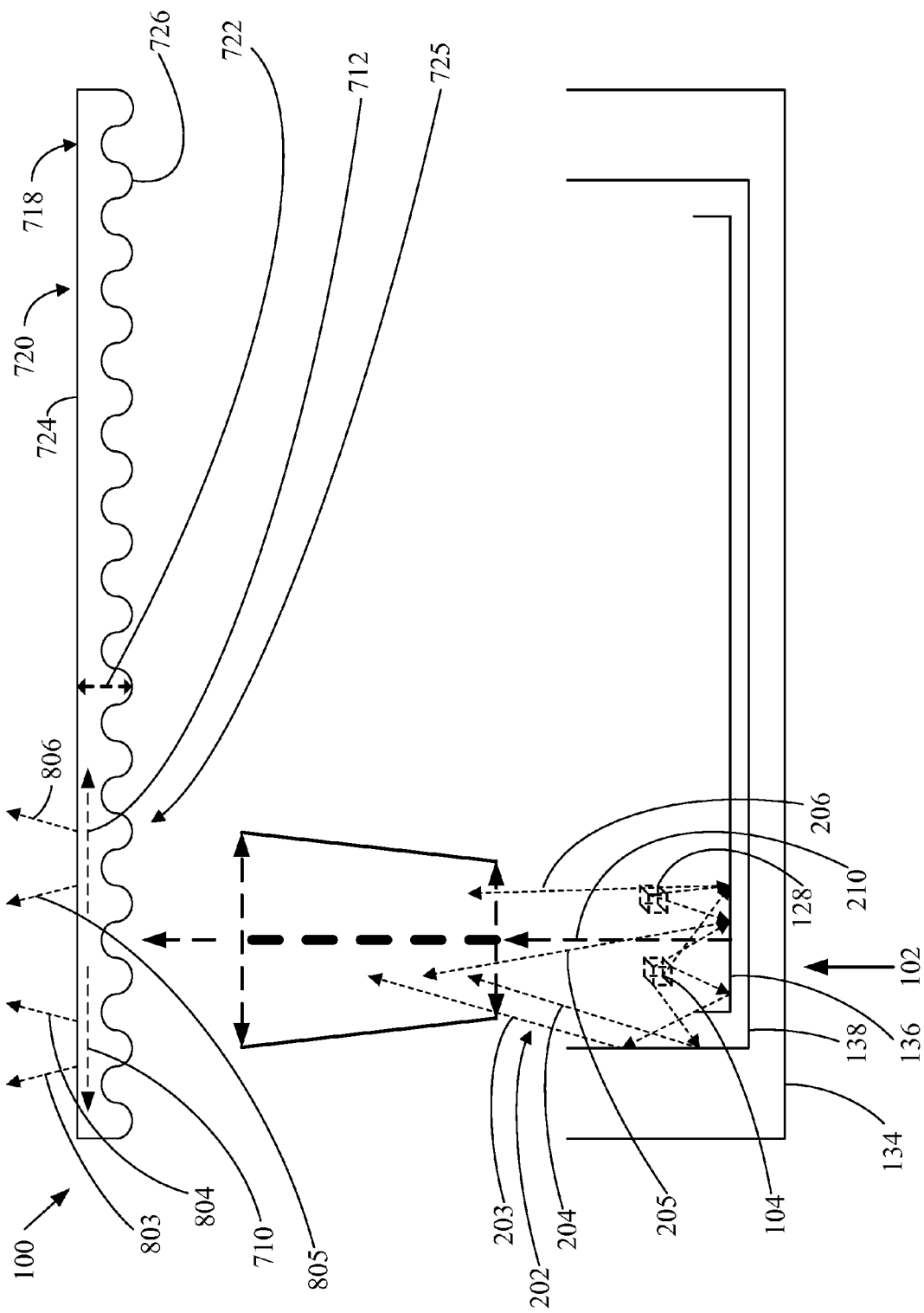
FIG. 8 is a cross-sectional side view taken along the line 8-8, showing the example of the additional lens module that may be included in the example [100] of the lighting system.

FIG. 7 is a perspective bottom view showing an example of an additional lens module that may be included in the example [100] of an implementation of a lighting system. FIG. 8 is a cross-sectional side view taken along the line 8-8, showing the example of the additional lens module that may be included in the example [100] of the lighting system. As shown in FIGS. 7-8, the example [100] of the implementation of the lighting system may include an additional lens module [718] including an additional diverging lens [720] having an additional lens axis [722], the additional diverging lens [720] being configured for causing divergence of some of the converged light emissions [212], [412] away from the additional lens axis [722] by an additional HWHM represented by each of the arrows [710], [712] being different than the third HWHM represented by each of the arrows [510], [512], to form additional diverged light emissions in directions represented by the arrows [803], [804], [805], [806] that diverge away from the central light emission axis [210]. As further shown in FIGS. 7-8, the additional diverging lens [720] may have an additional light output surface [724] being spaced apart along the additional lens axis [722] from an additional light input surface [726], and the additional light input surface [726] may include an additional lens screen [725] having lenticular or microprismatic features. In examples, the example [100] of the lighting system may be configured for detachably installing the first lens module [106] or the second lens module [306] in the lighting module [102] between the semiconductor light-emitting device [104] and the additional lens module [718]; and the example [100] of the lighting system may be configured for aligning the first lens axis [216] or the second lens axis [416] with the central light emission axis [210] and with the additional lens axis [722].

In further examples, the example [100] of the lighting system may be configured for interchangeably installing either the first lens module [106] or the second lens module [306] in the lighting module [102] between the semiconductor light-emitting device [104] and either the third lens module [118] or the additional lens module [718].

As another example of the example [100] of the lighting system, the lighting module [102] may include another semiconductor light-emitting device [128] being configured for emitting light emissions [202] along the central light emission axis [210]. In further examples of the example [100] of the lighting system, the lighting module [102] may include a plurality of additional semiconductor light-emitting devices [128], [130], [132], and the semiconductor light-emitting device [104] and the plurality of the additional semiconductor light-emitting devices [128], [130], [132] may be collectively arranged around and configured for emitting light emissions [202] along the central light emission axis [210]. In additional examples of the example [100] of the lighting system, one or more of the semiconductor light-emitting devices [104], [128], [130], [132] of the lighting module [102] may be configured as including a lumiphor (not shown) for changing a spectral power distribution of some of the light emissions [202].

In some examples of the example [100] of the lighting system, the first converging lens [108] may be configured for causing convergence of some of the light emissions [202] of the semiconductor light-emitting device [104] to form the converged light emissions [212] as having the first HWHM represented by each of the arrows [110], [112], [114], [116] being: about 3.5 degrees; or about 7.5 degrees; or about 12.5 degrees; or about 20 degrees. In further examples of the example [100] of the lighting system, the second converging lens [308] may be configured for causing convergence of some of the light emissions [202] of the semiconductor light-emitting device [104] to form the converged light emissions [412] as having the second HWHM represented by each of the arrows [310], [312], [314], [316] being: about 3.5 degrees; or about 7.5 degrees; or about 12.5 degrees; or about 20 degrees. In additional examples of the example [100] of the lighting system, the first diverging lens [120] may be configured for causing divergence of some of the converged light emissions [212], [412] away from the third lens axis [122] by a third HWHM represented by each of the arrows [510], [512] being: about 4 degrees; or about 10 degrees; or about 15 degrees; or about 25 degrees; or about 30 degrees. In other examples of the example [100] of the lighting system, the additional diverging lens [720] may be configured for causing divergence of some of the converged light emissions [212], [412] away from the additional lens axis [722] by another HWHM represented by each of the arrows [710], [712] being: about 4 degrees; or about 10 degrees; or about 15 degrees; or about 25 degrees; or about 30 degrees. In examples, an example [100] of the lighting system may include a diverging lens [120], [720] having a HWHM of: about 4 degrees including toroidal lenses each having a radius of about 0.815 millimeters ("mm") and a height of about 0.16 mm; or about 10 degrees including toroidal lenses each having a radius of about 0.825 millimeters ("mm") and a height of about 0.28 mm; or about 25 degrees including toroidal lenses each having a radius of about 0.845 millimeters ("mm") and a height of about 0.47 mm.

In examples of the example [100] of the lighting system, the first diverging lens [120] may have the first lens screen [125] as including an array of lenticular toroidal lenses. In further examples of the example [100] of the lighting system, the additional diverging lens [720] may have the additional lens screen [725] as including an array of lenticular toroidal lenses. In additional examples (not shown) of the example [100] of the lighting system, the either or both of the diverging lenses [120], [720] may respectively have the lens screen [125], [725] as including an array of microprismatic lenses.

In some examples of the example [100] of the lighting system, the first converging lens [108] may have a first diameter [228] transverse to the first lens axis [216] at the first light input surface [218], and the first converging lens [108] may have a second diameter [230] transverse to the first lens axis [216] at the first light output surface [214], and the first diameter [228] may be smaller than the second diameter [230]. In additional examples of the example [100] of the lighting system, the second converging lens [308] may have a first diameter [428] transverse to the second lens axis [416] at the second light input surface [418], and the second converging lens [308] may have a second diameter [430] transverse to the second lens axis [416] at the second light output surface [414], and the first diameter [428] may be smaller than the second diameter [430].

In other examples, the example [100] of the lighting system may include a housing [134] being configured for positioning the lighting module [102] for emission of the light emissions [202] from the semiconductor light-emitting device [104] along the central light emission axis [210]. In further examples, the example [100] of the lighting system may include a carrier [136] being configured for positioning the first lens module [106] or the second lens module [306] in the housing [134] with the first lens axis [216] or the second lens axis [416] being aligned with the central light emission axis [210]. In additional examples, the example [100] of the lighting system may include a primary visible light reflector [138] configured for being positioned between the housing [134] and the carrier [136], and the primary visible light reflector [138] may be configured for redirecting some of the light emissions [202] of the semiconductor light-emitting device [104] in the directions represented by the arrows [203], [204], [205], [206] along the central light emission axis [210]

Figure 9:
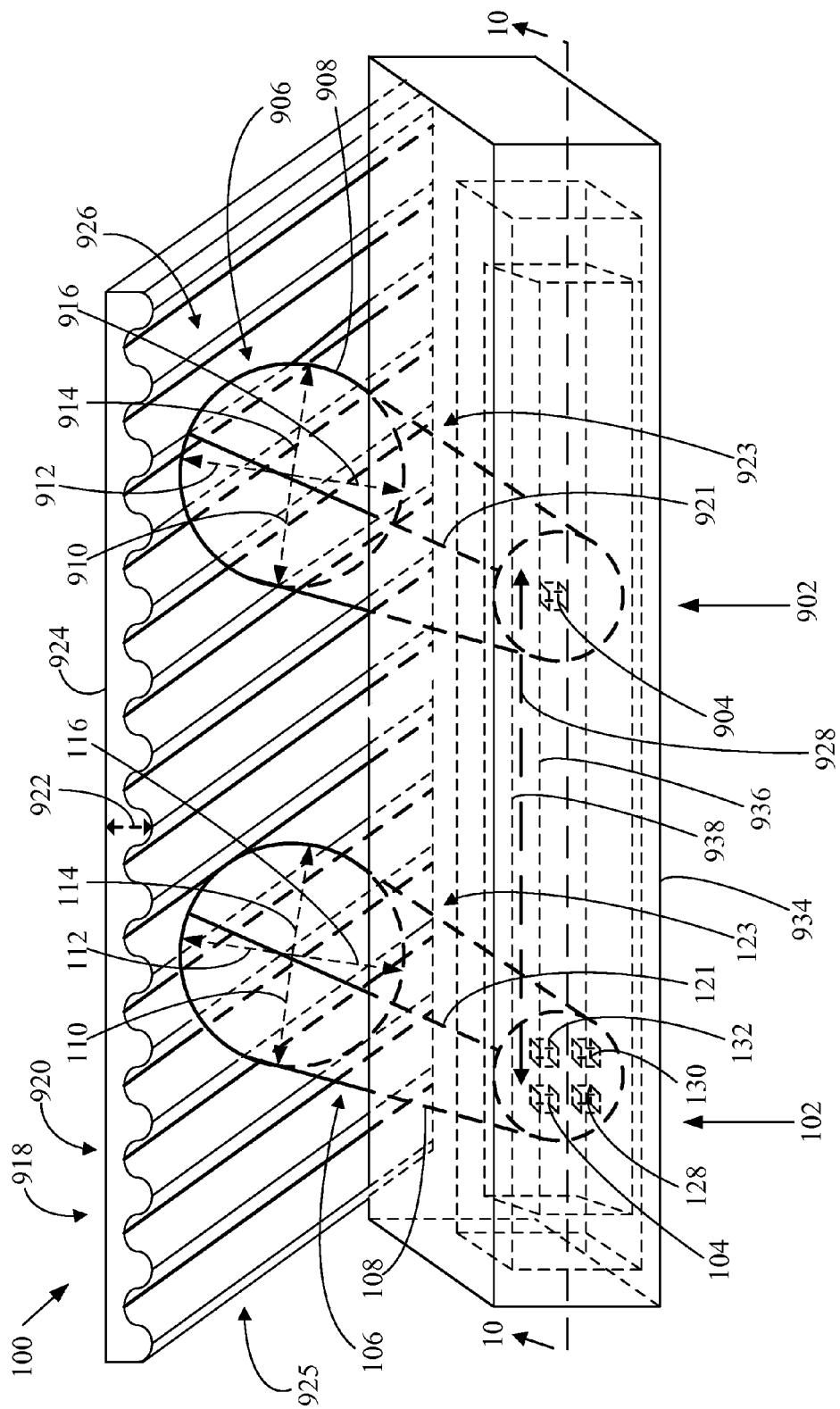
FIG. 9 is a perspective bottom view showing an example of a portion of a second lighting module that may be included in the example [100] of an implementation of a lighting system.
Figure 10:
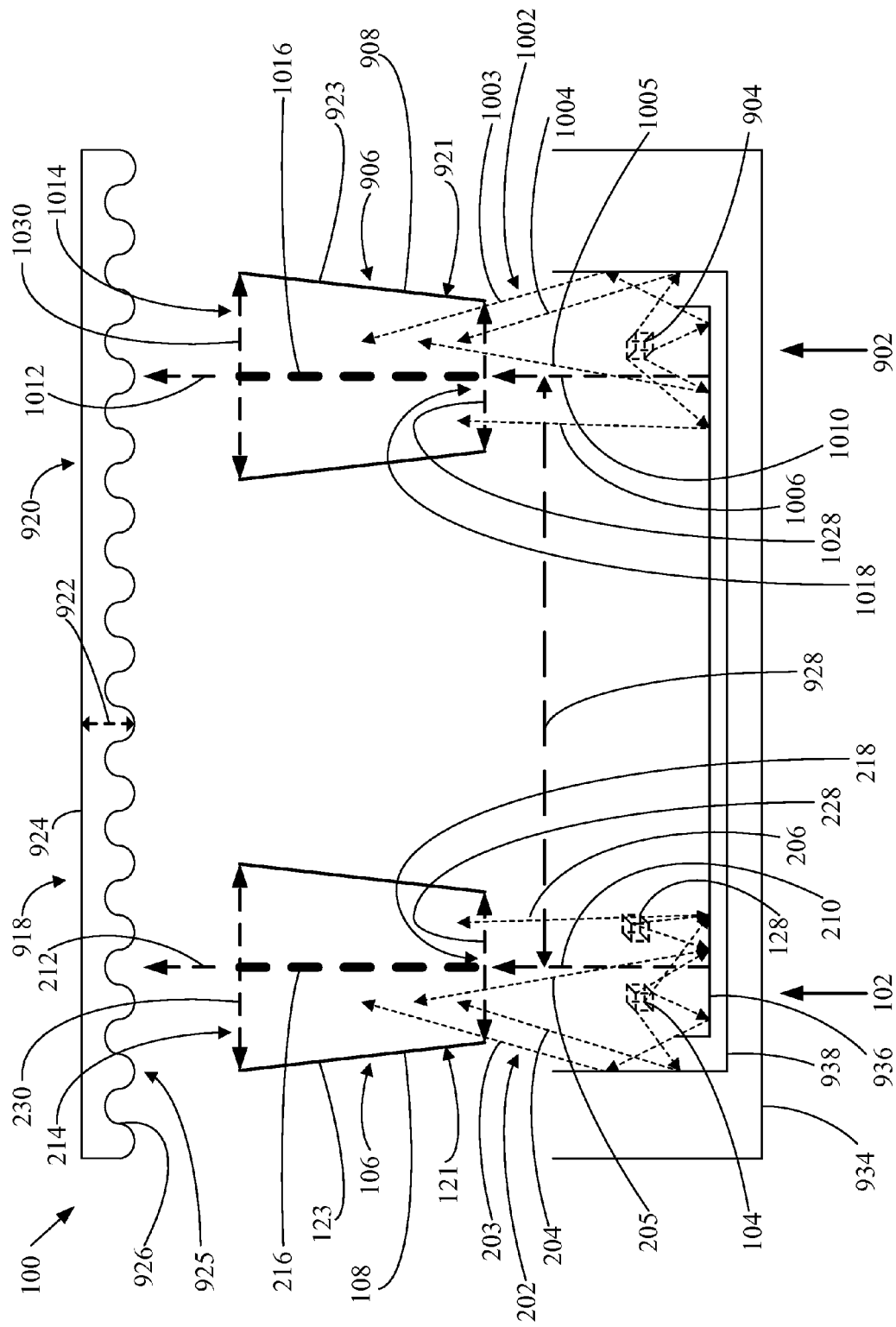
FIG. 10 is a cross-sectional side view taken along the line 10-10, showing the example of the portion of the second lighting module that may be included in the example [100] of the lighting system.

FIG. 9 is a perspective bottom view showing an example of a portion of a second lighting module that may be included in the example [100] of an implementation of a lighting system. FIG. 10 is a cross-sectional side view taken along the line 10-10, showing the example of the portion of the second lighting module that may be included in the example [100] of the lighting system. As shown in FIGS. 9-10, the example [100] of the implementation of the lighting system may include a second lighting module [902] including a second semiconductor light-emitting device [904] configured for emitting further light emissions [1002] in directions represented by the arrows [1003], [1004], [1005], [1006] along a second central light emission axis [1010]. Further, the example [100] of the lighting system may include a fourth lens module [906] that may include a third converging lens [908]. The third converging lens [908] of this example [100] of the lighting system may be configured for causing convergence of some of the further light emissions [1002] of the second semiconductor light-emitting device [904] to form additional converged light emissions [1012] along the second central light emission axis [1010] having a fourth HWHM represented by each of the arrows [910], [912], [914], [916], the third converging lens [908] having a fourth light output surface [1014] being spaced apart along a fourth lens axis [1016] from a fourth light input surface [1018], the third converging lens [908] further having a third total internal reflection side surface [921] being spaced apart around the fourth lens axis [1016] and having a third frusto-conical shape [923] extending between the fourth light input surface [1018] and the fourth light output surface [1014] of the third converging lens [908]. In further examples of the example [100] of the lighting system, the second lighting module [902] may include another or a plurality of additional semiconductor light-emitting devices (not shown), and the second semiconductor light-emitting device [904] and the another or the plurality of the additional semiconductor light-emitting devices may be collectively arranged around and configured for emitting the further light emissions [1002] along the second central light emission axis [1010]. In additional examples of the example [100] of the lighting system, the second semiconductor light-emitting device [904] and the another or the plurality of the additional semiconductor light-emitting devices of the second lighting module [902] may be configured as including a lumiphor (not shown) for changing a spectral power distribution of some of the further light emissions [1002].

Figure 11:
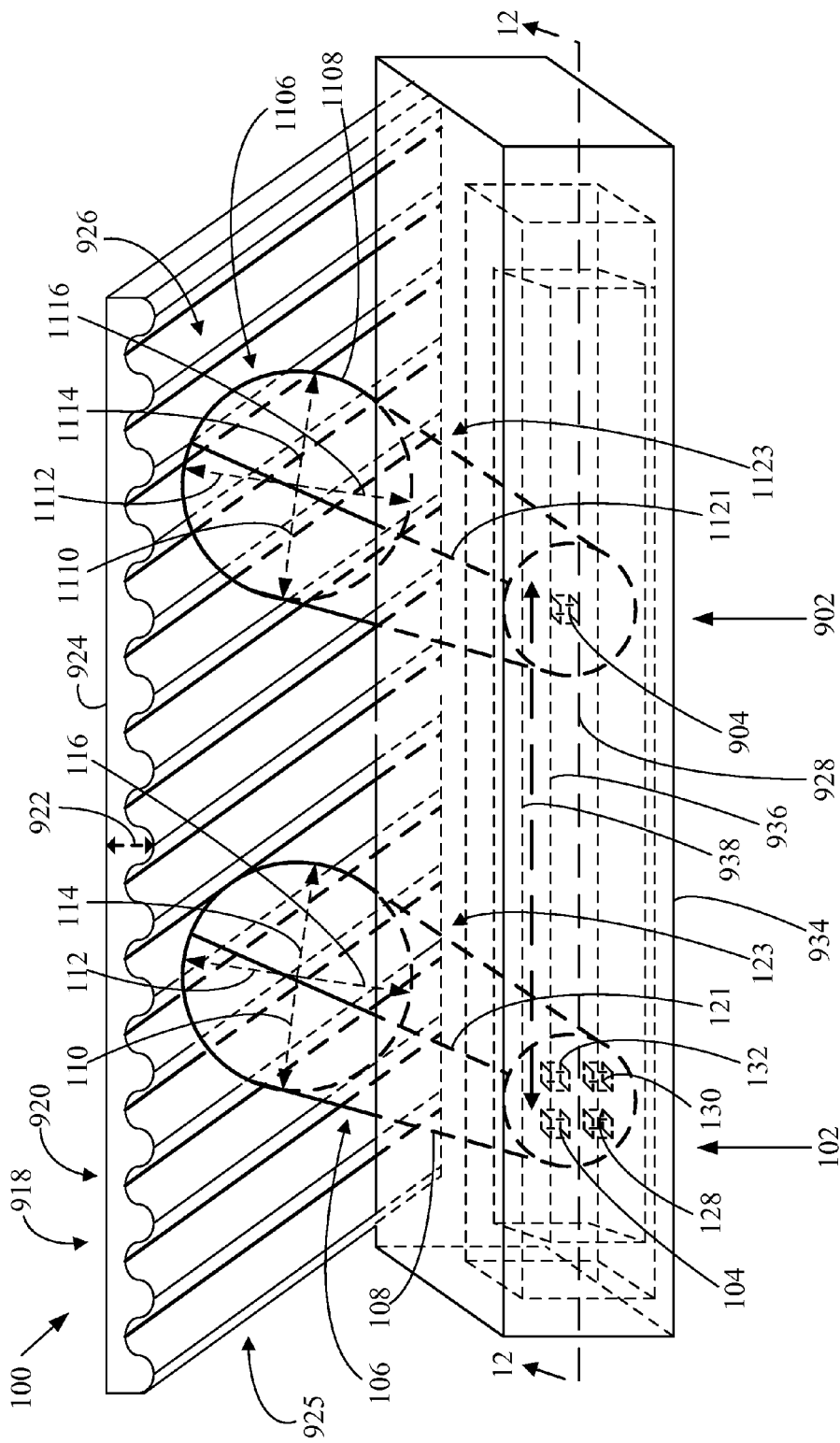
FIG. 11 is a perspective bottom view showing an example of another portion of the second lighting module that may be included in the example [100] of an implementation of a lighting system.
Figure 12:
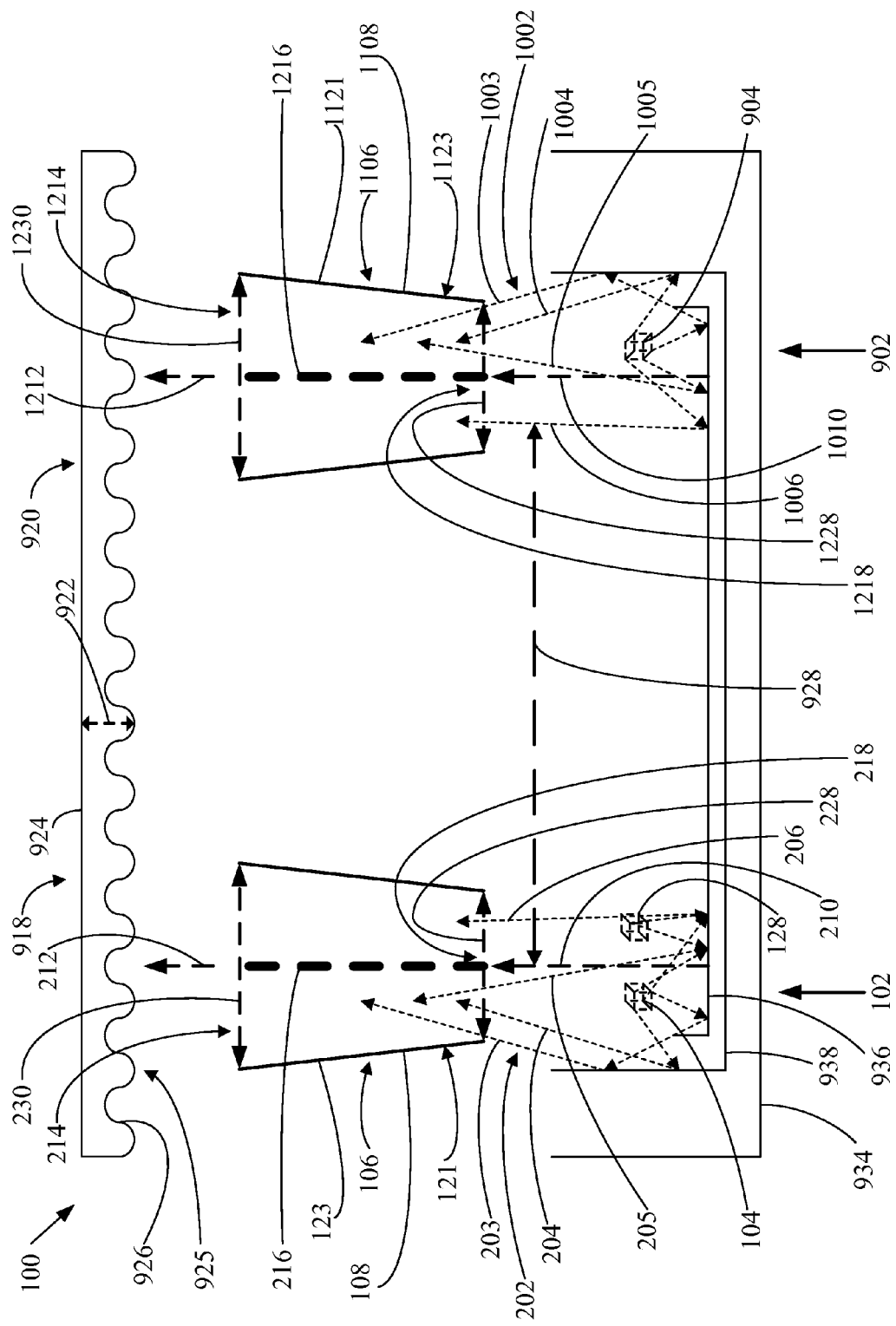
FIG. 12 is a cross-sectional side view taken along the line 12-12, showing the example of the another portion of the second lighting module that may be included in the example [100] of the lighting system.

FIG. 11 is a perspective bottom view showing an example of another portion of the second lighting module that may be included in the example [100] of an implementation of a lighting system. FIG. 12 is a cross-sectional side view taken along the line 12-12, showing the example of the another portion of the second lighting module that may be included in the example [100] of the lighting system. As shown in FIGS. 11-12, the example [100] of the implementation of the lighting system may include a fifth lens module [1106] that may include a fourth converging lens [1108]. The fourth converging lens [1108] may be configured for causing convergence of some of the further light emissions [1002] of the second semiconductor light-emitting device [904] to form other converged light emissions [1212] along the second central light emission axis [1010] having a fifth HWHM around the second central light emission axis [1010] as represented by each of the arrows [1110], [1112], [1114], [1116] being different than the fourth HWHM represented by each of the arrows [910], [912], [914], [916], the fourth converging lens [1108] having a fifth light output surface [1214] being spaced apart along a fifth lens axis [1216] from a fifth light input surface [1218], the fourth converging lens [1108] further having a fourth total internal reflection side surface [1121] being spaced apart around the fifth lens axis [1216] and having a fourth frusto-conical shape [1123] extending between the fifth light input surface [1218] and the fifth light output surface [1214] of the fourth converging lens [1108].

Figure 13:
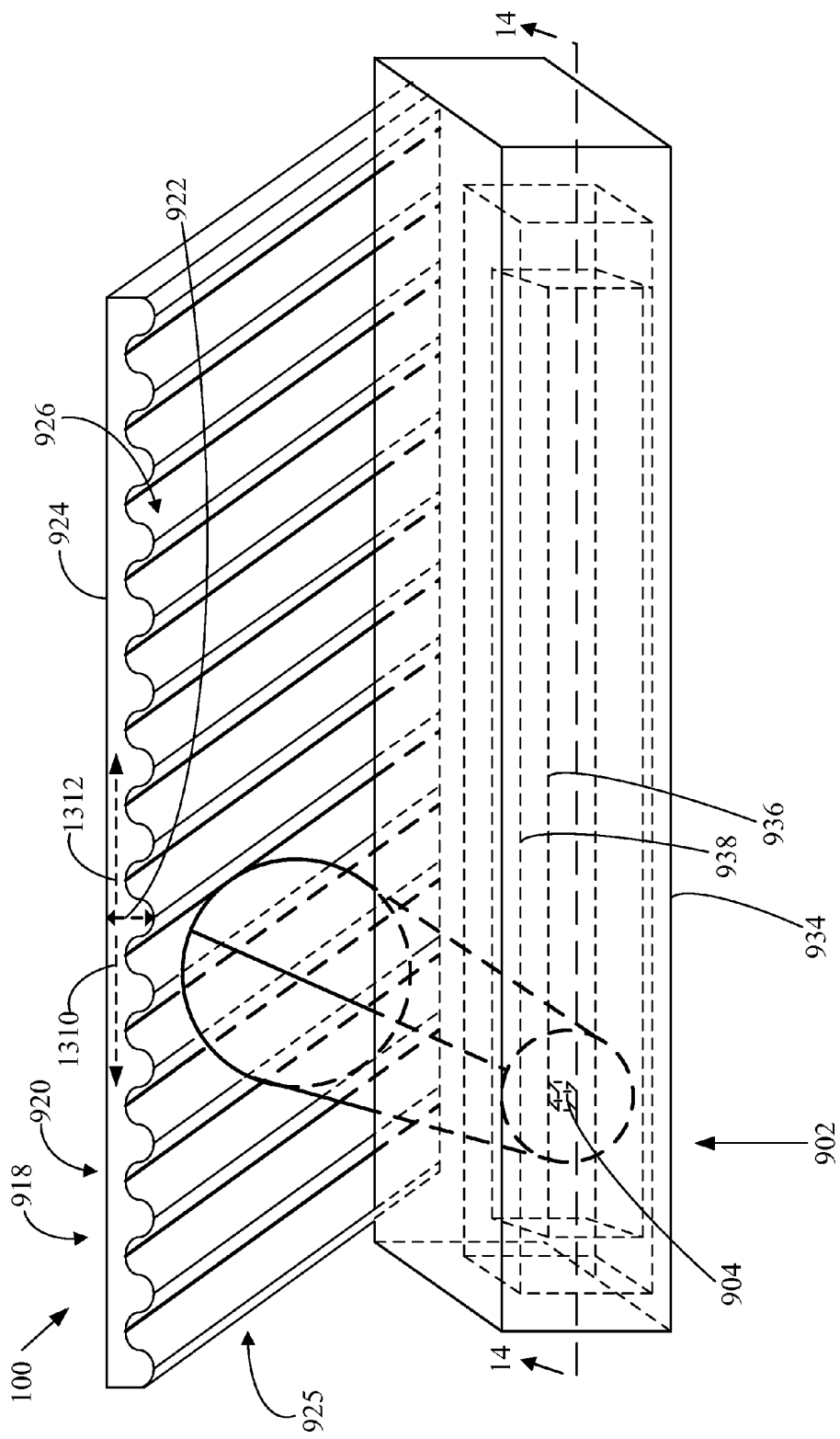
FIG. 13 is a perspective bottom view showing an example of a further portion of the second lighting module that may be included in the example [100] of an implementation of a lighting system.
Figure 14:
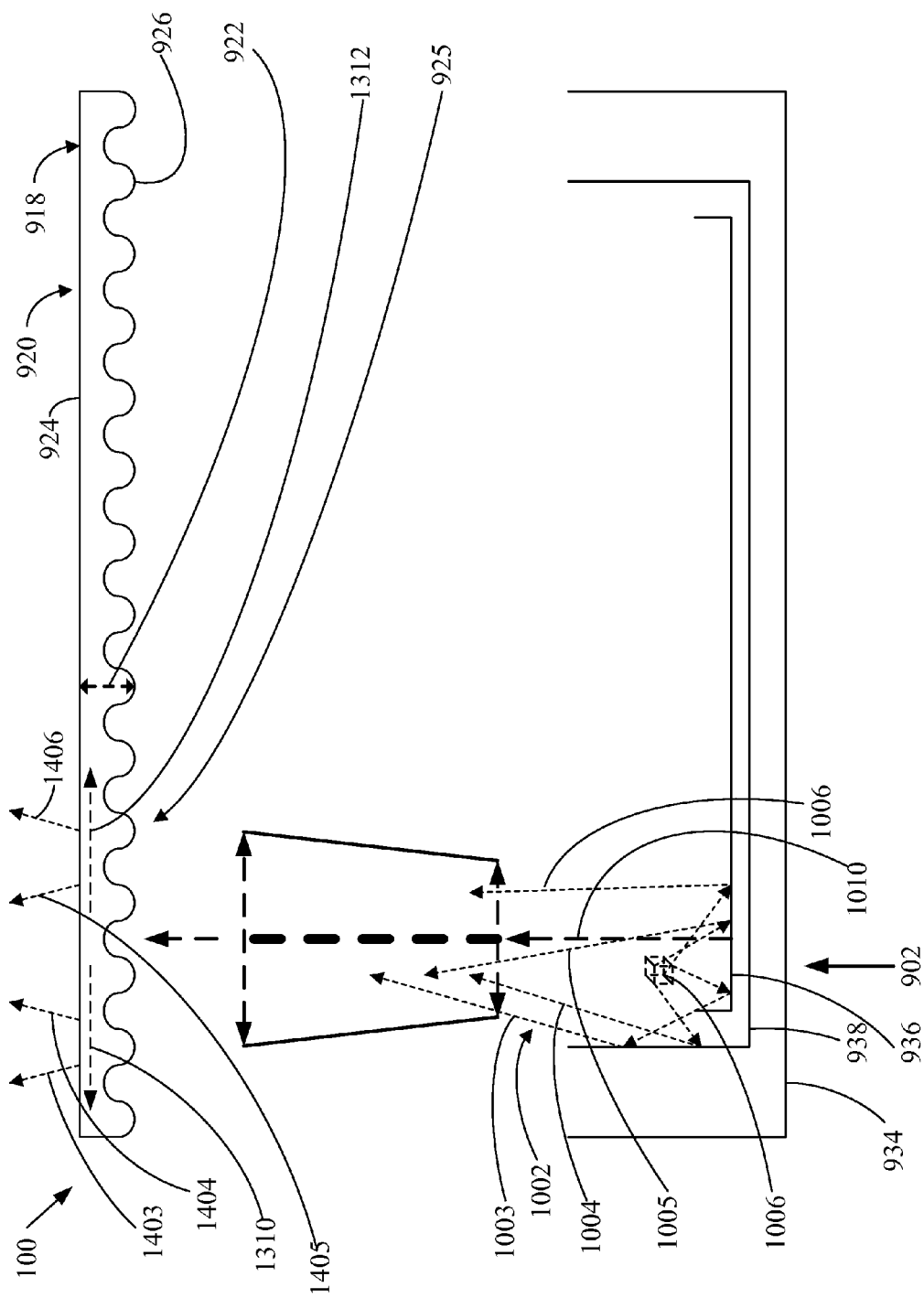
FIG. 14 is a cross-sectional side view taken along the line 14-14, showing the example of the further portion of the second lighting module that may be included in the example [100] of the lighting system.

FIG. 13 is a perspective bottom view showing an example of a further portion of the second lighting module that may be included in the example [100] of an implementation of a lighting system. FIG. 14 is a cross-sectional side view taken along the line 14-14, showing the example of the further portion of the second lighting module that may be included in the example [100] of the lighting system. As shown in FIGS. 9-14, the example [100] of the implementation of the lighting system may include a sixth lens module [918] including a second diverging lens [920] having a sixth lens axis [922], the second diverging lens [920] being configured for causing divergence of some of the converged light emissions [1012], [1212] from each of the lens modules [906], [1106] away from the sixth lens axis [922] by a sixth HWHM represented by each of the arrows [1310], [1312] to form diverged light emissions in directions represented by the arrows [1403], [1404], [1405], [1406] that diverge away from the second central light emission axis [1010]. As shown in FIGS. 9-14, the second diverging lens [920] may have a sixth light output surface [924] being spaced apart along the sixth lens axis [922] from a sixth light input surface [926], the sixth light input surface [926] including a second lens screen [925] having lenticular or microprismatic features.

In examples, the example [100] of the lighting system may be configured for detachably installing the fourth lens module [906] or the fifth lens module [1106] in the second lighting module [902] between the second semiconductor light-emitting device [904] and the sixth lens module [918]; and the example [100] of the lighting system may be configured for aligning the fourth lens axis [1016] or the fifth lens axis [1216] with the second central light emission axis [1010] and the sixth lens axis [922].

In some examples of the example [100] of the lighting system, the third converging lens [908] may be configured for causing convergence of some of the further light emissions [1002] of the second semiconductor light-emitting device [904] to form the converged light emissions [1012] as having the fourth HWHM represented by each of the arrows [910], [912], [914], [916] being: about 3.5 degrees; or about 7.5 degrees; or about 12.5 degrees; or about 20 degrees. In further examples of the example [100] of the lighting system, the fourth converging lens [1108] may be configured for causing convergence of some of the further light emissions [1002] of the second semiconductor light-emitting device [904] to form the converged light emissions [1212] as having the fifth HWHM represented by each of the arrows [1110], [1112], [1114], [1116] being: about 3.5 degrees; or about 7.5 degrees; or about 12.5 degrees; or about 20 degrees. In additional examples of the example [100] of the lighting system, the second diverging lens [920] may be configured for causing divergence of some of the converged light emissions [212], [412], [1012], [1212] away from the sixth lens axis [922] by a sixth HWHM represented by each of the arrows [1310], [1312] being: about 4 degrees; or about 10 degrees; or about 15 degrees; or about 25 degrees; or about 30 degrees. In examples of the example [100] of the lighting system, the second diverging lens [920] may have the second lens screen [925] as including an array of lenticular toroidal lenses. In other examples (not shown) of the example [100] of the lighting system, the second diverging lens [920] may have the second lens screen [925] as including an array of microprismatic lenses.

In some examples of the example [100] of the lighting system, the third converging lens [908] may have a third diameter [1028] transverse to the fourth lens axis [1016] at the fourth light input surface [1018], and the third converging lens [908] may have a fourth diameter [1030] transverse to the fourth lens axis [1016] at the fourth light output surface [1014], and the third diameter [1028] may be smaller than the fourth diameter [1030]. In additional examples of the example [100] of the lighting system, the fourth converging lens [1108] may have a third diameter [1228] transverse to the fifth lens axis [1216] at the fifth light input surface [1218], and the fourth converging lens [1108] may have a fourth diameter [1230] transverse to the fifth lens axis [1216] at the fifth light output surface [1214], and the third diameter [1228] may be smaller than the fourth diameter [1230].

In other examples, the example [100] of the lighting system may include a housing [934] being configured: for positioning the lighting module [102] for emission of the light emissions [202] from the semiconductor light-emitting device [104] along the central light emission axis [210]; and for positioning the second lighting module [902] for emission of the further light emissions [1002] from the second semiconductor light-emitting device [904] along the second central light emission axis [1010]. In further examples, the example [100] of the lighting system may include a carrier [936] being configured: for positioning the first lens module [106] or the second lens module [306] in the housing [934] with the first lens axis [216] or the second lens axis [416] being aligned with the central light emission axis [210]; and for positioning the fourth lens module [906] or the fifth lens module [1106] in the housing [934] with the fourth lens axis [1016] or the fifth lens axis [1216] being aligned with the second central light emission axis [1010]. In additional examples, the example [100] of the lighting system may include a primary visible light reflector [938] configured for being positioned between the housing [934] and the carrier [936], and the primary visible light reflector [938] may be configured for redirecting some of the further light emissions [1002] of the second semiconductor light-emitting device [904] in the directions represented by the arrows [1003], [1004], [1005], [1006] along the second central light emission axis [1010].

Figure 16:
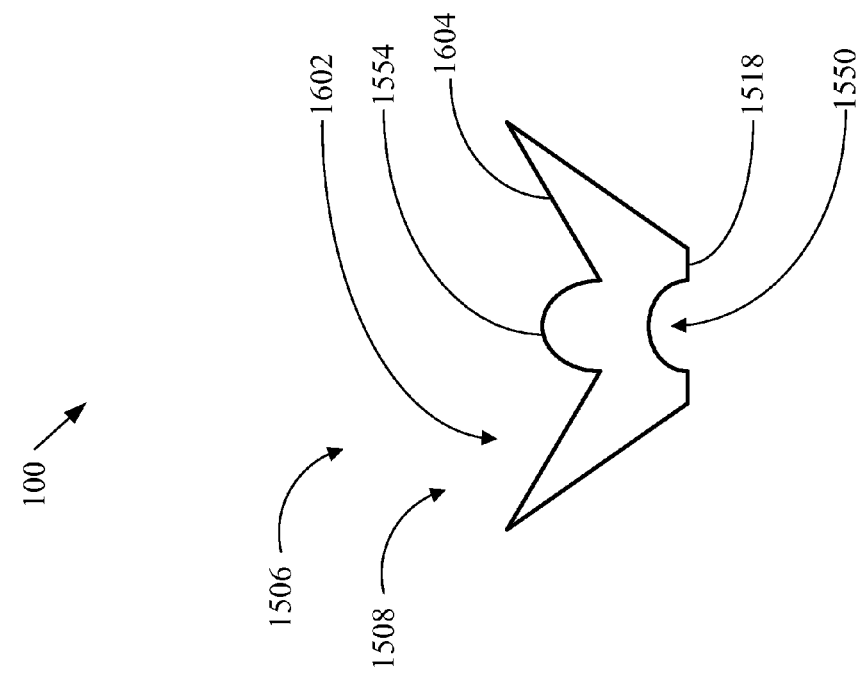
FIG. 16 is a cross-sectional side view taken along the line 16-16, showing the example of the another lens module that may be included in the example [100] of the lighting system.
Figure 15:
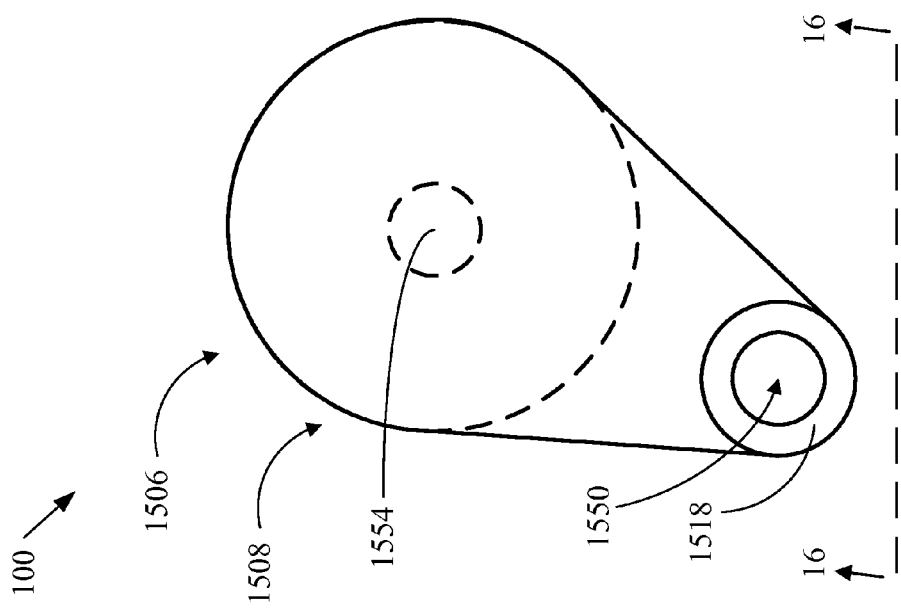
FIG. 15 is a perspective bottom view showing an example of another lens module that may be included in the example [100] of an implementation of a lighting system.

FIG. 15 is a perspective bottom view showing an example of another lens module that may be included in the example [100] of an implementation of a lighting system. FIG. 16 is a cross-sectional side view taken along the line 16-16, showing the example of the another lens module that may be included in the example [100] of the lighting system. In examples, the example [100] of the lighting system may include a lens module [1506] as being: the first lens module [106]; or the second lens module [306]; or the fourth lens module [906]; or the fifth lens module [1106]. As examples, the lens module [1506] may include a converging lens [1508]. In examples, the converging lens [1508] may include a light input surface [1518] having a central cavity [1550] being shaped as a portion of a spheroid. In further examples, the converging lens [1508] may include a light output surface [1602] having a bowl-shaped cavity [1604] surrounding a central mound [1554] shaped as a portion of a spheroid. In some examples of the example [100] of the lighting system, the converging lens [1508] may be configured for causing convergence of some of the light emissions [202], [1002] of the semiconductor light-emitting devices [104], [904] to form the converged light emissions [212], [412], [1012], [1212] as having a HWHM being about 3.5 degrees.

Figure 18:
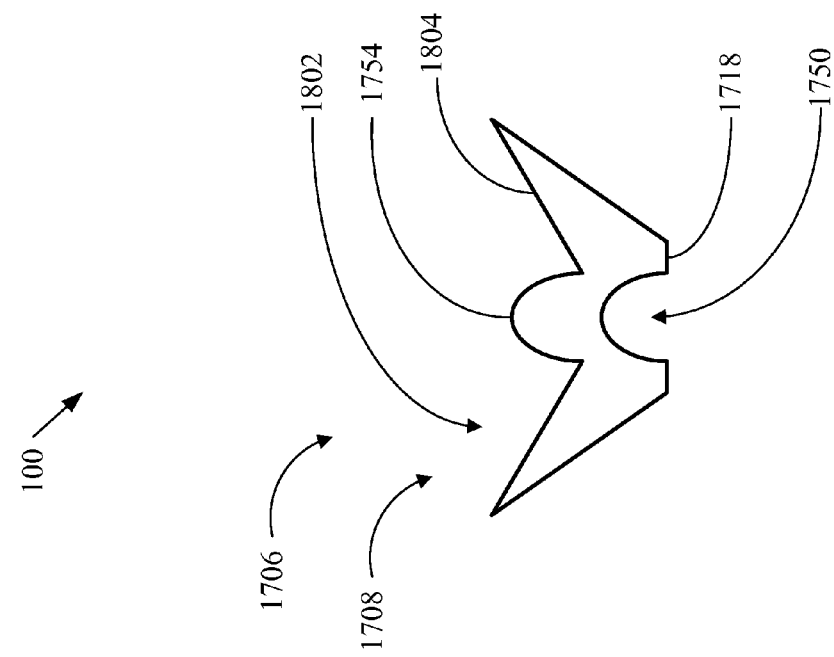
FIG. 18 is a cross-sectional side view taken along the line 18-18, showing the example of the further lens module that may be included in the example [100] of the lighting system.
Figure 17:
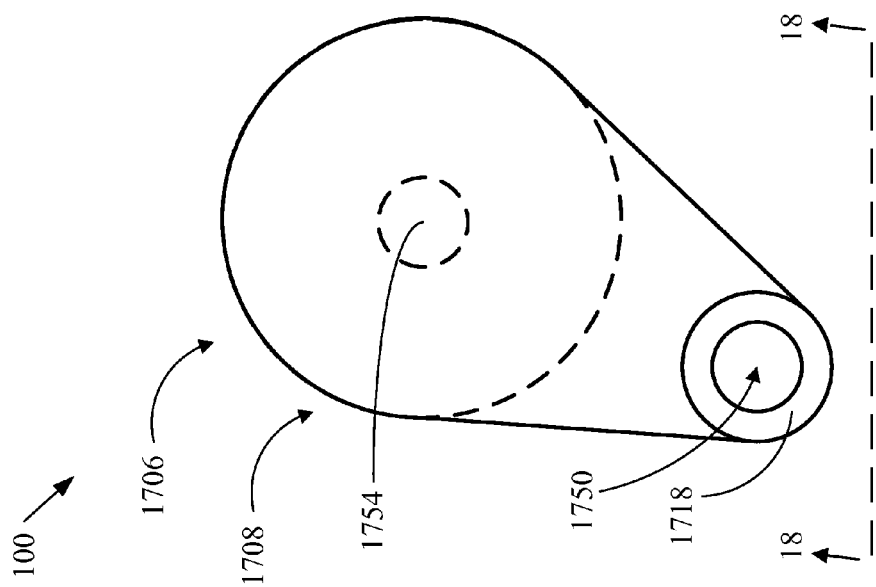
FIG. 17 is a perspective bottom view showing an example of a further lens module that may be included in the example [100] of an implementation of a lighting system.

FIG. 17 is a perspective bottom view showing an example of a further lens module that may be included in the example [100] of an implementation of a lighting system. FIG. 18 is a cross-sectional side view taken along the line 18-18, showing the example of the further lens module that may be included in the example [100] of the lighting system. In examples, the example [100] of the lighting system may include a lens module [1706] as being: the first lens module [106]; or the second lens module [306]; or the fourth lens module [906]; or the fifth lens module [1106]. As examples, the lens module [1706] may include a converging lens [1708]. In examples, the converging lens [1708] may include a light input surface [1718] having a central cavity [1750] being shaped as a portion of a spheroid. In further examples, the converging lens [1708] may include a light output surface [1802] having a bowl-shaped cavity [1804] surrounding a central mound [1754] shaped as a portion of a spheroid. In some examples of the example [100] of the lighting system, the converging lens [1708] may be configured for causing convergence of some of the light emissions [202], [1002] of the semiconductor light-emitting devices [104], [904] to form the converged light emissions [212], [412], [1012], [1212] as having a HWHM being about 7.5 degrees.

Figures 19, 20:
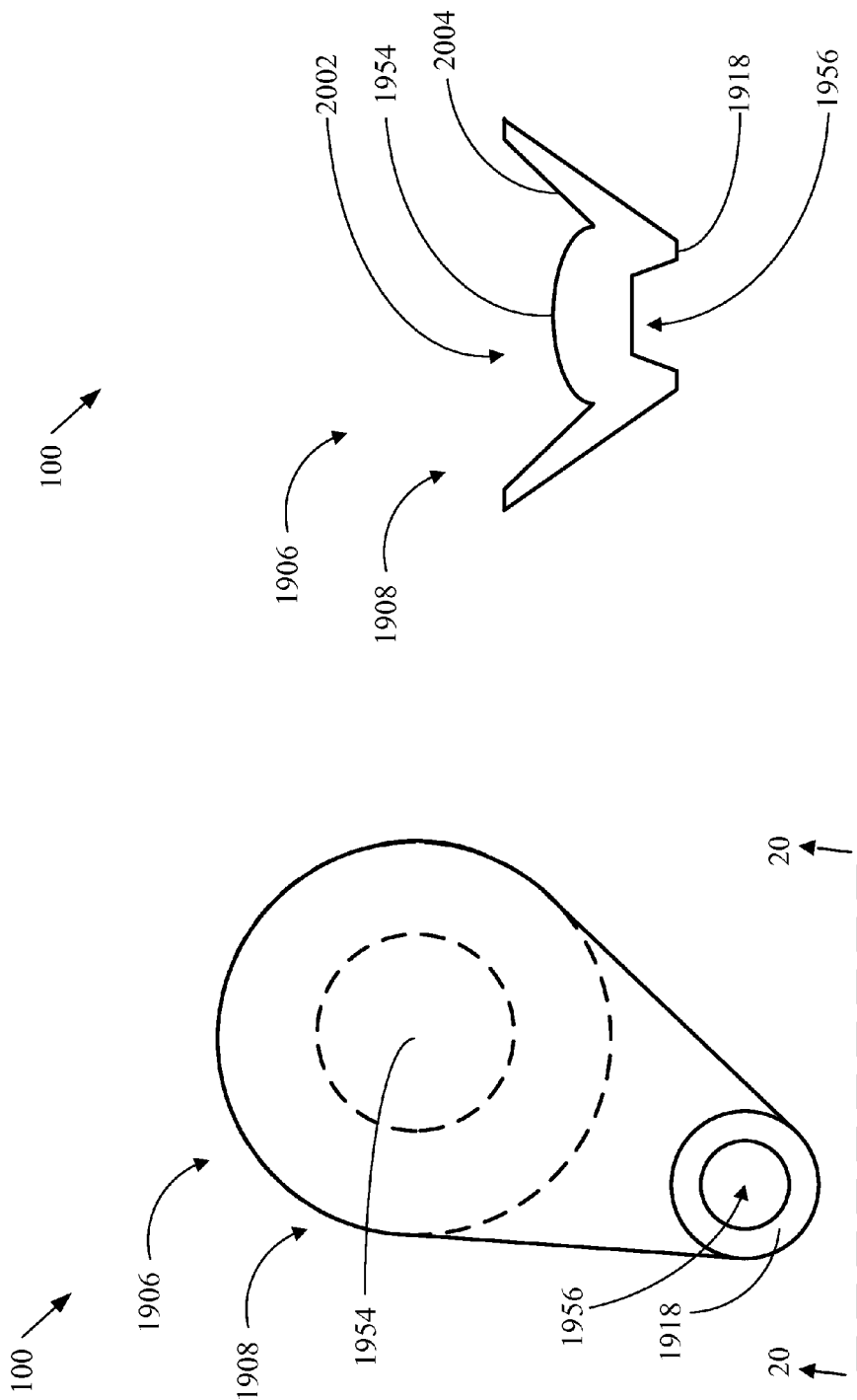
FIG. 19 is a perspective bottom view showing an example of an additional lens module that may be included in the example [100] of an implementation of a lighting system.
FIG. 20 is a cross-sectional side view taken along the line 20-20, showing the example of the additional lens module that may be included in the example [100] of the lighting system.

FIG. 19 is a perspective bottom view showing an example of an additional lens module that may be included in the example [100] of an implementation of a lighting system. FIG. 20 is a cross-sectional side view taken along the line 20-20, showing the example of the additional lens module that may be included in the example [100] of the lighting system. In examples, the example [100] of the lighting system may include a lens module [1906] as being: the first lens module [106]; or the second lens module [306]; or the fourth lens module [906]; or the fifth lens module [1106]. As examples, the lens module [1906] may include a converging lens [1908]. In examples, the converging lens [1908] may include a light input surface [1918] having a central disk-shaped cavity [1956]. In further examples, the converging lens [1908] may include a light output surface [2002] having a bowl-shaped cavity [2004] surrounding a central mound [1954] shaped as a portion of a spheroid. In some examples of the example [100] of the lighting system, the converging lens [1908] may be configured for causing convergence of some of the light emissions [202], [1002] of the semiconductor light-emitting devices [104], [904] to form the converged light emissions [212], [412], [1012], [1212] as having a HWHM being about 12.5 degrees.

Figure 22:
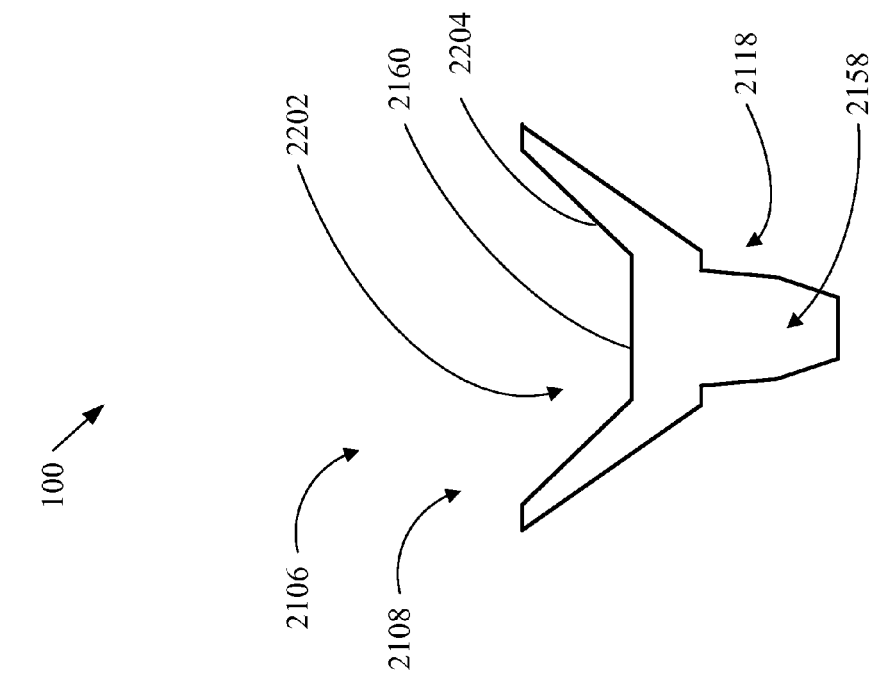
FIG. 22 is a cross-sectional side view taken along the line 22-22, showing the example of the another lens module that may be included in the example [100] of the lighting system.
Figure 21:
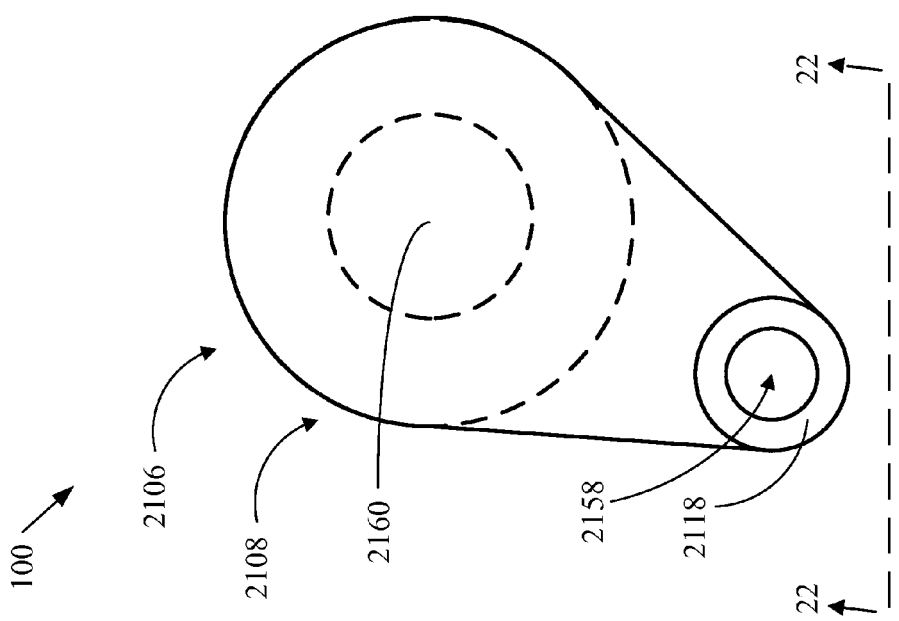
FIG. 21 is a perspective bottom view showing an example of another lens module that may be included in the example [100] of an implementation of a lighting system.

FIG. 21 is a perspective bottom view showing an example of another lens module that may be included in the example [100] of an implementation of a lighting system. FIG. 22 is a cross-sectional side view taken along the line 22-22, showing the example of the another lens module that may be included in the example [100] of the lighting system. In examples, the example [100] of the lighting system may include a lens module [2106] as being: the first lens module [106]; or the second lens module [306]; or the fourth lens module [906]; or the fifth lens module [1106]. As examples, the lens module [2106] may include a converging lens [2108]. In examples, the converging lens [2108] may include a light input surface [2118] having a central compound parabolic concentrator [2158]. In further examples, the converging lens [2108] may include a light output surface [2202] having a bowl-shaped cavity [2204] surrounding a central flat region [2160]. In some examples of the example [100] of the lighting system, the converging lens [2108] may be configured for causing convergence of some of the light emissions [202], [1002] of the semiconductor light-emitting devices [104], [904] to form the converged light emissions [212], [412], [1012], [1212] as having a HWHM being about 20 degrees.

In some examples, the example [100] of the lighting system may be configured for interchangeably installing either: the first lens module [106] in the lighting module [102] and the fourth lens module [906] in the second lighting module [902]; or the second lens module [306] in the lighting module [102] and the fifth lens module [1106] in the second lighting module [902]. In additional examples, the example [100] of the lighting system may include the first lens module [106] as being integral with the fourth lens module [906], and may include the second lens module [306] as being integral with the fifth lens module [1106]. In further examples [100] of the lighting system (not shown), the first lens module [106] may be integral with a plurality of fourth lens modules [906]; and the second lens module [306] may be integral with a plurality of fifth lens modules [1106]. In additional examples [100] of the lighting system (not shown), the first lens module [106] and the plurality of fourth lens modules [906], or the second lens module [306] and the plurality of fifth lens modules [1106], may collectively be integrated in a row, or in a plurality of rows, or in a circle. As further examples [100] of the lighting system (not shown), a plurality of the fourth lens modules [906], being within a range of between one and about twenty, or being within a range of between one and about one hundred, may be integrated together with the first lens module [106]. As other examples [100] of the lighting system (not shown), a plurality of the fifth lens modules [1106], being within a range of between one and about twenty, or being within a range of between one and about one hundred, may be integrated together with the second lens module [306].

Figure 23:
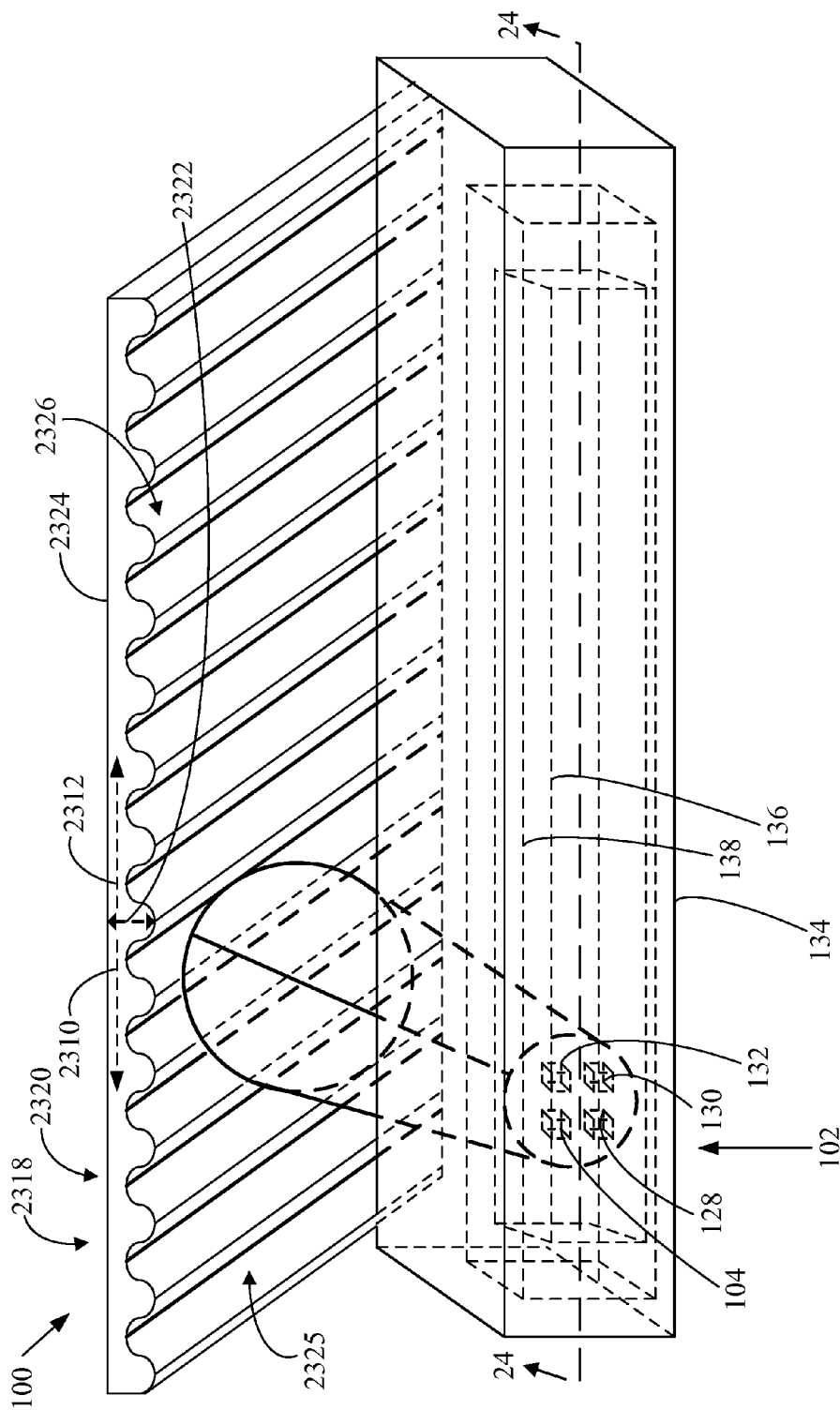
FIG. 23 is a perspective bottom view showing an example of a seventh lens module that may be included in the example [100] of an implementation of a lighting system.
Figure 24:
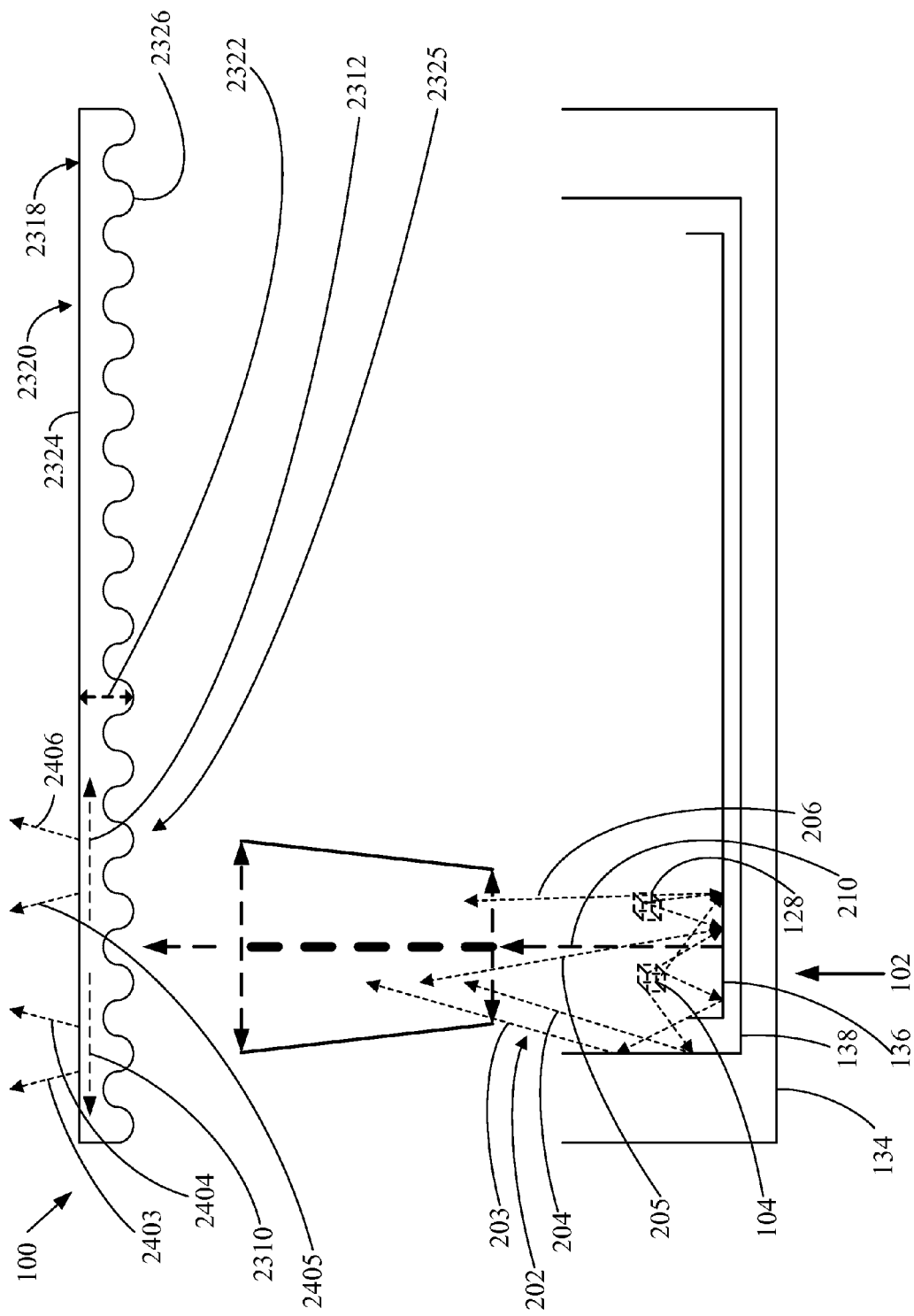
FIG. 24 is a cross-sectional side view taken along the line 24-24, showing the example of the seventh lens module that may be included in the example [100] of the lighting system.

FIG. 23 is a perspective bottom view showing an example of a seventh lens module that may be included in the example [100] of an implementation of a lighting system. FIG. 24 is a cross-sectional side view taken along the line 24-24, showing the example of the seventh lens module that may be included in the example [100] of the lighting system. In some examples [100], the lighting system may include a seventh lens module [2318] including a third diverging lens [2320] having a seventh lens axis [2322], the third diverging lens [2320] being configured for causing divergence of some of the converged light emissions [212], [412] away from the seventh lens axis [2322] by a seventh HWHM represented by each of the arrows [2310], [2312], being different than the third HWHM represented by each of the arrows [510], [512], to form additional diverged light emissions represented by the arrows [2403], [2404], [2405], [2406] that may diverge away from the central light emission axis [210]. As examples, the third diverging lens [2320] may have a seventh light output surface [2324] being spaced apart along the seventh lens axis [2322] from a seventh light input surface [2326], the seventh light input surface [2326] including a third lens screen [2325] having lenticular or microprismatic features. In examples, the example [100] of the lighting system may be configured for detachably installing the first lens module [106] or the second lens module [306] in the lighting module [102] between the semiconductor light-emitting device [104] and the seventh lens module [2318]; and the example [100] of the lighting system may be configured for aligning the first lens axis [216] or the second lens axis [416] with the central light emission axis [210] and the seventh lens axis [2322].

Figure 25:
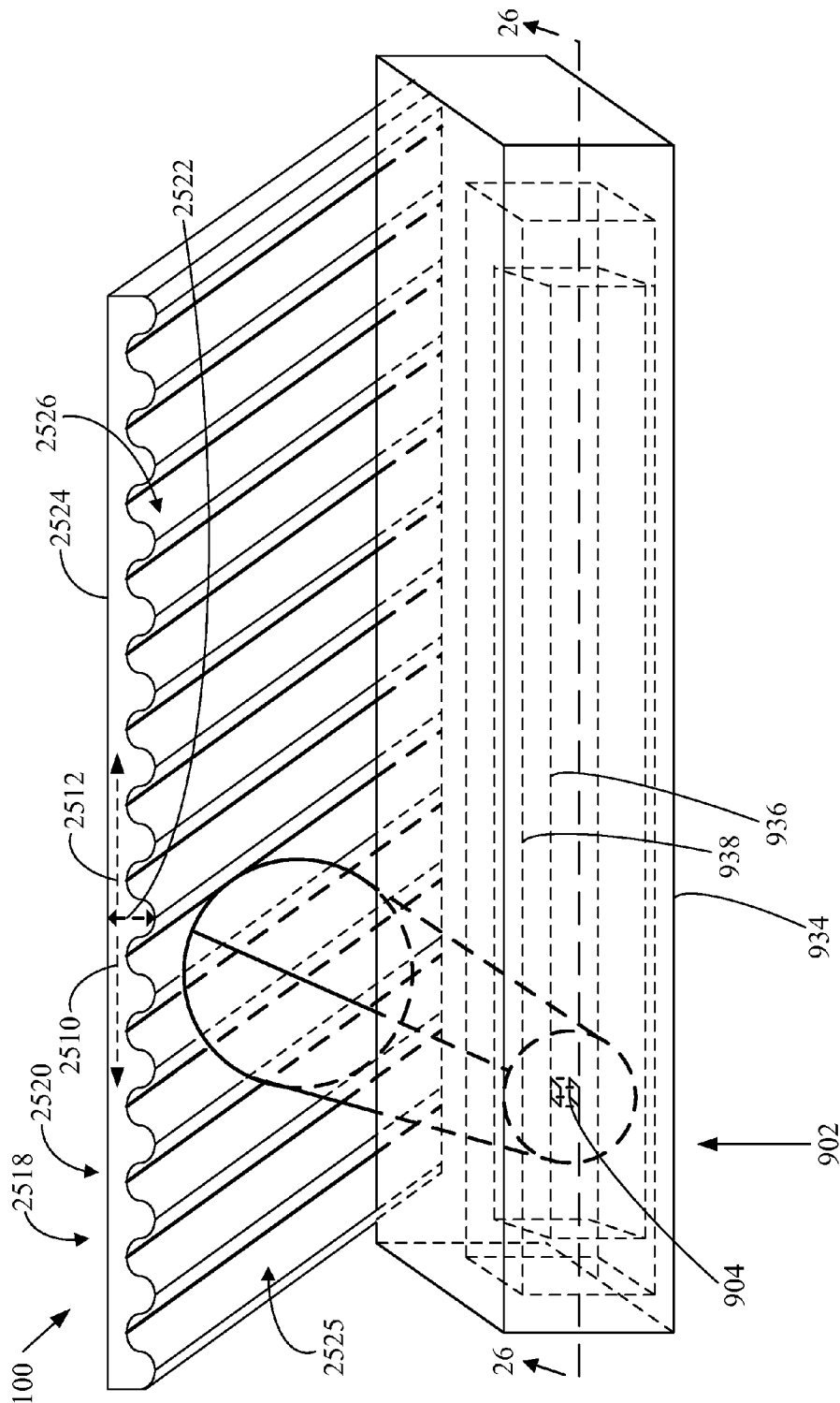
FIG. 25 is a perspective bottom view showing an example of an eighth lens module that may be included in the example [100] of an implementation of a lighting system.
Figure 26:
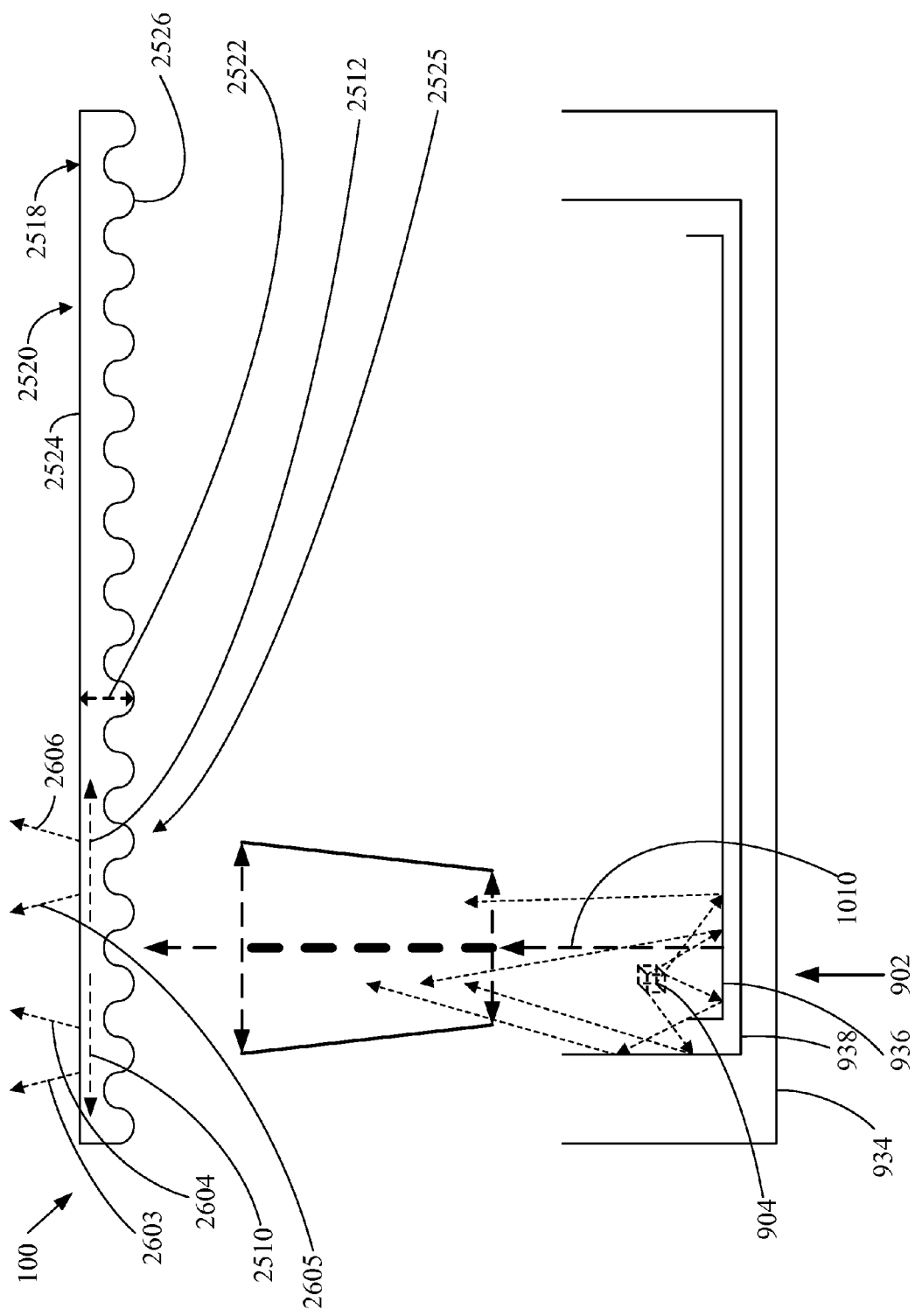
FIG. 26 is a cross-sectional side view taken along the line 26-26, showing the example of the eighth lens module that may be included in the example [100] of the lighting system.

FIG. 25 is a perspective bottom view showing an example of an eighth lens module that may be included in the example [100] of an implementation of a lighting system. FIG. 26 is a cross-sectional side view taken along the line 26-26, showing the example of the eighth lens module that may be included in the example [100] of the lighting system. In some examples [100], the lighting system may include an eighth lens module [2518] including a fourth diverging lens [2520] having an eighth lens axis [2522], the fourth diverging lens [2520] being configured for causing divergence of some of the converged light emissions [1012], 1212] away from the eighth lens axis [2522] by an eighth HWHM represented by each of the arrows [2510], [2512], being different than the sixth HWHM represented by each of the arrows [1310], [1312], to form additional diverged light emissions represented by arrows [2603], [2604], [2605], [2606] that may diverge away from the second central light emission axis [1010]. As examples, the fourth diverging lens [2520] may have an eighth light output surface [2524] being spaced apart along the eighth lens axis [2522] from an eighth light input surface [2526], the eighth light input surface [2526] including a fourth lens screen [2525] having lenticular or microprismatic features. In examples, the example [100] of the lighting system may be configured for detachably installing the fourth lens module [906] or the fifth lens module [1106] in the second lighting module [902] between the second semiconductor light-emitting device [904] and the eighth lens module [2518]; and the example [100] of the lighting system may be configured for aligning the fourth lens axis [1016] or the fifth lens axis [1216] with the second central light emission axis [1010] and the eighth lens axis [2522]

In some examples, the example [100] of the lighting system may be configured for interchangeably installing either: the third lens module [118] in the lighting module [102] and the sixth lens module [918] in the second lighting module [902]; or the seventh lens module [2318] in the lighting module [102] and the eighth lens module [2518] in the second lighting module [902]. In further examples [100] of the lighting system, the third lens module [118] may be integral with the sixth lens module [918], and the seventh lens module [2318] may be integral with the eighth lens module [2518]. In further examples [100] of the lighting system (not shown), the third lens module [118] may be integral with a plurality of sixth lens modules [918]; and the seventh lens module [2318] may be integral with a plurality of eighth lens modules [2518]. In additional examples [100] of the lighting system (not shown), the third lens module [118] and the plurality of sixth lens modules [918], or the seventh lens module [2318] and the plurality of eighth lens modules [2518], may collectively be integrated in a row, or in a plurality of rows, or in a circle. As further examples [100] of the lighting system (not shown), a plurality of the sixth lens modules [918], being within a range of between one and about twenty, or being within a range of between one and about one hundred, may be integrated together with the third lens module [118]. As other examples [100] of the lighting system (not shown), a plurality of the seventh lens modules [2318], being within a range of between one and about twenty, or being within a range of between one and about one hundred, may be integrated together with the eighth lens module [2518].

In additional examples [100] of the lighting system, the third HWHM of the third lens module [118] may be the same as the sixth HWHM of the sixth lens module [918]; and the seventh HWHM of the seventh lens module [2318] may be the same as the eighth HWHM of the eighth lens module [2518]. As other examples, the example [100] of the lighting system may be further configured for interchangeably installing either: the first lens module [106] in the lighting module [102] and the fourth lens module [906] in the second lighting module [902]; or the second lens module [306] in the lighting module [102] and the fifth lens module [1106] in the second lighting module [902]. In additional examples [100] of the lighting system [100], the first lens module [106] may be integral with the fourth lens module [906], and the second lens module [306] may be integral with the fifth lens module [1106].

In some examples [100] of the lighting system, the first diverging lens [120] may be integral with the second diverging lens [920]; and the example [100] of the lighting system may be configured for positioning the semiconductor light-emitting device [104] as being spaced apart on a longitudinal axis [928] away from the second semiconductor light-emitting device [904], and the first and second diverging lenses [120], [920] may be integrally configured for causing divergence of some of the converged light emissions [212], [412], [1012], [1212] away from the central light emission axes [210], [1010] in directions that are spaced apart from directions along the longitudinal axis [928]. In additional examples [100] of the lighting system, each of the first and second diverging lenses [120], [920] may be configured for causing divergence of some of the converged light emissions [212], [412], [1012], [1212] away from the central light emission axes [210], [1010] in directions that are spaced apart from directions along the longitudinal axis [928] by an HWHM being: about 4 degrees; or about 10 degrees; or about 15 degrees; or about 25 degrees; or about 30 degrees.

In some examples [100] of the lighting system, the first, second, third and fourth converging lenses [108], [308], [908], and [1108] may respectively be configured for forming the converged light emissions [212], [412], [1012], [1212] as having the first, second, fourth, and fifth HWHM being within a range of between about 2 degrees and about 5 degrees; and the first and second diverging lenses [120], [920] may be configured for causing divergence of some of the converged light emissions [212], [412], [1012], [1212] away from the central light emission axes [210], [1010] in directions that are spaced apart from directions along the longitudinal axis [928] by an HWHM being within a range of between about 2 degrees and about 6 degrees. Further in those examples [100] of the lighting system, the diverged light emissions may have a cumulative HWHM away from the central light emission axes [210], [1010] in directions that are spaced apart from directions along the longitudinal axis [928] being within a range of between about 4 degrees and about 11 degrees.

In some examples [100] of the lighting system, the first, second, third and fourth converging lenses [108], [308],

[908], and [1108] may respectively be configured for forming the converged light emissions [212], [412], [1012], [1212] as having the first, second, fourth, and fifth HWHM being within a range of between about 15 degrees and about 25 degrees; and the first and second diverging lenses [120], [920] may be configured for causing divergence of some of the converged light emissions [212], [412], [1012], [1212] away from the central light emission axes [210], [1010] in directions that are spaced apart from directions along the longitudinal axis [928] by an HWHM being within a range of between about 25 degrees and about 35 degrees. Further in those examples [100] of the lighting system, the diverged light emissions may have a cumulative HWHM away from the central light emission axes [210], [1010] in directions that are spaced apart from directions along the longitudinal axis [928] being within a range of between about 40 degrees and about 60 degrees.

In some examples [100] of the lighting system, the first, second, third and fourth converging lenses [108], [308], [908], and [1108] may respectively be configured for forming the converged light emissions [212], [412], [1012], [1212] as having the first, second, fourth, and fifth HWHM being within a range of between about 15 degrees and about 25 degrees; and the first and second diverging lenses [120], [920] may be configured for causing divergence of some of the converged light emissions [212], [412], [1012], [1212] away from the central light emission axes [210], [1010] in directions that are spaced apart from directions along the longitudinal axis [928] by an HWHM being within a range of between about 2 degrees and about 6 degrees. Further in those examples [100] of the lighting system, the diverged light emissions may have a cumulative HWHM away from the central light emission axes [210], [1010] in directions that are spaced apart from directions along the longitudinal axis [928] being within a range of between about 17 degrees and about 31 degrees.

In some examples [100] of the lighting system, the first, second, third and fourth converging lenses [108], [308], [908], and [1108] may respectively be configured for forming the converged light emissions [212], [412], [1012], [1212] as having the first, second, fourth, and fifth HWHM being within a range of between about 2 degrees and about 5 degrees; and the first and second diverging lenses [120], [920] may be configured for causing divergence of some of the converged light emissions [212], [412], [1012], [1212] away from the central light emission axes [210], [1010] in directions that are spaced apart from directions along the longitudinal axis [928] by an HWHM being within a range of between about 25 degrees and about 35 degrees. Further in those examples [100] of the lighting system, the diverged light emissions may have a cumulative HWHM away from the central light emission axes [210], [1010] in directions that are spaced apart from directions along the longitudinal axis [928] being within a range of between about 27 degrees and about 40 degrees.

In some examples [100] of the lighting system, the first diverging lens [120] may be integral with the second diverging lens [920]; and the example [100] of the lighting system may be configured for positioning the semiconductor light-emitting device [104] as being spaced apart on the longitudinal axis [928] away from the second semiconductor light-emitting device [904], and the first and second diverging lenses [120], [920] may be integrally configured for causing divergence of some of the converged light emissions [212], [412], [1012], [1212] away from the central light emission axes [210], [1010] in directions that are spaced apart from directions being transverse to the longitudinal axis [928]. As an example, the eighth lens module [2518] may be rotated by ninety (90) degrees on the second central light emission axis [1010] to accordingly change the directions of divergence of some of the converged light emissions. In additional examples [100] of the lighting system, each of the first and second diverging lenses [120], [920] may be configured for causing divergence of some of the converged light emissions [212], [412], [1012], [1212] away from the central light emission axes [210], [1010] in directions that are spaced apart from directions being transverse to the longitudinal axis [928] by an HWHM being: about 4 degrees; or about 10 degrees; or about 15 degrees; or about 25 degrees; or about 30 degrees.

In some examples [100] of the lighting system, the first, second, third and fourth converging lenses [108], [308], [908], and [1108] may respectively be configured for forming the converged light emissions [212], [412], [1012], [1212] as having the first, second, fourth, and fifth HWHM being within a range of between about 2 degrees and about 25 degrees; and the first and second diverging lenses [120], [920] may be configured for causing divergence of some of the converged light emissions [212], [412], [1012], [1212] away from the central light emission axes [210], [1010] in directions that are spaced apart from directions being transverse to the longitudinal axis [928] by an HWHM being within a range of between about 4 degrees and about 30 degrees. Further in those examples [100] of the lighting system, the diverged light emissions may have a cumulative HWHM away from the central light emission axes [210], [1010] in directions that are spaced apart from directions being transverse to the longitudinal axis [928] being within a range of between about 6 degrees and about 55 degrees.

Figure 27:
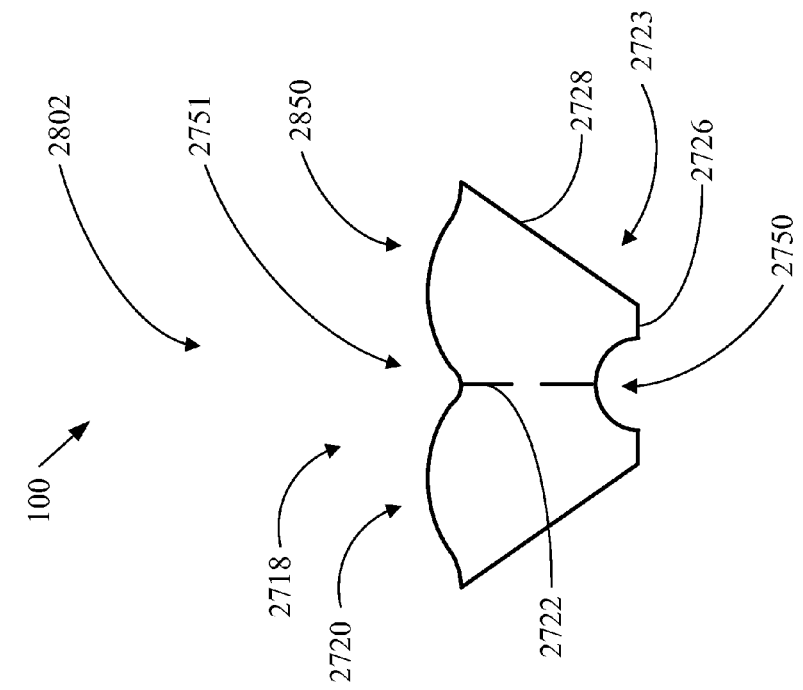
FIG. 27 is a perspective bottom view showing an example of a ninth lens module that may be included in the example [100] of an implementation of a lighting system.
Figure 28:
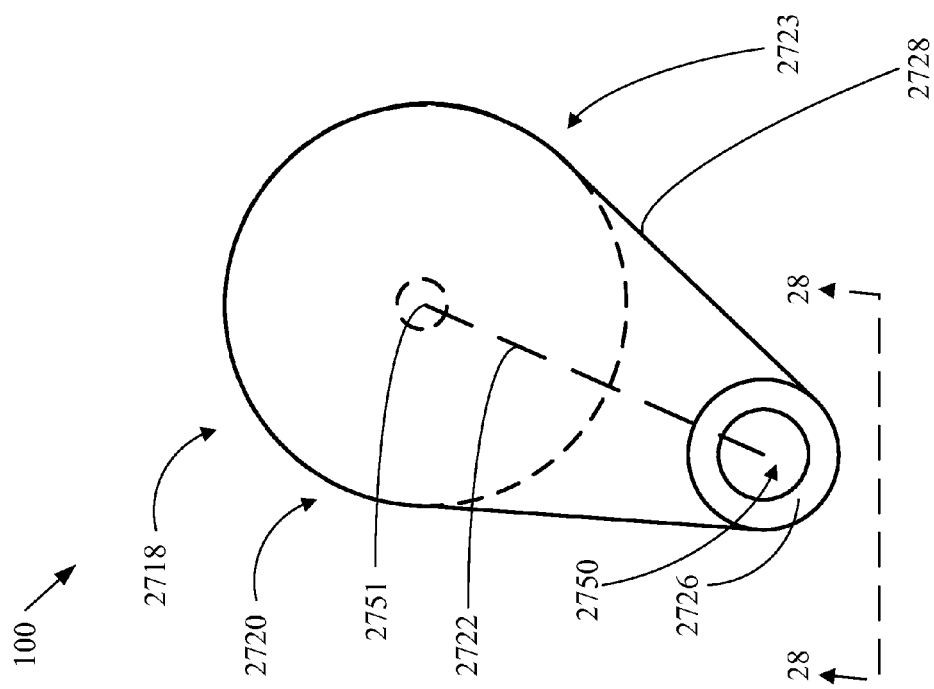
FIG. 28 is a cross-sectional side view taken along the line 28-28, showing the example of the ninth lens module that may be included in the example [100] of the lighting system.

FIG. 27 is a perspective bottom view showing an example of a ninth lens module that may be included in the example [100] of an implementation of a lighting system. FIG. 28 is a cross-sectional side view taken along the line 28-28, showing the example of the ninth lens module that may be included in the example [100] of the lighting system. In some examples, the example [100] of the lighting system may include a ninth lens module [2718] including a fifth diverging lens [2720]. The fifth diverging lens [2720] may have a ninth light output surface [2802] being spaced apart along a ninth lens axis [2722] from a ninth light input surface [2726], the fifth diverging lens [2720] having a fifth total internal reflection side surface [2728] being spaced apart around the ninth lens axis [2722] and having a fifth frusto-conical shape [2723] extending between the ninth light input surface [2726] and the ninth light output surface [2802] of the fifth diverging lens [2720]. Further, for example, the ninth light input surface [2726] of the fifth diverging lens [2720] may include a central cavity [2750] being shaped as a portion of a spheroid. Additionally, for example, the ninth light output surface [2802] of the fifth diverging lens [2720] may include a first raised region [2850] being shaped as a sliced torus having a second central cavity [2751]. In examples, the example [100] of the lighting system may be configured for detachably installing the ninth lens module [2718] in the lighting module [102] between the semiconductor light-emitting device [104] and the third lens module [118]; and the example [100] of the lighting system may be configured for aligning the ninth lens axis [2722] with the central light emission axis [210] and the third lens axis [122]. In further examples [100] of the lighting system, the first raised region [2850] of the fifth diverging lens [2720], being shaped as a sliced torus, may be configured for causing some of the light emissions [202] to pass through the ninth light output surface [2802] at a plurality of spread-apart points. In some examples [100] of the lighting system, the first raised region [2850] of the fifth diverging lens [2720] may be configured for causing some of the light emissions [202] to pass through the ninth light output surface [2802] at spread-apart points being distributed throughout the ninth light output surface [2802].

Figure 29:
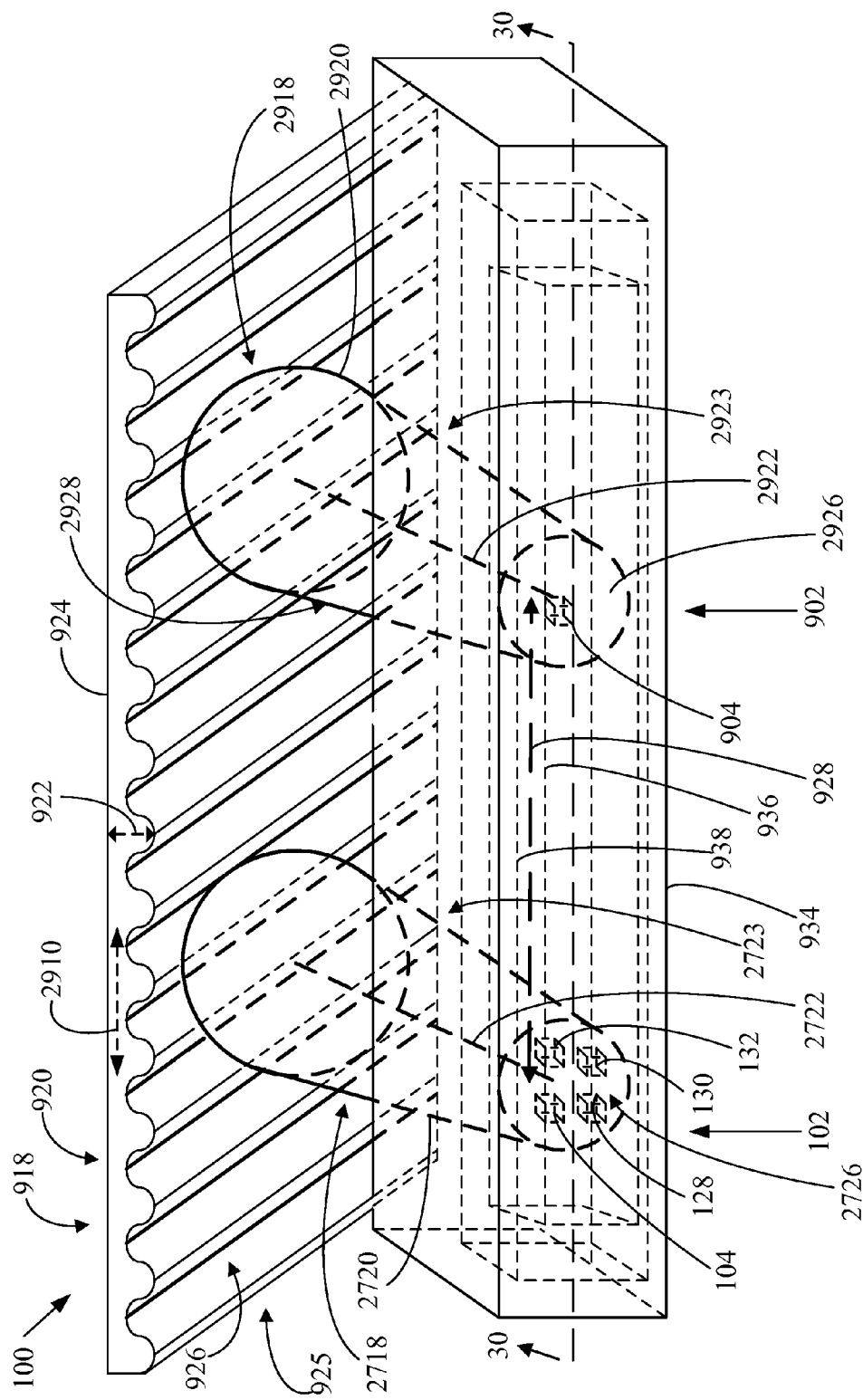
FIG. 29 is a perspective bottom view showing the example of the ninth lens module; and showing an example of a tenth lens module that may be included in the example [100] of an implementation of a lighting system.
Figure 30:
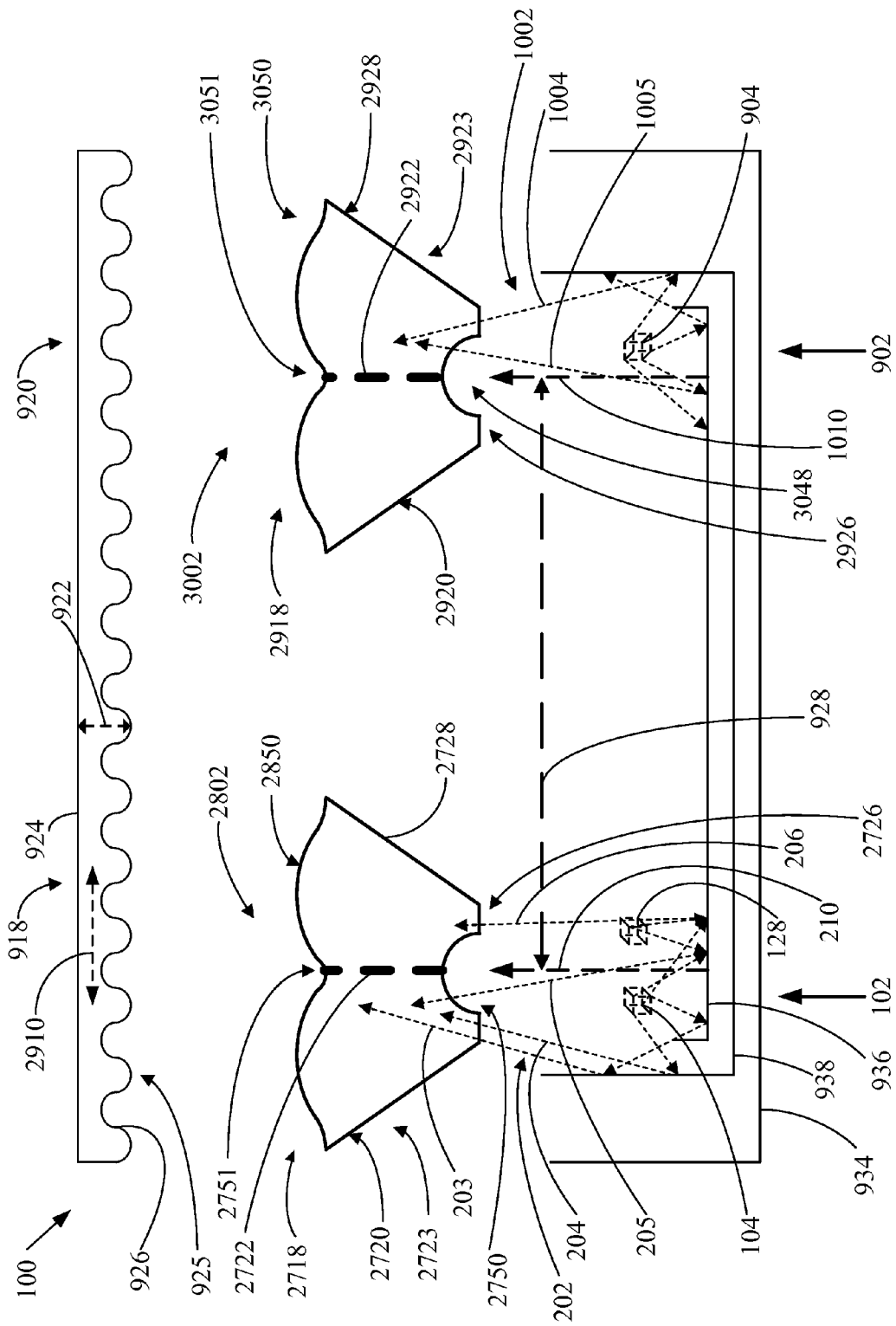
FIG. 30 is a cross-sectional side view taken along the line 30-30, showing the example of the ninth lens module; and showing the example of the tenth lens module that may be included in the example [100] of the lighting system.

FIG. 29 is a perspective bottom view showing the example of the ninth lens module; and showing an example of a tenth lens module that may be included in the example [100] of an implementation of a lighting system. FIG. 30 is a cross-sectional side view taken along the line 30-30, showing the example of the ninth lens module; and showing the example of the tenth lens module that may be included in the example [100] of the lighting system. In some examples, the example [100] of the lighting system may include a tenth lens module [2918] including a sixth diverging lens [2920]. The sixth diverging lens [2920] may have a tenth light output surface [3002] being spaced apart along a tenth lens axis [2922] from a tenth light input surface [2926], the sixth diverging lens [2920] having a sixth total internal reflection side surface [2928] being spaced apart around the tenth lens axis [2922] and having a sixth frusto-conical shape [2923] extending between the tenth light input surface [2926] and the tenth light output surface [3002] of the sixth diverging lens [2920]. Further, for example, the tenth light input surface [2926] of the sixth diverging lens [2920] may include a central cavity [3048] being shaped as a portion of a spheroid. Additionally, for example, the tenth light output surface [3002] of the sixth diverging lens [2920] may include a second raised region [3050] being shaped as a sliced torus having a second central cavity [3051]. In examples, the example [100] of the lighting system may be configured for detachably installing the tenth lens module [2918] in the second lighting module [902] between the second semiconductor light-emitting device [904] and the sixth lens module [918]; and the example [100] of the lighting system may be configured for aligning the tenth lens axis [2922] with the second central light emission axis [1010]. In further examples [100] of the lighting system, the second raised region [3050] of the sixth diverging lens [2920], being shaped as a sliced torus, may be configured for causing some of the light emissions [1002] to pass through the tenth light output surface [3002] at a plurality of spread-apart points. In some examples [100] of the lighting system, the second raised region [3050] of the sixth diverging lens [2920] may be configured for causing some of the light emissions [1002] to pass through the tenth light output surface [3002] at spread-apart points being distributed throughout the tenth light output surface [3002].

In some examples [100], the lighting system may be configured for positioning the semiconductor light-emitting device [104] as being spaced apart on the longitudinal axis [928] away from the second semiconductor light-emitting device [904], for causing the central light emission axis [210] to be spaced apart from the second central light emission axis [1010]. Further, for example, the fifth diverging lens [2720] of the ninth lens module [2718] may be integral with the sixth diverging lens [2920] of the tenth lens module [2918]; and the fifth and sixth diverging lenses [2720], [2920] may be integrally configured for causing some of the light emissions [202], [1002] to pass through the sixth light output surface [924] at a plurality of spread-apart points. In some examples [100] of the lighting system, the first and second raised regions [2850], [3050] of the fifth and sixth diverging lenses [2720], [2920] may be configured for causing some of the light emissions [202], [1002] to pass through the sixth light output surface [924] at a plurality of spread-apart points being distributed throughout the sixth light output surface [924].

As additional examples [100] of the lighting system, the fifth diverging lens [2720] of the ninth lens module [2718], the sixth diverging lens [2920] of the tenth lens module [2918], and the second diverging lens [920] of the sixth lens module [918] may be collectively configured for causing the sixth light output surface [924] to emit a perceived line of light. As an example [100] of the lighting system, the perceived line of light may extend in the directions represented by the arrow [2910]. As another example, the sixth lens module [918] may be rotated by ninety (90) degrees on a central light emission axis [210], [1010] to accordingly change the directions of divergence of some of the converged light emissions. In other examples [100] of the lighting system (not shown), the only lens modules included in a lighting system may be: the ninth lens module [2718]; the tenth lens module [2918]; and the sixth lens module [918]. Further in those other examples [100] of the lighting system, the ninth lens module [2718] may be integral with the tenth lens module [2918]; and as shown in FIGS. 29-30, the sixth lens module [918] may extend in directions that are spaced apart from directions along the longitudinal axis [928] between and beyond both the ninth light output surface [2802] and the tenth light output surface [3002]. Additionally, for example, the third lens module [118] (not shown) may be integral with the sixth lens module [918] as so extending between and beyond the ninth and tenth light output surfaces [2802], [3002]. In additional examples [100] of the lighting system (not shown), the ninth lens module [2718] may be integral with a plurality of tenth lens modules [2918]. In additional examples [100] of the lighting system (not shown), the ninth lens module [2718] and the plurality of tenth lens modules [2918] may collectively be integrated in a row, or in a plurality of rows, or in a circle. As further examples [100] of the lighting system (not shown), a plurality of the tenth lens modules [2918], being within a range of between one and about twenty, or being within a range of between one and about one hundred, may be integrated together with the ninth lens module [2718]. In further examples [100] of the lighting system (not shown), the lighting system may include a plurality of ninth lens modules [2718], each being integral with a tenth lens module [2918]. In those further examples [100] of the lighting system (not shown), each of a plurality of the accordingly integrated light output surfaces [2802], [3002] may include: a different depth of the central cavities [2750], [3048] or of the second central cavities [2751], [3051] along the lens axes [2722], [2922]; a different diameter of the central cavities [2750], [3048] or of the second central cavities [2751], [3051] transversely to the lens axes [2722], [2922]; or a different height of the raised regions [2850], [3050] above the second central cavities [2751], [3051] along the lens axes [2722], [2922].

Figure 31:
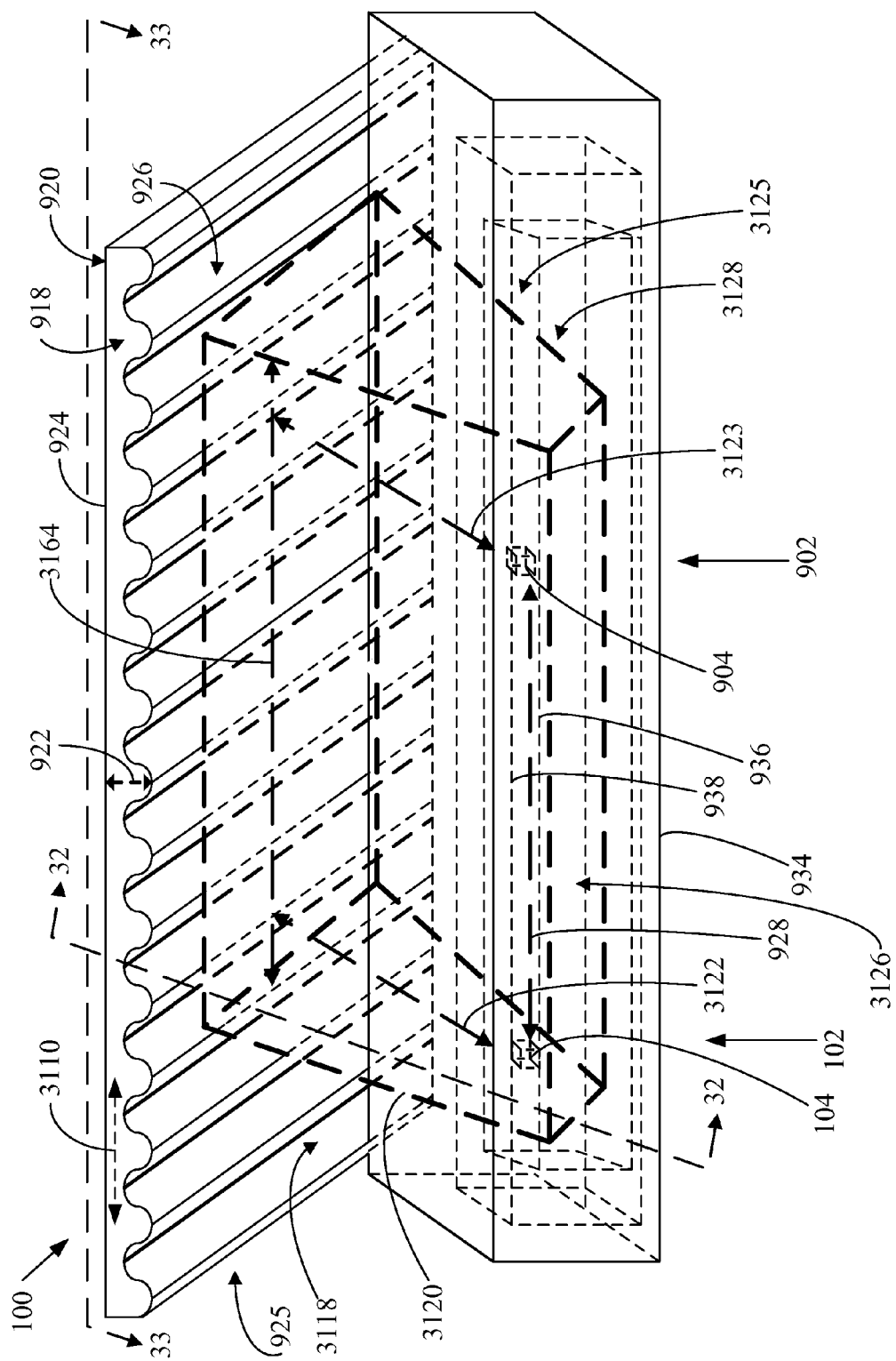
FIG. 31 is a perspective bottom view showing an example of an eleventh lens module that may be included in the example [100] of an implementation of a lighting system.
Figure 32:
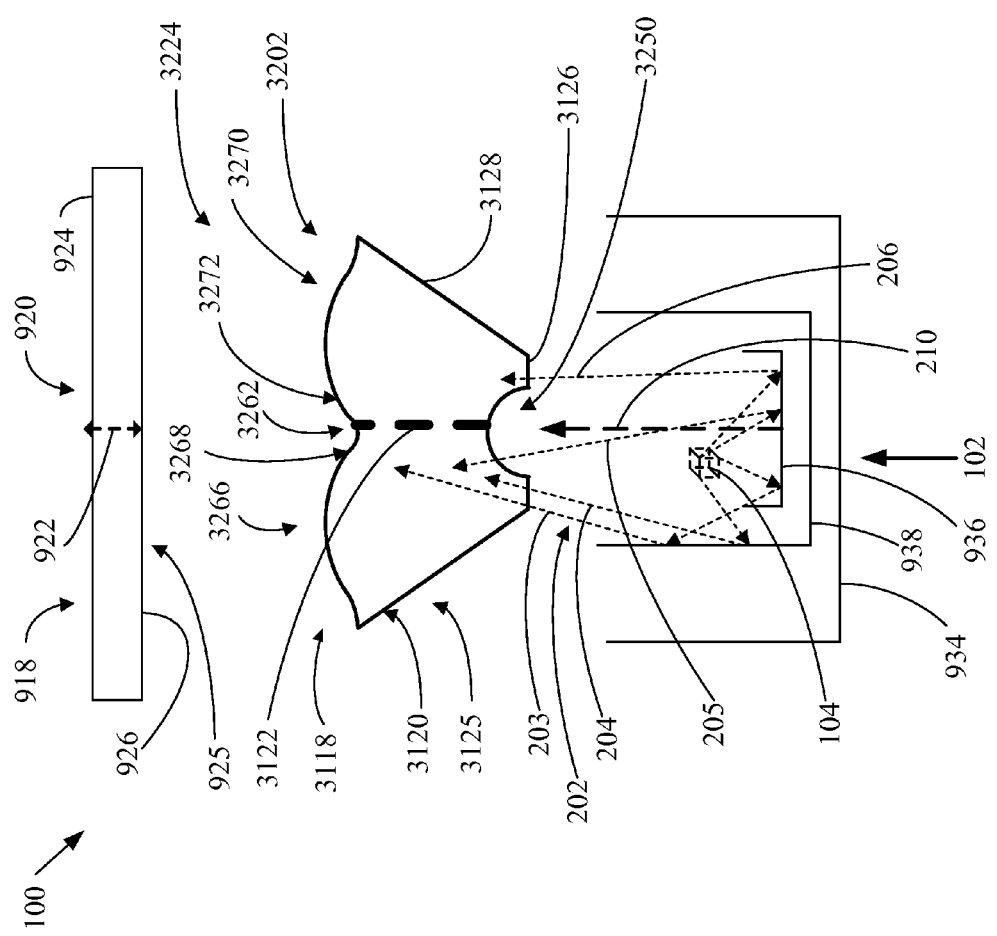
FIG. 32 is cross-sectional view taken along the line 32-32, showing the example of the eleventh lens module that may be included in the example [100] of the lighting system.
Figure 33:
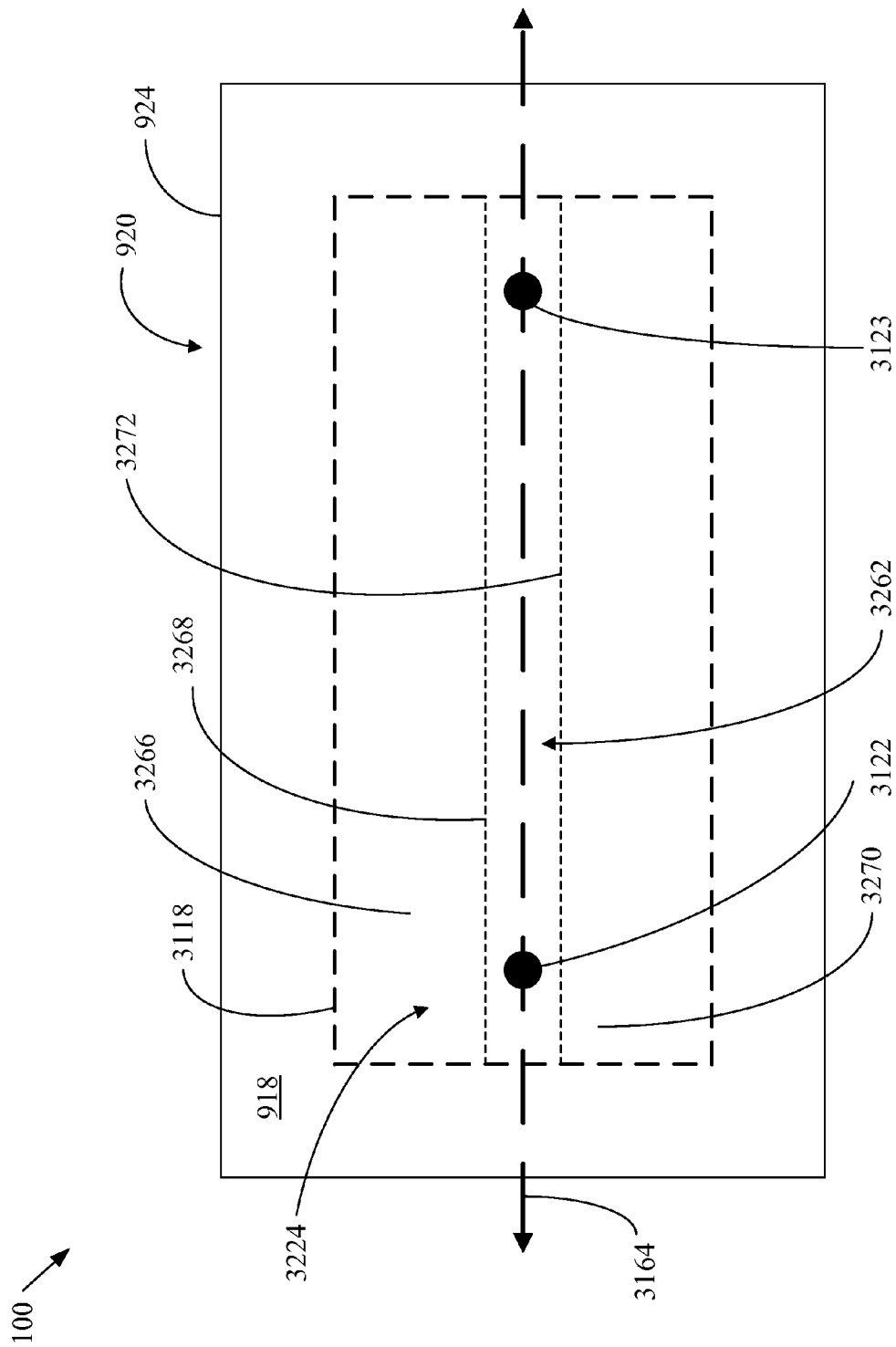
FIG. 33 is a top view taken along the line 33-33, showing the example of the eleventh lens module that may be included in the example [100] of the lighting system.

FIG. 31 is a perspective bottom view showing an example of an eleventh lens module that may be included in the example [100] of an implementation of a lighting system. FIG. 32 is a cross-sectional view taken along the line 32-32, showing the example of the eleventh lens module that may be included in the example [100] of the lighting system. FIG. 33 is a top view taken along the line 33-33, showing the example of the eleventh lens module that may be included in the example [100] of the lighting system. In some examples, the example [100] of the lighting system may include an eleventh lens module [3118] including a seventh diverging lens [3120]. In examples [100] of the lighting system, the seventh diverging lens [3120] may have one lens axis [3122] being spaced apart from another lens axis [3123]. For example, the example [100] of the lighting system may be configured for detachably installing the seventh diverging lens [3120] with the one lens axis [3122] being aligned with the central light emission axis [210] and with the another lens axis [3123] being aligned with the second central light emission axis [1010]. In some examples [100] of the lighting system, the seventh diverging lens [3120] may have a seventh total internal reflection side surface [3128] having a seventh frusto-conical shape [3125] extending between an eleventh light input surface [3126] and an eleventh light output surface [3202], the eleventh light output surface [3202] including a contoured lens screen [3224] having lenticular or microprismatic features. In some examples [100] of the lighting system, the seventh diverging lens [3120] may have the contoured lens screen [3224] as including an array of lenticular toroidal lenses. In other examples (not shown) of the example [100] of the lighting system, the seventh diverging lens [3120] may have the contoured lens screen [3224] as including an array of microprismatic lenses.

In further examples [100] of the lighting system, the eleventh light input surface [3126] may include one cavity [3250] aligned with the one lens axis [3122] and shaped as a portion of a spheroid; and the eleventh light input surface [3126] may include another cavity (not shown) aligned with the another lens axis [3123] and shaped as a portion of a spheroid. In additional examples [100], the lighting system may be configured for positioning the semiconductor light-emitting device [104] as being spaced apart on the longitudinal axis [928] away from the second semiconductor light-emitting device [904] for causing the central light emission axis [210] to be spaced apart from the second central light emission axis [1010]. Further in those examples [100] of the lighting system, the contoured lens screen [3224] may have a central concave surface [3262], having a lens screen axis [3164] that extends in directions that are similar to and spaced apart from directions along the longitudinal axis [928]. In some examples [100] of the lighting system, the lens screen axis [3164] may intersect the one lens axis [3122] and the another lens axis [3123], the lens axes [3122], [3123] being represented as dots in FIG. 33. As further examples [100] of the lighting system, the contoured lens screen [3224] may have one convex surface [3266] extending in directions along the lens screen axis [3164], and one edge [3268] of the central concave surface [3262] may extend adjacent to the one convex surface [3266] in directions along the lens screen axis [3164]. In additional examples [100] of the lighting system, the contoured lens screen [3224] may have another convex surface [3270] extending in directions along the lens screen axis [3164], and another edge [3272] of the central concave surface [3262] may extend adjacent to the another convex surface [3270] in directions along the lens screen axis [3164]. In other examples [100] of the lighting system, the contoured lens screen [3224] may be configured for causing divergence of some of the converged light emissions [212], [412], [1012], [1212] away from the lens screen axis [3164].

In some examples [100] of the lighting system, the eleventh lens module [3118] may be configured for causing some of the light emissions [202], [1002] to pass through the contoured lens screen [3224] at a plurality of spread-apart points. In some examples [100] of the lighting system, the eleventh lens module [3118] may be configured for causing some of the light emissions [202], [1002] to pass through the contoured lens screen [3224] at spread-apart points being distributed throughout the contoured lens screen [3224]. As additional examples [100] of the lighting system, the seventh diverging lens [3120] of the eleventh lens module [3118] and the second diverging lens [920] of the sixth lens module [918] may be collectively configured for causing the sixth light output surface [924] to emit a perceived line of light. As an example [100] of the lighting system, the perceived line of light may extend in the directions represented by the arrow [3110]. As another example, the sixth lens module [918] may be rotated by ninety (90) degrees on a central light emission axis [210], [1010] to accordingly change the directions of divergence of some of the converged light emissions. In other examples [100] of the lighting system (not shown), the only lens modules included in a lighting system may be: the eleventh lens module [3118]; and the sixth lens module [918]. Further in those other examples [100] of the lighting system, as shown in FIGS. 31-33, the sixth lens module [918] may extend in directions that are spaced apart from directions along the longitudinal axis [928] between and beyond both the one lens axis [3122] and the another lens axis [3123]. Additionally, for example, the third lens module [118] (not shown) may be integral with the sixth lens module [918] as so extending between and beyond the lens axes [3122], [3123]. In additional examples [100] of the lighting system (not shown), the eleventh lens module [3118] may include the seventh diverging lens [3120] as having one or more further lens axes being spaced apart along the longitudinal axis [928] in addition to the one lens axis [3122] and the another lens axis [3123], and the eleventh lens module [3118] may be configured for being aligned with one or more further central light emission axes of additional semiconductor light-emitting devices in addition to the central light emission axes [210], [1010]. As additional examples, the example [100] of the lighting system may include one or more additional eleventh lens modules [3118]. In those additional examples [100] of the lighting system (not shown), each of a plurality of the light output surfaces [3202] may include: a different depth of the central cavity [3250] or of the central concave surface [3262] along the lens axes [3122], [3123]; a different diameter of the central cavity [3250] or of the central concave surface [3262] transversely to the lens axes [3122], [3123]; or a different height of the convex surfaces [3266], [3270] above the central concave surface [3262] along the lens axes [3122], [3123].

In other examples [100], the lighting system may include the housing [934]. As examples [100] of the lighting system, the housing [934] may be configured for positioning the lighting module [102] for emission of the light emissions [202] from the semiconductor light-emitting device [104] along the central light emission axis [210]; and the housing [934] may be configured for positioning the second lighting module [902] for emission of the further light emissions [1002] from the second semiconductor light-emitting device [904] along the second central light emission axis [1010]. Further in those examples, the example [100] of the lighting system may include the carrier [936]. Additionally in those examples [100] of the lighting system, the carrier [936] may be configured for positioning the eleventh lens module [3118] in the housing [934] with the one lens axis [3122] being aligned with the central light emission axis [210] and with the another lens axis [3123] being aligned with the second central light emission axis [1010]. Additionally in those examples, the example [100] of the lighting system may include the primary visible light reflector [938]. In those examples [100] of the lighting system, the primary visible light reflector [938] may be configured for being positioned between the housing [934] and the carrier [936], and the primary visible light reflector [938] may be configured for redirecting some of the light emissions [202] of the semiconductor light-emitting device [104] along the central light emission axis [210], and the primary visible light reflector [938] may be configured for redirecting some of the further light emissions [1002] of the second semiconductor light-emitting device [904] along the second central light emission axis [1010].

Figure 36:
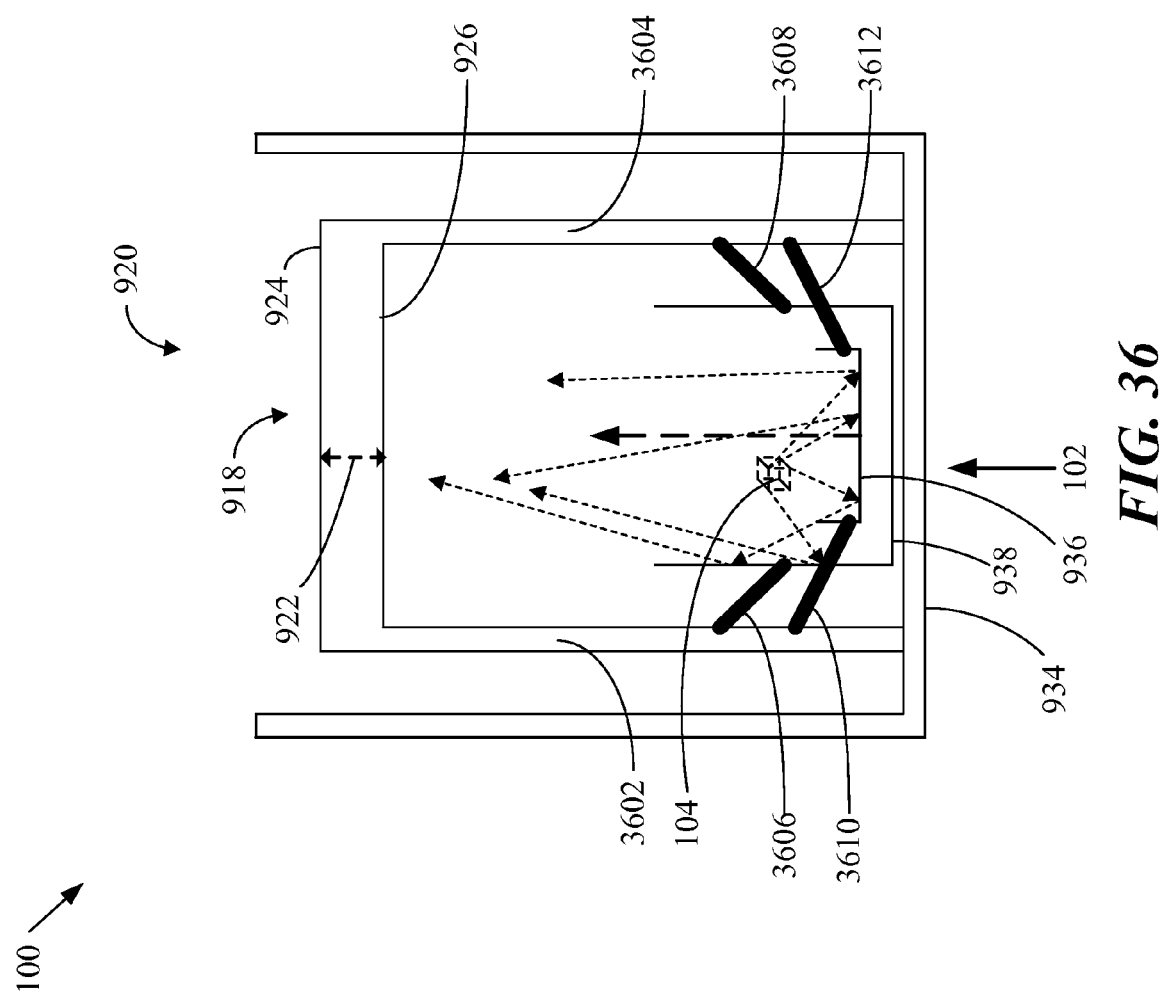
FIG. 36 is a schematic cross-sectional view of the examples [100] of the lighting system shown in FIGS. 34-35.

FIG. 34 is a top view showing examples of the carrier [136], [936] and the primary visible light reflector [138], [938] that may be included in the example [100] of an implementation of a lighting system. FIG. 35 is a perspective view showing the examples of the carrier [136], [936] and the primary visible light reflector [138], [938] as shown in FIG. 34. FIG. 36 is a schematic cross-sectional view of the examples [100] of the lighting system shown in FIGS. 34-35. As shown in this example [100] of the lighting system, the primary visible light reflector [938] may include a plurality of apertures [3402], [3404] being spaced apart in a row extending in directions that are spaced apart from directions along the longitudinal axis [928] (not shown) for receiving light emissions [202], [1002] from semiconductor light-emitting devices [104], [904] (not shown) being positioned underneath the primary visible light reflector [938] with their central light emission axes [210], [1010] aligned with the apertures [3402], [3404]. As an example, the primary visible light reflector [938] may include sixteen of the apertures [3402], [3404] for receiving light emissions [202], [1002] from sixteen corresponding semiconductor light-emitting devices [104], [904] (not shown), one of which being positioned with its central light emission axis [210], [1010] aligned with each one of the sixteen apertures [3402], [3404]. In other examples [100] of the lighting system (not shown), the primary visible light reflector [938] may include a different quantity of the apertures [3402], [3404] for receiving light emissions [202], [1002] from a corresponding different number of semiconductor light-emitting devices [104], [904] (not shown), one of which being positioned with its central light emission axis [210], [1010] aligned with each one of the apertures [3402], [3404]. In other examples [100] of the lighting system, the primary visible light reflector [938] may include a quantity of the apertures [3402], [3404] being within a range of between one and about twenty apertures, or being within a range of between one and about one hundred apertures. Further, for example, more than one semiconductor light-emitting device [104], [904] may be positioned with its central light emission axis [210], [1010] being aligned with each one of the apertures [3402], [3404]. In examples [100] of the lighting system, the primary visible light reflector [938] may include each of the apertures [3402], [3404] as being located between a pair of reflector elements [3420]. In examples [100] of the lighting system, each of the reflector elements [3420] may include a top reflective surface [3406] being oriented to reflect light emissions [202], [1002] along the central light emission axes [210], [1010], the top reflective surface [3406] being located between two tangential reflective surfaces [3408]. As further shown in this example [100] of the lighting system, the carrier [936] may include a plurality of apertures [3410], [3412] being spaced apart in a row extending in directions that are spaced apart from directions along the longitudinal axis [928] (not shown) for receiving light emissions [202], [1002] from semiconductor light-emitting devices [104], [904] (not shown) with their central light emission axes [210], [1010] being aligned with the apertures [3410], [3412]. In these examples [100] of the lighting system, the carrier [936] may be placed over the primary visible light reflector [938] with the apertures [3410], [3412] being aligned with the apertures [3402], [3404] as represented by the arrows [3414], [3416], and the semiconductor light-emitting devices [104], [904] may be placed below the primary visible light reflector [938]. Further, for example, the apertures [3410], [3412] of the carrier [936] may be configured and shaped for receiving and holding in place the lens modules [106], [306], [906], [1106], [1506], [1706], [1906], [2106], [2718], and [2918]. As an example, the carrier [936] may include sixteen of the apertures [3410], [3412] for receiving light emissions [202], [1002] from sixteen corresponding semiconductor light-emitting devices [104], [904] (not shown), one of which being positioned with its central light emission axis [210], [1010] aligned with each one of the sixteen apertures [3410], [3412]. In other examples [100] of the lighting system (not shown), the carrier [936] may include a different quantity of the apertures [3410], [3412] for receiving light emissions [202], [1002] from a corresponding different number of semiconductor light-emitting devices [104], [904] (not shown), one of which being positioned with its central light emission axis [210], [1010] aligned with each one of the apertures [3410], [3412]. In some examples [100] of the lighting system, the carrier [936] may include a quantity of the apertures [3410], [3412] being within a range of between one and about twenty apertures, or being within a range of between one and about one hundred apertures. Further, for example, more than one semiconductor light-emitting device [104], [904] may be positioned with its central light emission axis [210], [1010] being aligned with each one of the apertures [3410], [3412]. In these examples [100] of the lighting system, the primary visible light reflector [938] may be configured for being positioned between the housing [934] (not shown) and the carrier [936]. Further, for example, the carrier [936] may be configured for redirecting some of the light emissions [202], [1002] of the semiconductor light-emitting devices [104], [904] (not shown) along the central light emission axes [210], [1010]. In other examples [100], the lighting system may include the carrier [936] being configured for being placed in direct contact with the housing [934]. In other examples [100] of the lighting system (not shown), the primary visible light reflector [938] and the carrier [936] may include their respective apertures [3402], [3404], [3410], [3412] being spaced apart in a plurality of rows, or in another formation such as a rectangle or a circle. In further examples [100], the lighting system may include the sixth lens module [918]. Further, for example, the sixth lens module [918] may have walls [3602], [3604] reaching downward in the housing [934]. Additionally, for example, the walls [3602], [3604] of the sixth lens module [918] may have members [3606], [3608], [3610], [3612] configured for holding the primary visible light reflector [938] and the carrier [936] in place within the housing [934].

The examples [100] of lighting systems may generally be utilized in end-use applications where interchangeable lens modules are needed, enabling a lighting system to be easily and repeatedly reconfigured by removal and substitution of lens modules. Further, the examples [100] of lighting systems may generally be utilized in end-use applications where lens modules are needed enabling a lighting system to emit a perceived line of light. The examples [100] of lighting systems that are disclosed herein may be also utilized together with the lighting systems disclosed in the commonly-owned U.S. patent application Ser. No. 14/636,205, being filed on the same date herewith, entitled "Low-Profile Lighting System Having Pivotable Lighting Enclosure," the entirety of which is hereby incorporated herein by reference.

While the present invention has been disclosed in a presently defined context, it will be recognized that the present teachings may be adapted to a variety of contexts consistent with this disclosure and the claims that follow. For example, the lighting systems shown in the figures and discussed above can be adapted in the spirit of the many optional parameters described.

What is claimed is:

1. A lighting system, comprising:
a lighting module including a semiconductor light-emitting device configured for emitting light emissions along a central light emission axis;
a first lens module including a first converging lens, the first converging lens being configured for causing convergence of some of the light emissions of the semiconductor light-emitting device to form converged light emissions along the central light emission axis having a first half-width-half-maximum (HWHM), the first converging lens having a first light output surface being spaced apart along a first lens axis from a first light input surface, the first converging lens further having a first total internal reflection side surface being spaced apart around the first lens axis and having a first frusto-conical shape extending between the first light input and output surfaces of the first converging lens;
a second lens module including a second converging lens, the second converging lens being configured for causing convergence of some of the light emissions of the semiconductor light-emitting device to form converged light emissions along the central light emission axis having a second HWHM being different than the first HWHM, the second converging lens having a second light output surface being spaced apart along a second lens axis from a second light input surface, the second converging lens further having a second total internal reflection side surface being spaced apart around the second lens axis and having a second frusto-conical shape extending between the second light input and output surfaces of the second converging lens; and
a third lens module including a first diverging lens having a third lens axis, the first diverging lens being configured for causing divergence of some of the converged light emissions away from the third lens axis by a third HWHM to form diverged light emissions that diverge away from the central light emission axis, the first diverging lens having a third light output surface being spaced apart along the third lens axis from a third light input surface, the third light input surface including a first lens screen having lenticular or microprismatic features;
wherein the lighting system is configured for detachably installing the first lens module or the second lens module in the lighting module between the semiconductor light-emitting device and the third lens module; and wherein the lighting system is configured for aligning the first or second lens axis with the central light emission axis and the third lens axis.

2. The lighting system of claim 1, wherein the lighting system further includes an additional lens module including an additional diverging lens having an additional lens axis, the additional diverging lens being configured for causing divergence of some of the converged light emissions away from the additional lens axis by an additional HWHM being different than the third HWHM to form additional diverged light emissions that diverge away from the central light emission axis, the additional diverging lens having an additional light output surface being spaced apart along the additional lens axis from an additional light input surface, the additional light input surface including an additional lens screen having lenticular or microprismatic features; and wherein the lighting system is configured for detachably installing the first lens module or the second lens module in the lighting module between the semiconductor light-emitting device and the additional lens module; and wherein the lighting system is configured for aligning the first or second lens axis with the central light emission axis and the additional lens axis.

3. The lighting system of claim 2, wherein the lighting system is configured for interchangeably installing either the first lens module or the second lens module in the lighting module between the semiconductor light-emitting device and either the third lens module or the additional lens module.

4. The lighting system of claim 1, wherein the lighting module includes another semiconductor light-emitting device being configured for emitting light emissions along the central light emission axis.

5. The lighting system of claim 1, wherein the lighting module includes a plurality of additional semiconductor light-emitting devices, and wherein the semiconductor light-emitting device and the plurality of the additional semiconductor light-emitting devices are collectively arranged around and configured for emitting light emissions along the central light emission axis.

6. The lighting system of claim 1, wherein the first converging lens is configured for causing convergence of some of the light emissions of the semiconductor light-emitting device to form the converged light emissions as having the first HWHM being about 3.5 degrees, and wherein the first light input surface of the first converging lens includes a central cavity being shaped as a portion of a spheroid, and wherein the first light output surface of the first converging lens includes a bowl-shaped cavity surrounding a central mound shaped as a portion of a spheroid.

7. The lighting system of claim 1, wherein the first converging lens is configured for causing convergence of some of the light emissions of the semiconductor light-emitting device to form the converged light emissions as having the first HWHM being about 7.5 degrees, and wherein the first light input surface of the first converging lens includes a central cavity being shaped as a portion of a spheroid, and wherein the first light output surface of the first converging lens includes a bowl-shaped cavity surrounding a central mound shaped as a portion of a spheroid.

8. The lighting system of claim 1, wherein the first converging lens is configured for causing convergence of some of the light emissions of the semiconductor light-emitting device to form the converged light emissions as having the first HWHM being about 12.5 degrees, and wherein the first light input surface of the first converging lens includes a central disk-shaped cavity, and wherein the first light output surface of the first converging lens includes a bowl-shaped cavity surrounding a central mound shaped as a portion of a spheroid.

9. The lighting system of claim 1, wherein the first converging lens is configured for causing convergence of some of the light emissions of the semiconductor light-emitting device to form the converged light emissions as having the first HWHM being about 20 degrees, and wherein the first light input surface of the first converging lens includes a central compound parabolic concentrator, and wherein the first light output surface of the first converging lens includes a bowl-shaped cavity surrounding a central flat region.

10. The lighting system of claim 1, wherein the first diverging lens is configured for causing divergence of some of the converged light emissions away from the third lens axis by a third HWHM being about 4 degrees.

11. The lighting system of claim 1, wherein the first diverging lens is configured for causing divergence of some of the converged light emissions away from the third lens axis by a third HWHM being about 10 degrees.

12. The lighting system of claim 1, wherein the first diverging lens is configured for causing divergence of some of the converged light emissions away from the third lens axis by a third HWHM being about 15 degrees.

13. The lighting system of claim 1, wherein the first diverging lens is configured for causing divergence of some of the converged light emissions away from the third lens axis by a third HWHM being about 25 degrees.

14. The lighting system of claim 1, wherein the first diverging lens is configured for causing divergence of some of the converged light emissions away from the third lens axis by a third HWHM being about 30 degrees.

15. The lighting system of claim 1, wherein the first diverging lens has the first lens screen as including an array of lenticular toroidal lenses.

16. The lighting system of claim 1, wherein the first converging lens has a first diameter transverse to the first lens axis at the first light input surface, and wherein the first converging lens has a second diameter transverse to the first lens axis at the first light output surface, and wherein the first diameter is smaller than the second diameter.

17. The lighting system of claim 1, further including a housing being configured for positioning the lighting module for emission of the light emissions from the semiconductor light-emitting device along the central light emission axis.

18. The lighting system of claim 17, further including a carrier being configured for positioning the first or second lens module in the housing with the first or second lens axis being aligned with the central light emission axis.

19. The lighting system of claim 18, further including a primary visible light reflector configured for being positioned between the housing and the carrier, wherein the primary visible light reflector is configured for redirecting some of the light emissions of the semiconductor light-emitting device along the central light emission axis.

20. The lighting system of claim 1, further including:
a second lighting module including a second semiconductor light-emitting device configured for emitting further light emissions along a second central light emission axis;
a fourth lens module including a third converging lens, the third converging lens being configured for causing convergence of some of the light emissions of the second semiconductor light-emitting device to form further converged light emissions along the second central light emission axis having a fourth HWHM, the third converging lens having a fourth light output surface being spaced apart along a fourth lens axis from a fourth light input surface, the third converging lens further having a third total internal reflection side surface being spaced apart around the fourth lens axis and having a third frusto-conical shape extending between the fourth light input and output surfaces of the third converging lens;

a fifth lens module including a fourth converging lens, the fourth converging lens being configured for causing convergence of some of the light emissions of the second semiconductor light-emitting device to form further converged light emissions along the second central light emission axis having a fifth HWHM being different than the fourth HWHM, the fourth converging lens having a fifth light output surface being spaced apart along a fifth lens axis from a fifth light input surface, the fourth converging lens further having a fourth total internal reflection side surface being spaced apart around the fifth lens axis and having a fourth frusto-conical shape extending between the fifth light input and output surfaces of the fourth converging lens; and a sixth lens module including a second diverging lens having a sixth lens axis, the second diverging lens being configured for causing divergence of some of the converged light emissions away from the sixth lens axis by a sixth HWHM to form diverged light emissions, the second diverging lens having a sixth light output surface being spaced apart along the sixth lens axis from a sixth light input surface, the sixth light input surface including a second lens screen having lenticular or microprismatic features;

wherein the lighting system is configured for detachably installing the fourth lens module or the fifth lens module in the second lighting module between the second semiconductor light-emitting device and the sixth lens module; and wherein the lighting system is configured for aligning the fourth or fifth lens axis with the second central light emission axis and the sixth lens axis.

21. The lighting system of claim 20, wherein the second lighting module includes another semiconductor light-emitting device being configured for emitting light emissions along the second central light emission axis.

22. The lighting system of claim 20, wherein the second lighting module includes a plurality of additional semiconductor light-emitting devices, and wherein the second semiconductor light-emitting device and the plurality of the additional semiconductor light-emitting devices are collectively arranged around and configured for emitting light emissions along the second central light emission axis.

23. The lighting system of claim 20, wherein the third converging lens is configured for causing convergence of some of the light emissions of the second semiconductor light-emitting device to form the further converged light emissions as having the fourth HWHM being about 3.5 degrees, and wherein the fourth light input surface of the third converging lens includes a central cavity being shaped as a portion of a spheroid, and wherein the fourth light output surface of the third converging lens includes a second bowl-shaped cavity surrounding a second central mound shaped as a portion of a spheroid.

24. The lighting system of claim 20, wherein the third converging lens is configured for causing convergence of some of the light emissions of the second semiconductor light-emitting device to form the further converged light emissions as having the fourth HWHM being about 7.5 degrees, and wherein the fourth light input surface of the third converging lens includes a central cavity being shaped as a portion of a spheroid, and wherein the fourth light output surface of the third converging lens includes a second bowl-shaped cavity surrounding a second central mound shaped as a portion of a spheroid.

25. The lighting system of claim 20, wherein the third converging lens is configured for causing convergence of some of the light emissions of the second semiconductor light-emitting device to form the further converged light emissions as having the fourth HWHM being about 12.5 degrees, and wherein the fourth light input surface of the third converging lens includes a second central disk-shaped cavity, and wherein the fourth light output surface of the third converging lens includes a second bowl-shaped cavity surrounding a second central mound shaped as a portion of a spheroid.

26. The lighting system of claim 20, wherein the third converging lens is configured for causing convergence of some of the light emissions of the second semiconductor light-emitting device to form the further converged light emissions as having the fourth HWHM being about 20 degrees, and wherein the fourth light input surface of the third converging lens includes a second central compound parabolic concentrator, and wherein the fourth light output surface of the third converging lens includes a second bowl-shaped cavity surrounding a second central flat region.

27. The lighting system of claim 20, wherein the third converging lens has a third diameter transverse to the fourth lens axis at the fourth light input surface, and wherein the third converging lens has a fourth diameter transverse to the fourth lens axis at the fourth light output surface, and wherein the fourth diameter is smaller than the fifth diameter.

28. The lighting system of claim 20, wherein the second diverging lens has the second screen as including an array of lenticular toroidal lenses.

29. The lighting system of claim 20, wherein the lighting system is configured for positioning the semiconductor light-emitting device as being spaced apart on a longitudinal axis away from the second semiconductor light-emitting device for causing the central light emission axis to be spaced apart from the second central light emission axis.

30. The lighting system of claim 29, wherein the lighting system is configured for positioning the semiconductor light-emitting device as being spaced apart on the longitudinal axis away from the second semiconductor light-emitting device for causing the central light emission axis to be substantially parallel with the second central light emission axis.

31. The lighting system of claim 29, further including a housing, wherein the housing is configured for positioning the lighting module for emission of the light emissions from the semiconductor light-emitting device along the central light emission axis, and wherein the housing is configured for positioning the second lighting module for emission of the further light emissions from the second semiconductor light-emitting device along the second central light emission axis.

32. The lighting system of claim 31, further including a carrier, wherein the carrier is configured for positioning the first or second lens module in the housing with the first or second lens axis being aligned with the central light emission axis, and wherein the carrier is configured for positioning the fourth or fifth lens module in the housing with the fourth or fifth lens axis being aligned with the second central light emission axis.

33. The lighting system of claim 32, further including a primary visible light reflector configured for being positioned between the housing and the carrier, wherein the primary visible light reflector is configured for redirecting some of the light emissions of the semiconductor light-emitting device along the central light emission axis, and wherein the primary visible light reflector is configured for redirecting some of the further light emissions of the second semiconductor light-emitting device along the second central light emission axis.

34. The lighting system of claim 20, wherein the lighting system is configured for interchangeably installing either: the first lens module in the lighting module and the fourth lens module in the second lighting module; or the second lens module in the lighting module and the fifth lens module in the second lighting module.

35. The lighting system of claim 34, wherein the first lens module is integral with the fourth lens module, and wherein the second lens module is integral with the fifth lens module.

36. The lighting system of claim 20, wherein the lighting system further includes a seventh lens module including a third diverging lens having a seventh lens axis, the third diverging lens being configured for causing divergence of some of the converged light emissions away from the seventh lens axis by a seventh HWHM, being different than the third HWHM, to form additional diverged light emissions, the third diverging lens having a seventh light output surface being spaced apart along the seventh lens axis from a seventh light input surface, the seventh light input surface including a third lens screen having lenticular or microprismatic features; and wherein the lighting system is configured for detachably installing the first lens module or the second lens module in the lighting module between the semiconductor light-emitting device and the seventh lens module; and wherein the lighting system is configured for aligning the first or second lens axis with the central light emission axis and the seventh lens axis.

37. The lighting system of claim 36, wherein the lighting system further includes an eighth lens module including a fourth diverging lens having an eighth lens axis, the fourth diverging lens being configured for causing divergence of some of the further converged light emissions away from the eighth lens axis by an eighth HWHM, being different than the sixth HWHM, to form additional diverged light emissions, the fourth diverging lens having an eighth light output surface being spaced apart along the eighth lens axis from an eighth light input surface, the eighth light input surface including a fourth lens screen having lenticular or microprismatic features; and wherein the lighting system is configured for detachably installing the fourth lens module or the fifth lens module in the second lighting module between the second semiconductor light-emitting device and the eighth lens module; and wherein the lighting system is configured for aligning the fourth or fifth lens axis with the second central light emission axis and the eighth lens axis.

38. The lighting system of claim 37, wherein the lighting system is configured for interchangeably installing either: the third lens module in the lighting module and the sixth lens module in the second lighting module; or the seventh lens module in the lighting module and the eighth lens module in the second lighting module.

39. The lighting system of claim 38, wherein the third lens module is integral with the sixth lens module, and wherein the seventh lens module is integral with the eighth lens module.

40. The lighting system of claim 39, wherein the third HWHM is the same as the sixth HWHM, and wherein the seventh HWHM is the same as the eighth HWHM.

41. The lighting system of claim 38, wherein the lighting system is configured for interchangeably installing either: the first lens module in the lighting module and the fourth lens module in the second lighting module; or the second lens module in the lighting module and the fifth lens module in the second lighting module.

42. The lighting system of claim 41, wherein the first lens module is integral with the fourth lens module, and wherein the second lens module is integral with the fifth lens module.

43. The lighting system of claim 20, wherein the first diverging lens is integral with the second diverging lens, and wherein the lighting system is configured for positioning the semiconductor light-emitting device as being spaced apart on a longitudinal axis away from the second semiconductor light-emitting device, and wherein the first and second diverging lenses are integrally configured for causing divergence of some of the converged light emissions in directions that are spaced apart from directions along the longitudinal axis.

44. The lighting system of claim 43, wherein each of the first and second diverging lenses is configured for causing divergence of some of the converged light emissions in directions that are spaced apart from directions along the longitudinal axis by an HWHM being about 4 degrees.

45. The lighting system of claim 43, wherein each of the first and second diverging lenses is configured for causing divergence of some of the converged light emissions in directions that are spaced apart from directions along the longitudinal axis by an HWHM being about 10 degrees.

46. The lighting system of claim 43, wherein each of the first and second diverging lenses is configured for causing divergence of some of the converged light emissions in directions that are spaced apart from directions along the longitudinal axis by an HWHM being about 15 degrees.

47. The lighting system of claim 43, wherein each of the first and second diverging lenses is configured for causing divergence of some of the converged light emissions in directions that are spaced apart from directions along the longitudinal axis by an HWHM being about 25 degrees.

48. The lighting system of claim 43, wherein each of the first and second diverging lenses is configured for causing divergence of some of the converged light emissions in directions that are spaced apart from directions along the longitudinal axis by an HWHM being about 30 degrees.

49. The lighting system of claim 43, wherein the first, second, third and fourth converging lenses are configured for forming the converged light emissions as respectively having the first, second, fourth, and fifth HWHM being within a range of between about 2 degrees and about 5 degrees; and wherein the first and second diverging lenses are configured for causing divergence of some of the converged light emissions away from the central light emission axes in directions that are spaced apart from directions along the longitudinal axis by an HWHM being within a range of between about 2 degrees and about 6 degrees.

50. The lighting system of claim 49, wherein the diverged light emissions have a cumulative HWHM away from the central light emission axes in directions that are spaced apart from directions along the longitudinal axis being within a range of between about 4 degrees and about 11 degrees.

51. The lighting system of claim 43, wherein the first, second, third and fourth converging lenses are configured for forming the converged light emissions as respectively having the first, second, fourth, and fifth HWHM being within a range of between about 15 degrees and about 25 degrees; and wherein the first and second diverging lenses are configured for causing divergence of some of the converged light emissions away from the central light emission axes in directions that are spaced apart from directions along the longitudinal axis by an HWHM being within a range of between about 25 degrees and about 35 degrees.

52. The lighting system of claim 51, wherein the diverged light emissions have a cumulative HWHM away from the central light emission axes in directions that are spaced apart from directions along the longitudinal axis being within a range of between about 40 degrees and about 60 degrees.

53. The lighting system of claim 43, wherein the first, second, third and fourth converging lenses are configured for forming the converged light emissions as respectively having the first, second, fourth, and fifth HWHM being within a range of between about 15 degrees and about 25 degrees; and wherein the first and second diverging lenses are configured for causing divergence of some of the converged light emissions away from the central light emission axes in directions that are spaced apart from directions along the longitudinal axis by an HWHM being within a range of between about 2 degrees and about 6 degrees.

54. The lighting system of claim 53, wherein the diverged light emissions have a cumulative HWHM away from the central light emission axes in directions that are spaced apart from directions along the longitudinal axis being within a range of between about 17 degrees and about 31 degrees.

55. The lighting system of claim 43, wherein the first, second, third and fourth converging lenses are configured for forming the converged light emissions as respectively having the first, second, fourth, and fifth HWHM being within a range of between about 2 degrees and about 5 degrees; and wherein the first and second diverging lenses are configured for causing divergence of some of the converged light emissions away from the central light emission axes in directions that are spaced apart from directions along the longitudinal axis by an HWHM being within a range of between about 25 degrees and about 35 degrees.

56. The lighting system of claim 55, wherein the diverged light emissions have a cumulative HWHM away from the central light emission axes in directions that are spaced apart from directions along the longitudinal axis being within a range of between about 27 degrees and about 40 degrees.

57. The lighting system of claim 20, wherein the first diverging lens is integral with the second diverging lens, and wherein the lighting system is configured for positioning the semiconductor light-emitting device as being spaced apart on a longitudinal axis away from the second semiconductor light-emitting device, and wherein the first and second diverging lenses are integrally configured for causing divergence of some of the converged light emissions in directions that are spaced apart from directions transverse to the longitudinal axis.

58. The lighting system of claim 57, wherein each of the first and second diverging lenses is configured for causing divergence of some of the converged light emissions in directions that are spaced apart from directions transverse to the longitudinal axis by an HWHM being about 4 degrees.

59. The lighting system of claim 57, wherein each of the first and second diverging lenses is configured for causing divergence of some of the converged light emissions in directions that are spaced apart from directions transverse to the longitudinal axis by an HWHM being about 10 degrees.

60. The lighting system of claim 57, wherein each of the first and second diverging lenses is configured for causing divergence of some of the converged light emissions in directions that are spaced apart from directions transverse to the longitudinal axis by an HWHM being about 15 degrees.

61. The lighting system of claim 57, wherein each of the first and second diverging lenses is configured for causing divergence of some of the converged light emissions in directions that are spaced apart from directions transverse to the longitudinal axis by an HWHM being about 25 degrees.

62. The lighting system of claim 57, wherein each of the first and second diverging lenses is configured for causing divergence of some of the converged light emissions in directions that are spaced apart from directions transverse to the longitudinal axis by an HWHM being about 30 degrees.

63. The lighting system of claim 57, wherein the first, second, third and fourth converging lenses are configured for forming the converged light emissions as respectively having the first, second, fourth, and fifth HWHM being within a range of between about 2 degrees and about 25 degrees; and wherein the first and second diverging lenses are configured for causing divergence of some of the converged light emissions away from the central light emission axes in directions that are spaced apart from directions transverse to the longitudinal axis by an HWHM being within a range of between about 4 degrees and about 30 degrees.

64. The lighting system of claim 63, wherein the diverged light emissions have a cumulative HWHM away from the central light emission axes in directions that are spaced apart from directions transverse to the longitudinal axis being within a range of between about 6 degrees and about 55 degrees.

65. The lighting system of claim 20, further including:
a ninth lens module including a fifth diverging lens, the fifth diverging lens having a ninth light output surface being spaced apart along a ninth lens axis from a ninth light input surface, the fifth diverging lens having a fifth total internal reflection side surface being spaced apart around the ninth lens axis and having a fifth frusto-conical shape extending between the ninth light input and output surfaces of the fifth diverging lens;
wherein the ninth light input surface of the fifth diverging lens includes a first central cavity being shaped as a portion of a spheroid;
wherein the ninth light output surface of the fifth diverging lens includes a first raised region being shaped as a sliced torus having a second central cavity; and
wherein the lighting system is configured for detachably installing the ninth lens module in the lighting module between the semiconductor light-emitting device and the third lens module; and wherein the lighting system is configured for aligning the ninth lens axis with the central light emission axis and the third lens axis.

66. The lighting system of claim 65, wherein the first raised region of the fifth diverging lens that is shaped as a sliced torus is configured for causing some of the converged light emissions to pass through the third light output surface at a plurality of spaced-apart points.

67. The lighting system of claim 65, further including:
a tenth lens module including a sixth diverging lens, the sixth diverging lens having a tenth light output surface being spaced apart along a tenth lens axis from a tenth light input surface, the sixth diverging lens having a sixth total internal reflection side surface being spaced apart around the tenth lens axis and having a sixth frusto-conical shape extending between the tenth light input and output surfaces of the sixth diverging lens;
wherein the tenth light input surface of the sixth diverging lens includes a third central cavity being shaped as a portion of a spheroid;
wherein the tenth light output surface of the sixth diverging lens includes a second raised region being shaped as a sliced torus having a fourth central cavity; and
wherein the lighting system is configured for detachably installing the tenth lens module in the second lighting module between the second semiconductor light-emitting device and the sixth lens module; and wherein the lighting system is configured for aligning the tenth lens axis with the second central light emission axis and the sixth lens axis.

68. The lighting system of claim 67, wherein the second raised region of the sixth diverging lens that is shaped as a sliced torus is configured for causing some of the further converged light emissions to pass through the sixth light output surface at a plurality of spaced-apart points.

69. The lighting system of claim 68, wherein the lighting system is configured for positioning the semiconductor light-emitting device as being spaced apart on a longitudinal axis away from the second semiconductor light-emitting device for causing the central light emission axis to be spaced apart from the second central light emission axis.

70. The lighting system of claim 69, wherein the fifth diverging lens is integral with the sixth diverging lens, and wherein the fifth and sixth diverging lenses are integrally configured for causing some of the converged light emissions to pass through the third and sixth light output surfaces at a plurality of spaced-apart points.

71. The lighting system of claim 70, wherein the first diverging lens, the second diverging lens, the fifth diverging lens, and the sixth diverging lens are collectively configured for causing the third and sixth light output surfaces to emit a perceived line of light.

72. The lighting system of claim 20, further including another lens module having another diverging lens, the another diverging lens having one lens axis being spaced apart from another lens axis, the lighting system being configured for detachably installing the another diverging lens with the one lens axis being aligned with the central light emission axis and with the another lens axis being aligned with the second central light emission axis, the another diverging lens having another total internal reflection side surface extending between another light input surface and another light output surface, the another light output surface including a contoured lens screen having lenticular or microprismatic features.

73. The lighting system of claim 72, wherein the another diverging lens has the contoured lens screen as including an array of lenticular toroidal lenses.

74. The lighting system of claim 72, wherein the another light input surface includes one cavity aligned with the one lens axis and shaped as a portion of a spheroid, and wherein the another light input surface includes another cavity aligned with the another lens axis and shaped as a portion of a spheroid.

75. The lighting system of claim 72, wherein the lighting system is configured for positioning the semiconductor light-emitting device as being spaced apart on a longitudinal axis away from the second semiconductor light-emitting device for causing the central light emission axis to be spaced apart from the second central light emission axis.

76. The lighting system of claim 75, wherein the contoured lens screen has a central concave surface having a lens screen axis that extends in directions being similar to and spaced apart from the longitudinal axis.

77. The lighting system of claim 76, wherein the lens screen axis intersects the one lens axis and the another lens axis.

78. The lighting system of claim 77, wherein the contoured lens screen has one convex surface extending in directions along the lens screen axis, and wherein one edge of the central concave region extends adjacent to the one convex surface in directions along the lens screen axis.

79. The lighting system of claim 78, wherein the contoured lens screen has another convex surface extending in directions along the lens screen axis, and wherein another edge of the central concave region extends adjacent to the another convex surface in directions along the lens screen axis.

80. The lighting system of claim 79, wherein the contoured lens screen is configured for causing divergence of some of the converged light emissions away from the lens screen axis.

81. The lighting system of claim 72, wherein the another lens module is configured for causing some of the light emissions to pass through the contoured lens screen at a plurality of spaced-apart points.

82. The lighting system of claim 72, wherein the first diverging lens, the second diverging lens, and the another diverging lens are collectively configured for causing the third and sixth light output surfaces to emit a perceived line of light.

83. The lighting system of claim 72, further including a housing, wherein the housing is configured for positioning the lighting module for emission of the light emissions from the semiconductor light-emitting device along the central light emission axis, and wherein the housing is configured for positioning the second lighting module for emission of the further light emissions from the second semiconductor light-emitting device along the second central light emission axis.

84. The lighting system of claim 83, further including a carrier, wherein the carrier is configured for positioning the another lens module in the housing with the one lens axis being aligned with the central light emission axis and with the another lens axis being aligned with the second central light emission axis.

85. The lighting system of claim 84, further including a primary visible light reflector configured for being positioned between the housing and the carrier, wherein the primary visible light reflector is configured for redirecting some of the light emissions of the semiconductor light-emitting device along the central light emission axis, and wherein the primary visible light reflector is configured for redirecting some of the further light emissions of the second semiconductor light-emitting device along the second central light emission axis.

86. A lighting system, comprising:
a lighting module, including a semiconductor light-emitting device configured for emitting light emissions along a first central light emission axis, and including a second semiconductor light-emitting device configured for emitting light emissions along a second central light emission axis being spaced apart from the first central light emission axis;
a first lens module including a first diverging lens being configured for causing divergence of some of the light emissions away from the first central light emission axis, the first diverging lens having a first light output surface being spaced apart along a first lens axis from a first light input surface, the first diverging lens having a first total internal reflection side surface being spaced apart around the first lens axis and having a first frusto-conical shape extending between the first light input and output surfaces, the first light input surface including a first central cavity being shaped as a portion of a spheroid, the first light output surface including a first raised region being shaped as a sliced torus having a second central cavity;
a second lens module including a second diverging lens being configured for causing divergence of some of the light emissions away from the second central light emission axis, the second diverging lens having a second light output surface being spaced apart along a second lens axis from a second light input surface, the second diverging lens having a second total internal reflection side surface being spaced apart around the second lens axis and having a second frusto-conical shape extending between the second light input and output surfaces, the second light input surface including a third central cavity being shaped as a portion of a spheroid, the second light output surface including a second raised region being shaped as a sliced torus having a fourth central cavity;
a third lens module including a third diverging lens being configured for causing further divergence of some of the light emissions away from the first and second central light emission axes, the third diverging lens having a third light output surface being spaced apart from a third light input surface, the third light input surface including a first lens screen having lenticular or microprismatic features;
wherein the lighting system is configured for aligning the first and second lens modules between the third lens module and the lighting module, with first lens axis being aligned with the first central light emission axis and with the second lens axis being aligned with the second central light emission axis.

87. The lighting system of claim 86, wherein the raised regions of the first and second diverging lenses are configured for causing some of the light emissions to pass through the third light output surface at a plurality of spaced-apart points.

88. The lighting system of claim 86, wherein the first diverging lens is integral with the second diverging lens.

89. The lighting system of claim 86, wherein the first, second and third diverging lenses are collectively configured for causing the third light output surface to emit a perceived line of light.

90. The lighting system of claim 86, wherein the first diverging lens has the contoured lens screen as including an array of lenticular toroidal lenses.

91. The lighting system of claim 86, wherein the lighting system is configured for positioning the semiconductor light-emitting device as being spaced apart on a longitudinal axis away from the second semiconductor light-emitting device for causing the central light emission axis to be spaced apart from the second central light emission axis.

92. The lighting system of claim 86, further including a housing, wherein the housing is configured for positioning the lighting module for emission of the light emissions from the semiconductor light-emitting device along the central light emission axis, and wherein the housing is configured for positioning the second lighting module for emission of the further light emissions from the second semiconductor light-emitting device along the second central light emission axis.

93. The lighting system of claim 92, further including a carrier, wherein the carrier is configured for positioning the first lens module in the housing with the one lens axis being aligned with the central light emission axis, and for positioning the second lens module in the housing with the another lens axis being aligned with the second central light emission axis.

94. The lighting system of claim 93, further including a primary visible light reflector configured for being positioned between the housing and the carrier, wherein the primary visible light reflector is configured for redirecting some of the light emissions of the semiconductor light-emitting device along the central light emission axis, and wherein the primary visible light reflector is configured for redirecting some of the further light emissions of the second semiconductor light-emitting device along the second central light emission axis.

95. A lighting system, comprising:
a lighting module, including a semiconductor light-emitting device configured for emitting light emissions along a first central light emission axis, and including a second semiconductor light-emitting device configured for emitting light emissions along a second central light emission axis being spaced apart from the first central light emission axis;
a first lens module having a first diverging lens being configured for causing divergence of some of the light emissions away from the first and second central light emission axes, the first diverging lens having one lens axis being aligned with the central light emission axis and another lens axis being aligned with the second central light emission axis, the first diverging lens having a total internal reflection side surface extending between a first light input surface and a first light output surface, the first light output surface including a contoured lens screen having lenticular or microprismatic features;
a second lens module including a second diverging lens being configured for causing further divergence of some of the light emissions away from the first and second central light emission axes, the second diverging lens having a second light output surface being spaced apart from a second light input surface, the second light input surface including a first lens screen having lenticular or microprismatic features;
wherein the lighting system is configured for aligning the first lens module between the second lens module and the lighting module, with first lens axis being aligned with the first central light emission axis and with the second lens axis being aligned with the second central light emission axis.

96. The lighting system of claim 95, wherein the first diverging lens has the contoured lens screen as including an array of lenticular toroidal lenses.

97. The lighting system of claim 95, wherein the first light input surface includes one cavity aligned with the one lens axis and shaped as a portion of a spheroid, and wherein the first light input surface includes another cavity aligned with the another lens axis and shaped as a portion of a spheroid.

98. The lighting system of claim 95, wherein the lighting system is configured for positioning the semiconductor light-emitting device as being spaced apart on a longitudinal axis away from the second semiconductor light-emitting device for causing the central light emission axis to be spaced apart from the second central light emission axis.

99. The lighting system of claim 98, wherein the contoured lens screen has a central concave surface having a lens screen axis that extends in directions being similar to and spaced apart from the longitudinal axis.

100. The lighting system of claim 99, wherein the lens screen axis intersects the one lens axis and the another lens axis.

101. The lighting system of claim 100, wherein the contoured lens screen has one convex surface extending in directions along the lens screen axis, and wherein one edge of the central concave region extends adjacent to the one convex surface in directions along the lens screen axis.

102. The lighting system of claim 101, wherein the contoured lens screen has another convex surface extending in directions along the lens screen axis, and wherein another edge of the central concave region extends adjacent to the another convex surface in directions along the lens screen axis.

103. The lighting system of claim 102, wherein the contoured lens screen is configured for causing further divergence of some of the light emissions away from the lens screen axis.

104. The lighting system of claim 95, wherein the another lens module is configured for causing some of the light emissions to pass through the contoured lens screen at a plurality of spaced-apart points.

105. The lighting system of claim 95, wherein the first diverging lens and the second diverging lens are collectively configured for causing the second light output surface to emit a perceived line of light.

106. The lighting system of claim 95, further including a housing, wherein the housing is configured for positioning the lighting module for emission of the light emissions from the semiconductor light-emitting device along the central light emission axis, and wherein the housing is configured for positioning the second lighting module for emission of the further light emissions from the second semiconductor light-emitting device along the second central light emission axis.

107. The lighting system of claim 106, further including a carrier, wherein the carrier is configured for positioning the first lens module in the housing with the one lens axis being aligned with the central light emission axis and with the another lens axis being aligned with the second central light emission axis.

108. The lighting system of claim 107, further including a primary visible light reflector configured for being positioned between the housing and the carrier, wherein the primary visible light reflector is configured for redirecting some of the light emissions of the semiconductor light-emitting device along the central light emission axis, and wherein the primary visible light reflector is configured for redirecting some of the further light emissions of the second semiconductor light-emitting device along the second central light emission axis.

* * * * *